(12) United States Patent
Song et al.

(10) Patent No.: US 11,910,451 B2
(45) Date of Patent: Feb. 20, 2024

(54) METHOD AND APPARATUS FOR IDENTIFYING USER IN RADIO ACCESS NETWORK COMMUNICATION SYSTEM

(71) Applicant: Samsung Electronics Co., Ltd., Suwon-si (KR)

(72) Inventors: Junhyuk Song, Suwon-si (KR); Doohyun Ko, Suwon-si (KR); Jeongyeob Oak, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/955,943

(22) Filed: Sep. 29, 2022

(65) Prior Publication Data

US 2023/0021283 A1   Jan. 19, 2023

Related U.S. Application Data

(63) Continuation of application No. 16/927,361, filed on Jul. 13, 2020, now Pat. No. 11,464,056.

(Continued)

(30) Foreign Application Priority Data

Jul. 16, 2019   (KR) .................. 10-2019-0086026
Aug. 13, 2019   (KR) .................. 10-2019-0099141

(Continued)

(51) Int. Cl.
*H04W 76/11*   (2018.01)
*H04W 72/1263*   (2023.01)

(Continued)

(52) U.S. Cl.
CPC .............. *H04W 76/11* (2018.02); *H04W 8/08* (2013.01); *H04W 48/16* (2013.01); *H04W 72/1263* (2013.01); *H04W 76/27* (2018.02)

(58) Field of Classification Search
CPC . H04W 76/11; H04W 76/27; H04W 72/1263; H04W 8/08; H04W 48/16

(Continued)

(56) References Cited

U.S. PATENT DOCUMENTS 10,003,957 B2   6/2018   Hahn et al.
10,045,261 B2   8/2018   Zhu et al.

(Continued)

FOREIGN PATENT DOCUMENTS

CN   107079361 A   8/2017
CN   107466482 A   12/2017

(Continued)

OTHER PUBLICATIONS

3GPP TS 38.473 V15.6.0, 3rd Generation Partnership Project; Technical Specification Group Radio Access Network; NG-RAN; F1 application protocol (F1AP), (Release 15), Jul. 2019.

(Continued)

*Primary Examiner* — Mong-Thuy T Tran
(74) *Attorney, Agent, or Firm* — Jefferson IP Law, LLP

(57) ABSTRACT

A method and an apparatus for identifying a user in a radio access network (RAN), and a first node in the wireless communication system are provided. The method includes identifying a unique identifier of a UE, identifying a radio access network (RAN) UE identifier of the UE, and transmitting information related to a mapping relation between the RAN UE identifier and the unique identifier of the UE to a second node, based on the unique identifier of the UE.

22 Claims, 39 Drawing Sheets

Related U.S. Application Data

(60) Provisional application No. 62/873,452, filed on Jul. 12, 2019.

(30) Foreign Application Priority Data

| Aug. 26, 2019 | (KR) | ........................ 10-2019-0104680 |
| Oct. 14, 2019 | (KR) | ........................ 10-2019-0127198 |
| Oct. 28, 2019 | (KR) | ........................ 10-2019-0134831 |
| Jun. 17, 2020 | (KR) | ........................ 10-2020-0073931 |

(51) Int. Cl.
  *H04W 76/27* (2018.01)
  *H04W 48/16* (2009.01)
  *H04W 8/08* (2009.01)

(58) Field of Classification Search
  USPC .......................................................... 370/329
  See application file for complete search history.

(56) References Cited

U.S. PATENT DOCUMENTS

| 10,805,973 | B2 | 10/2020 | Babu et al. | |
| 11,418,979 | B2* | 8/2022 | Zhang | H04W 24/04 |
| 11,464,056 | B2* | 10/2022 | Song | H04W 24/02 |
| 2010/0120399 | A1 | 5/2010 | Guo et al. | |
| 2016/0050601 | A1 | 2/2016 | Jeong et al. | |
| 2016/0112943 | A1 | 4/2016 | Horn et al. | |
| 2018/0302877 | A1 | 10/2018 | Bosch et al. | |
| 2018/0368109 | A1* | 12/2018 | Kim | H04W 72/04 |
| 2019/0069333 | A1* | 2/2019 | Kim | H04W 36/0033 |
| 2020/0267634 | A1 | 8/2020 | Kim | |
| 2020/0296631 | A1* | 9/2020 | Young | H04W 76/36 |
| 2020/0383040 | A1* | 12/2020 | Young | H04W 88/18 |
| 2020/0396587 | A1 | 12/2020 | Kim et al. | |
| 2021/0112491 | A1* | 4/2021 | Chen | H04W 48/18 |
| 2021/0219355 | A1 | 7/2021 | Lindheimer et al. | |
| 2021/0360742 | A1 | 11/2021 | Liao et al. | |
| 2021/0385791 | A1* | 12/2021 | Vikberg | H04W 68/00 |
| 2023/0171592 | A1* | 6/2023 | Han | H04W 8/26 370/328 |

FOREIGN PATENT DOCUMENTS

| EP | 2 442 599 B1 | 4/2013 | |
| EP | 2 897 397 A1 | 7/2015 | |
| EP | 4075843 A1 * | 10/2022 | ............ H04W 24/10 |
| WO | 2018/002239 A1 | 1/2018 | |
| WO | WO-2019120694 A1 * | 6/2019 | ......... H04L 12/4641 |
| WO | 2019/215673 A1 | 11/2019 | |

OTHER PUBLICATIONS

3GPP TS 38.463 V15.4.0, 3rd Generation Partnership Project; Technical Specification Group Radio Access Network; NG-RAN; E1 Application Protocol (E1AP), (Release 15), Jul. 2019.

3GPP TS 23.401 V15.7.0, 3rd Generation Partnership Project; Technical Specification Group Services and System Aspects; General Packet Radio Service (GPRS) enhancements for Evolved Universal Terrestrial Radio Access Network, (E-UTRAN) access, (Release 15), Mar. 2019.

3GPP TS 23.251 V15.1.0, 3rd Generation Partnership Project; Technical Specification Group Services and System Aspects; Network Sharing; Architecture and functional description, (Release 15), Sep. 2018.

3GPP, TSG SA; Procedures for the 5G System; Stage 2 (Release 16), 3GPP TS 23.502 V16.1.1 (Jun. 2019), Jun. 11, 2019 section 4.2.2.

3GPP, TSG RAN; NG-RAN; NGAP (Release 15), 3GPP TS 38.413 V15.3.0 (Mar. 2019), Apr. 9, 2019 section 8.3.1.

O-Ran Alliance White Paper, 'O-RAN: Towards an Open and Smart RAN', Oct. 2018 [retrieved on Sep. 29, 2020]. Retrieved from <URL: https://static1.squarespace.com/static/5ad774cce74940d7115044b0/t/5bc79b371905f4197055e8c6/1539808057078/O-RAN+WP+FInal+181017.pdf> pp. 10-15; and figure 1.

3GPP, TSG CN; NAS protocol for 5GS; Stage 3; (Release 16), 3GPP TS 24.501 V16.1.0 (Jun. 2019), Jun. 14, 2019 sections 5.3-5.6.1.

International Search Report dated Oct. 13, 2020, issued in International Patent Application No. PCT/KR2020/009159.

"O-RAN Use Cases and Deployment Scenarios", O-RAN Alliances, Feb. 29, 2020, XP055844297.

Thoralf Czichy, "5G RAN optimization using the O-RAN software community's RIC (Ran Intelligent Controller)", Open Networking Summit Europe, Sep. 23, 2019, pp. 1-23, XP055697834.

"OSC Use Case: Traffic Steering QoE OSC Use Cases", O-RAN Software Community, Traffic Steering QoE, Mar. 12, 2019, pp. 1-13, XP055882094.

Extended European Search Report dated Sep. 18, 2023, issued in European Patent Application No. 20840295.8.

Chinese Office Action dated Dec. 1, 2023, issued in Chinese Patent application No. 202080062649.X.

* cited by examiner

FIG. 27

| ■ IE/Group Name | Presence | Range | IE type and reference | Semantics description |
|---|---|---|---|---|
| ■ RAN UE NGAP ID | M | | INTEGER [0..$2^{32}$-1] | |

FIG. 29

| IE/Group Name | Presence | Range | IE type and reference | Semantics description |
|---|---|---|---|---|
| AMF UE NGAP ID | M | | INTEGER [0..$2^{40}-1$] | |

FIG. 30

| IE/Group Name | Presence | Range | IE type and reference | Semantics description |
|---|---|---|---|---|
| MME UE S1AP ID | M | | INTEGER (0..2^32 −1) | |

METHOD AND APPARATUS FOR IDENTIFYING USER IN RADIO ACCESS NETWORK COMMUNICATION SYSTEM

CROSS-REFERENCE TO RELATED APPLICATION(S)

This application is a continuation application of prior application Ser. No. 16/927,361, filed on Jul. 13, 2020, which will be issued as U.S. Pat. No. 11,464,056, on Oct. 4, 2022, which is based on and claimed priority under 35 U.S.C. § 119(e) of a U.S. Provisional application Ser. No. 62/873,452, filed on Jul. 12, 2019, in the U.S. Patent and Trademark Office, and § 119(a) of a Korean patent application number 10-2019-0086026, filed on Jul. 16, 2019, in the Korean Intellectual Property Office, of a Korean patent application number 10-2019-0099141, filed on Aug. 13, 2019, in the Korean Intellectual Property Office, of a Korean patent application number 10-2019-0104680, filed on Aug. 26, 2019, in the Korean Intellectual Property Office, of a Korean patent application number 10-2019-0127198, filed on Oct. 14, 2019 in the Korean Intellectual Property Office, of a Korean patent application number 10-2019-0134831, filed on Oct. 28, 2019, in the Korean Intellectual Property Office, and of a Korean patent application number 10-2020-0073931, filed on Jun. 17, 2020, in the Korean Intellectual Property Office, the disclosures of each of which is incorporated by reference herein in its entirety.

BACKGROUND

1. Field

The disclosure relates to a method and apparatus for identifying a user and generating and transmitting an identifier by a base station (BS) in a wireless communication system.

2. Description of Related Art

Due to commercialization of a $5^{th}$-generation (5G) communication system (hereinafter, interchangeably used with a 5G system or a new radio or next radio (NR) system) to satisfy demand for radio data traffic, services having a high data transmission rate are provided to users through the 5G system along with a $4^{th}$-generation (4G) system, and it is predicted to provide IoT and wireless communication services having various purposes such as services that require high reliability for a specific purpose.

In a system currently used with the 4G communication system and the 5G communication system, an open radio access network (O-RAN) established by service providers and equipment provision companies defines a new network element (NE) and an interface standard on the basis of the conventional 5GPP standard to create an O-RAN structure.

The above information is presented as background information only to assist with an understanding of the disclosure. No determination has been made, and no assertion is made, as to whether any of the above might be applicable as prior art with regard to the disclosure.

SUMMARY

According to the currently commercialized $4^{th}$-generation/$5^{th}$-generation communication systems (hereinafter, referred to as a 4G/5G system, new radio or next radio (NR)), supporting of differentiated service to a user in a virtualized network is required, but it is impossible to specify a user in cell-related information collected by a RAN or an O-RAN. A method to solve the problem is proposed.

Aspects of the disclosure are to address at least the above-mentioned problems and/or disadvantages and to provide at least the advantages described below. Accordingly, an aspect of the disclosure is to provide a method and apparatus for identifying a user and generating and transmitting an identifier by a BS in a wireless communication system.

Additional aspects will be set forth in part in the description which follows and, in part, will be apparent from the description, or may be learned by practice of the presented embodiments.

In accordance with an aspect of the disclosure, a method of a first node in a wireless communication system is provided. The method includes identifying a unique identifier of a user equipment (UE), identifying a radio access network (RAN) UE identifier of the UE, and transmitting information related to a mapping relation between the RAN UE identifier and the unique identifier of the UE to a second node, based on the unique identifier of the UE.

The unique identifier of the UE may be identified based on first information transmitted from the UE and second information transmitted from a network entity, and the information related to the mapping relation between the RAN UE identifier and the unique identifier of the UE may include at least one of RAN UE identifier information configured based on the unique identifier of the UE and a pair of the RAN UE identifier and the unique identifier of the UE.

The unique identifier of the UE may be a 5G-globally unique temporary identifier (5G-GUTI), the first information may be 5G system architecture evolution (SAE)-temporary mobile subscriber identity (5G-S-TMSI), the network entity may be an access and mobility management function (AMF), and the second information may be a globally unique AMF identifier (GUAMI), or the unique identifier of the UE may be a globally unique temporary identifier (GUTI), the first information may be an SAE-temporary mobile subscriber identity (S-TMSI), the network entity may be a mobility management entity (MME), and the second information may be a globally unique MME identifier (GUMMEI).

Measurement information of the UE may be transmitted from the first node to the second node along with the information related to the mapping relation between the RAN UE identifier and the unique identifier of the UE.

In accordance with another aspect of the disclosure, a method of a second node in a wireless communication system is provided. The method includes receiving information related to a mapping relation between a radio access network (RAN) UE identifier and a unique identifier of the UE from a first node, identifying the unique identifier of the UE and the RAN UE identifier, and processing information on the UE received from at least one of a third node and a fourth node, based on the RAN UE identifier of the UE.

The information related to the mapping relation between the RAN UE identifier and the unique identifier of the UE may include at least one of RAN UE identifier information configured based on the unique identifier of the UE and a pair of the RAN UE identifier and the unique identifier of the UE, and the unique identifier of the UE may be a 5G-globally unique temporary identifier (5G-GUTI) or a globally unique temporary identifier (GUTI).

Measurement information of the UE may be transmitted from the first node to the second node along with the information related to the mapping relation between the RAN UE identifier and the unique identifier of the UE. The second node may receive the RAN UE identifier and measurement-related information of the UE from at least one of the third node and the fourth node and transmit information on the UE received from at least one of the first node, the third node, and the fourth node to a fifth node, and the information on the UE may be transmitted along with the unique identifier of the UE.

In accordance with another aspect of the disclosure, an apparatus for controlling a first node in a wireless communication system is provided. The apparatus includes a communication unit, and a controller configured to perform control to identify a unique identifier of a UE and identify a radio access network (RAN) UE identifier of the UE, and connected to the communication unit configured to perform control to transmit information related to a mapping relation between the RAN UE identifier and the unique identifier of the UE to a second node, based on the unique identifier of the UE.

In accordance with another aspect of the disclosure, an apparatus for controlling a second node in a wireless communication system is provided. The apparatus includes a communication unit, and a controller configured to receive information related to a mapping relation between a radio access network (RAN) UE identifier and a unique identifier of the UE from a first node and identify the unique identifier of the UE and the RAN UE identifier, and connected to the communication unit configured to perform control to process information on the UE received from at least one of a third node and a fourth node, based on the RAN UE identifier of the UE.

The disclosure can efficiently provide user-specific service or user-demanded service through radio resource monitoring for a specific user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 27 illustrates a RAN UE NGAP ID specified in a 3GPP standard according to an embodiment of the disclosure;

FIG. 29 illustrates a detailed configuration of an AMF UE NGAP ID according to an embodiment of the disclosure;

FIG. 30 illustrates a configuration of an MME UE S1AP ID according to an embodiment of the disclosure;

Throughout the drawings, like reference numerals will be understood to refer to like parts, components, and structures.

DETAILED DESCRIPTION

Figure 1A:
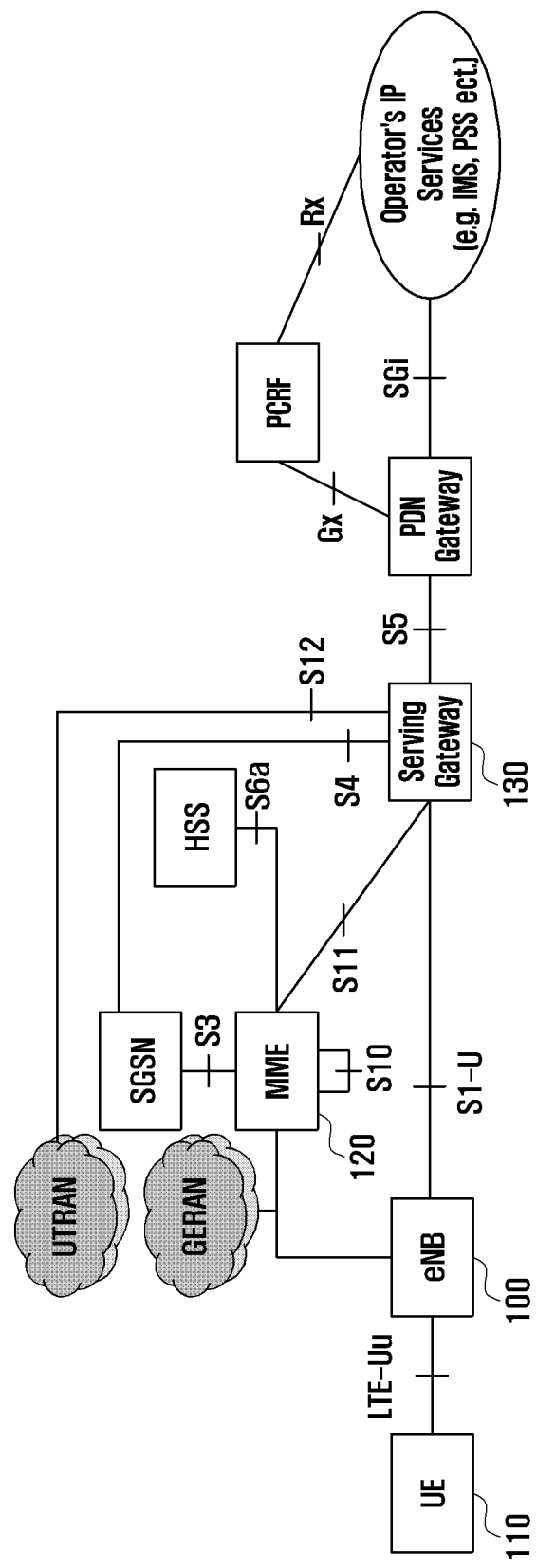
FIG. 1A illustrates an example of a 4G long term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the disclosure, an uplink is a radio link through which a terminal (a user equipment (UE) or a mobile station (MS)) transmits data or a control signal to a base station (BS) (or an eNode B), and a downlink is a radio link through which the BS transmits data or a control signal to the terminal. The BS is the entity that allocates resources to the UE, and may be one of an eNode B, a Node B, a Base Station (BS), a generation Node B (gNB), a radio access unit, a base station controller, and a node on a network. The terminal may include a user equipment (UE), a mobile station (MS), a cellular phone, a smartphone, a computer, or a multimedia system capable of performing a communication function.

Due to commercialization of a 5-generation communication system (hereinafter, interchangeably used with a 5G system or a new radio or next radio (NR) system to satisfy demand for radio data traffic, services having a high data transmission rate are provided to users through the 5G system along with a 4G system, and providing IoT and wireless communication services having various purposes such as services that require high reliability for a specific purpose is predicted.

In a system currently used with the 4G communication system and the 5G communication system, an open radio access network (O-RAN) established by service providers and equipment provision companies defines a new network element (NE) and an interface standard on the basis of the conventional 5GPP standard to create an O-RAN structure. The O-RAN newly defines the conventional 3GPP NE, RU, DU, CU-CP, and CU-UP as O-RU, O-DU, O-CU-CP, and O-CU-UP, respectively (integrated into an O-RAN BS) and additionally standardizes a near-real-time RAN intelligent controller (RIC) and a non-real-time RAN intelligent controller (NRT-RIC). The newly defined RIC is a logical node that may be intensively arrange servers in one physical place and may collect information on a cell site transmitted and received by the actual terminal and the O-DU, the O-CU-CP, and the O-CU-UP (O-RAN BS). The O-DU and the RIC may be connected through Ethernet, the O-CU-CP and the RIC may be connected through Ethernet, and the O-CU-UP and the RIC may be connected through Ethernet. Further, interface standards for communication between the O-DU and the RIC, between the O-CU-CP and the RIC, and between the O-CU-UP and the RIC are needed, and the standards E2-DU, E2-CU-CP, and E2-CU-UP are currently used between the RIC and the O-CU, the O-CU-CP, and the O-CU-UP, respectively.

According to the current commercialization of a $4^{th}$-generation/$5^{th}$-generation communication system (hereinafter, referred to as a 4G/5G system, new radio or next radio (NR)), supporting of differentiated service to a user in a virtualized network is required, but it is impossible to specify a user for cell-related information collected by a RAN or an O-RAN. The reason is there is an identifier of a UE (hereinafter, referred to as a RAN UE identifier) used by an O-DU, an O-CU-CP, and an O-CU-UP in a radio access network (RAN) according to the 3GPP standard, but (unique) information on a user (or information for specifying a user, a user identifier, or a user identity, for example, an international mobile subscriber identity (IMSI), a subscription permanent identifier (SUPI), or a subscription concealed identifier (SUCI)) cannot be known.

Specifically, when the RIC receives UE-specific measurement information and call-related information based on the RAN UE identifier from the O-DU, the O-CU-CP, and the O-CU-UP, a plurality of O-CU-CPs may be connected to the RIC, and thus RAN UE identifiers may overlap and, when the O-CU-CP connected to the UE is changed, the RAN UE identifier may be changed. Accordingly, based on the 3GPP standard, in order to specify a user to indicate a user for which information is collected by the RAN or the O-RAN, the RAN and the core network may identify the user, and a user identifier (ID) (interchangeably used with a user identity, a UE identifier, or a UE identity) which can be used by the RAN is needed.

The RIC and/or the NRT-RIC may identify that information collected by the RAN or the O-RAN is for a specific user on the basis of the user identifier. The collected information may be transmitted from at least one of the (O-)CU-CP, the (O-)CU-UP, and the (O-)DU, and the collection server, the RIC and/or the NRT-RIC may identify that information collected from different entities is for one specific user on the basis of the user identifier, and determine a key performance indicator (KPI) of service provided to each user on the basis of the collected information.

Since it could not be identified previously that the collected information is for a specific user, radio resource monitoring for each user was not possible. However, it is possible to optimize resources for a user and efficiently provide user-specific service or user-demanded service through radio resource monitoring for the specific user in the disclosure. For example, the RIC (NRT-RIC or collection server) may efficiently truncate network slices or configure an additional carrier to allow a specific UE to receive service through carrier aggregation in order to optimize resources, or may configure an additional cell for dual connectivity to allow the specific UE to receive service through dual connectivity. Further, the RIC (NRT-RIC or collection server) may configure the specific UE to avoid a connection with a specific cell during movement between cells and to be connected to the specific cell. In addition, the RIC (NRT-RIC or collection server) may efficiently optimize resources through machine learning through analysis based on the collected information. Resource optimization according to the disclosure is not limited to the description. Further, according to the disclosure, it is possible to not only collect information for each UE but also collect information for each bearer.

Further, the collected information on the specific user may be used by the collection server, the RIC, or the NRT-RIC, and may be provided to an operations support system (OSS) and/or a business support system (BSS) and used to provide specialized service to the user.

FIG. 1A illustrates a 4G LTE core system according to an embodiment of the disclosure.

Referring to FIG. 1A, an evolved node B (eNB) 100 that is a 4G BS is connected to a mobile management entity (MME) 120 of the 4G core system through an S1-MME interface. The eNB is a device that collects state information such as a buffer state of a UE 110, available transmission power, and a channel state to perform scheduling. The MME performs a function of managing mobility of the UE and performing various controls. A serving gateway 130 provides a data bearer and generates or controls the data bearer according to the control of the MME. The MME is capable of internally identifying the UE with a globally unique temporary identifier (GUTI).

A carrier aggregation (GA) technology is a technology for aggregating a plurality of component carriers and allowing one UE to simultaneously use the plurality of component carriers to transmit and receive a signal, thereby increasing frequency usage efficiency in a viewpoint of the UE or the BS. Specifically, according to the CA technology, the UE and the BS may transmit and receive a signal through a broadband using a plurality of component carriers in each of an uplink (UL) and a downlink (DL), in which case the respective component carriers are located in different frequency bands. Hereinafter, the uplink is a communication link through which the UE transmits a signal to the BS, and the downlink is a communication link through which the BS transmits a signal to the UE. At this time, the number of uplink component carriers and the number of downlink component carriers may be different from each other.

A dual connectivity/multi connectivity technology is a technology in which one UE is connected to a plurality of different BSs and transmits and receives signals simultaneously using carriers within the plurality of BSs located in different frequency bands, thereby increasing frequency usage efficiency in a viewpoint of the UE or the BS. The UE may be simultaneously connected to a first BS (for example, a BS providing service using a long term evolution (LTE) technology or a $4^{th}$-generation mobile communication technology) and a second BS (for example, a BS providing service using a new radio (NR) technology or a $5^{th}$-generation mobile communication technology) to transmit and receive traffic, in which case frequency resources used by the BSs may be located in different bands. As described above, a scheme for operation based on dual connectivity of LTE and NR may be referred to as 5G non-standalone (5G NSA).

Figure 1B:
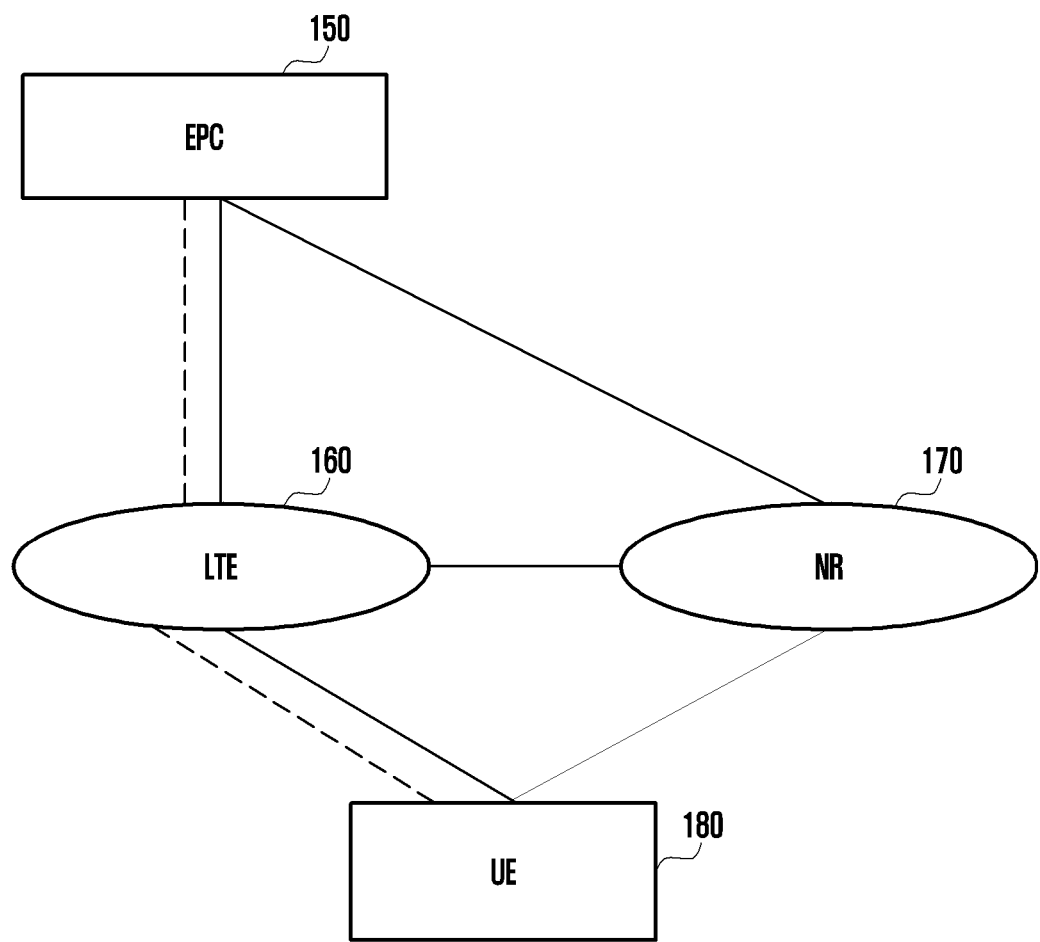
FIG. 1B illustrates an example of a 3GPP 5G non-standard alone (NSA) system according to an embodiment of the disclosure.

FIG. 1B illustrates an example of a 5G NAS system according to an embodiment of the disclosure.

Referring to FIG. 1B, the 5G NSA system may include an EPC 150 LTE 160 (or interchangeably used with an LTE BS or an eNB), NR 170 (or interchangeably used with an NR BS or a gNB), and a UE 180. The LTE BS 160 and the NR BS 170 may be connected to the EPC 150, and the UE 180 may simultaneously receive services from the LTE 160 and the NR 170.

In this case, the UE may perform RRC connection through the first BS, receive a function (for example, a connection management or mobility management function) provided in a control plane, and receive additional radio resources for transmitting and receiving data through the second BS. The dual connectivity technology may be referred to as evolved universal terrestrial radio access (EN-DC)-NR dual connectivity. The disclosure is not limited to the EN-DC, and may be applied to NR-E-UTRA dual connectivity (NE-DC) through which the first BS uses NR and the second BS uses LTE and to any multi connectivity in various forms. Further, the disclosure may be applied to carrier aggregation.

In addition, the disclosure may be applied to the case in which a first system using a first communication technology and a second system using a second communication technology are implemented in one device or the case in which the first BS and the second BS are located at the same geographical place.

Figure 2:
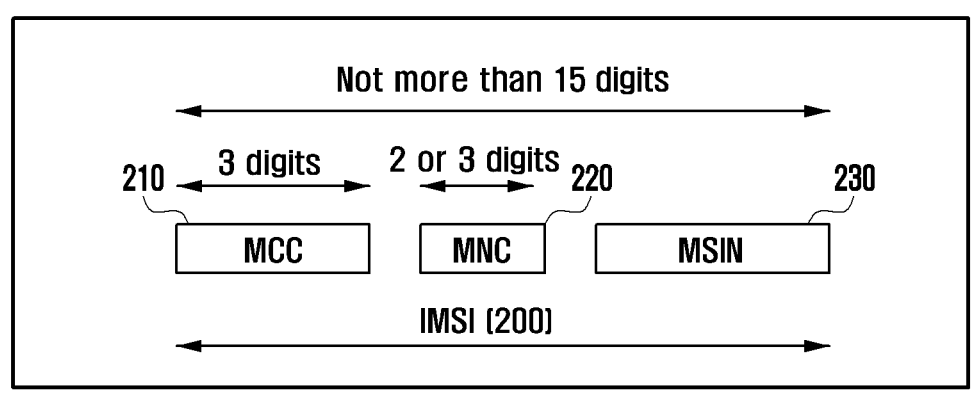
FIG. 2 illustrates a configuration of an IMSI that is a unique identifier of a UE used in common in $3^{rd}$ generation (3G), 4G, and 5G systems defined in International Telecommunication Union-Telecommunication Standardizaton Sector (ITU-T) according to an embodiment of the disclosure.

FIG. 2 illustrates international mobile subscription identity (IMSI) that is a unique identifier of the UE used in common by all of 3G, 4G, and 5G systems defined in ITU-T according to an embodiment of the disclosure.

Referring to FIG. 2, the UE may be uniquely identified through the IMSI 200 around the globe. The IMSI includes a mobile country code (MCC) 210, a mobile network code (MNC) 220, and a mobile subscriber identification number (MSIN) 230. The MCC is an identifier for identifying a country all over the world, and the MNC is an identifier for identifying a public land mobile network (PLMN) (interchangeably used with an operator). The MSIN is an identifier for identifying a UE within the PLMN.

Figure 3:
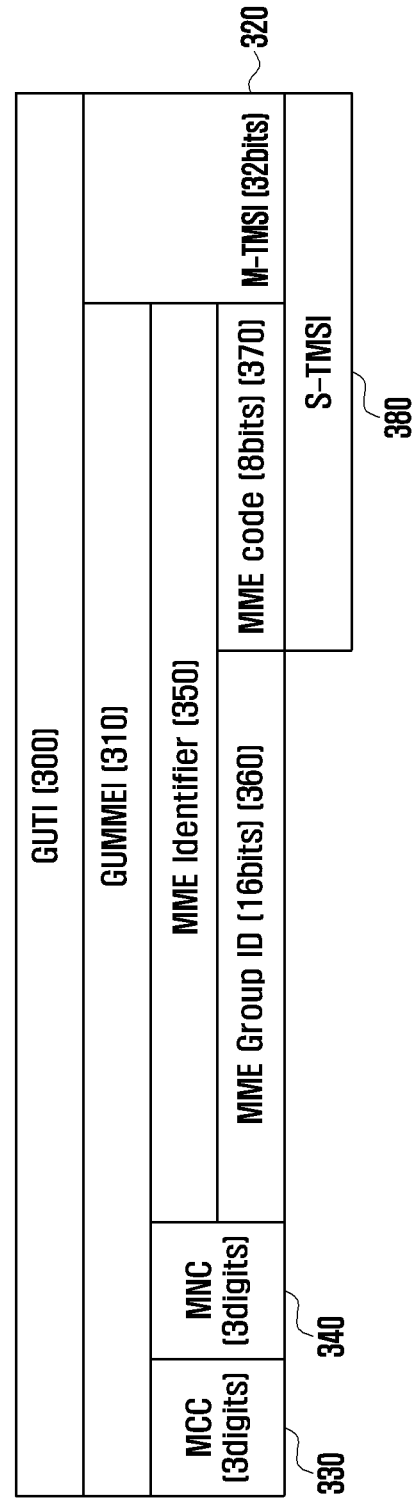
FIG. 3 illustrates a configuration of a GUTI used by an MME of an LTE core network defined in a 3GPP standard according to an embodiment of the disclosure.

FIG. 3 illustrates a GUTI used in a 4G LTE core system according to an embodiment of the disclosure.

Referring to FIG. 3, a GUTI 300 is an identifier for identifying a specific UE in a core network (interchangeably used with a network) including a plurality of MMEs. The GUTI includes a globally unique MME identifier (GUMMEI) 310 and an M-temporary mobile subscription identifier (TMSI) 320. The GUMMEI includes an MCC 330, an MNC 340, and an MME identifier 350. The MME identifier includes an MME group ID 360 and an MME code 370. The MME group ID indicates an MME group including a plurality of MMEs, and the MME code indicates a specific MME. The M-TMSI 320 is an MME-TMSI, and may uniquely identify a UE only within the MME. An SAE-temporary mobile subscriber identity (S-TMSI) 380 may be generated through a combination of the MME code and the M-TMSI, and is a temporary UE identifier by which the MME identifies a user within the MME group.

Figure 4:
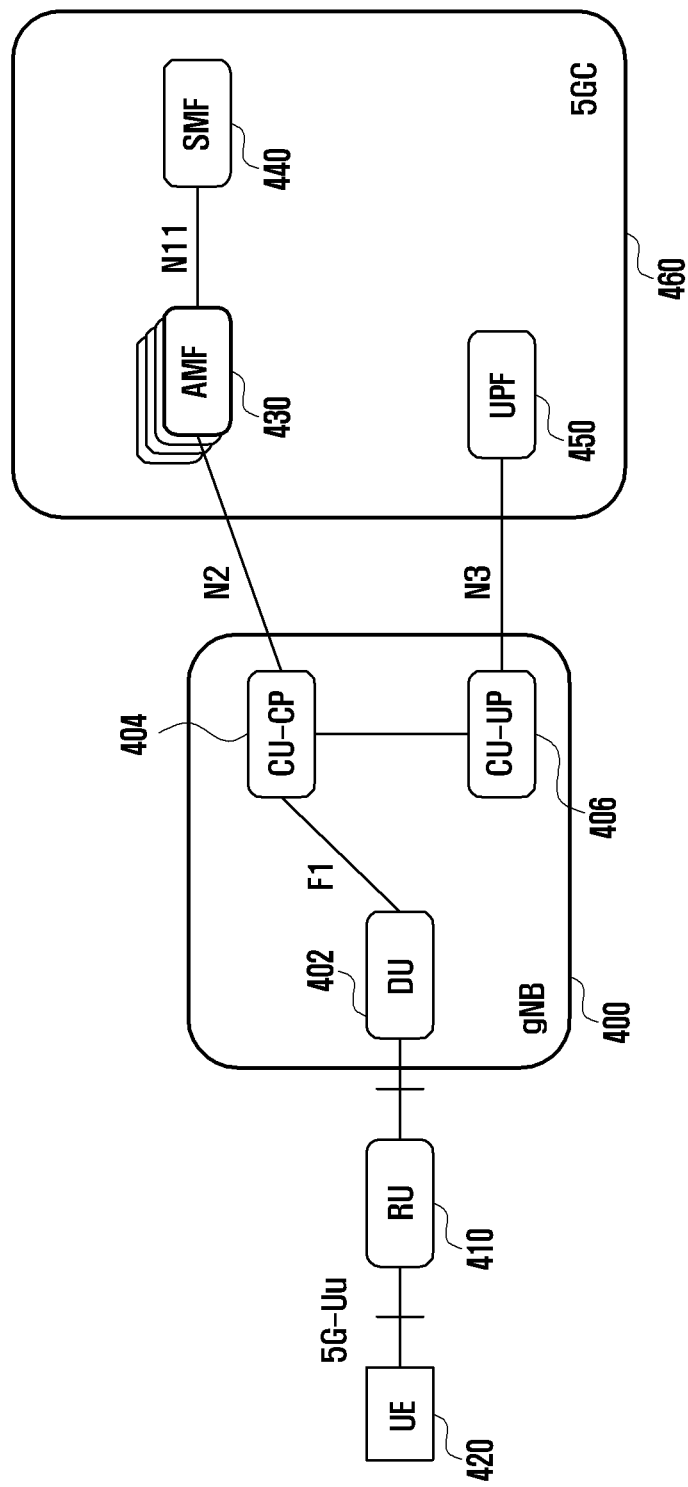
FIG. 4 illustrates an example of a 5G NR core system according to an embodiment of the disclosure.

FIG. 4 illustrates a 5G NR core system according to an embodiment of the disclosure.

Referring to FIG. 4, a 5G core system 460 may include network functions such as an access and mobility management function (AMF) 430, a session management function (SMF) 440, and a user plane function (UPF) 450. The AMF provides a function of access in units of UEs 420 and mobility management, which may be similar to the role of the MME of the LTE core network. The SMF provides a session management function, and the UPF transfers downlink data received from a data network (not shown) to the UE via a gNB 400, and transfers uplink data received from the UE to the data network via the gNB.

The 5G BS (generation node B (gNB)) 400 may be logically divided into a radio unit (RU) 410 performing a physical layer function, a digital unit (DU) 402 performing a medium access control (MAC) and radio link control (RLC) function, a central unit-control plane (CU-CP) 404 performing a higher-layer function such as radio resource control (RRC) and packet data convergence protocol (PDCP), and a central unit-user plane (CU-UP) function 406. The CU-CP performs a function related to a control plane, and specifically may perform a function related to connection setup, mobility, and security. The CU-UP may perform a user data transmission/reception-related function as a function related to a user plane. The gNB is connected to the AMF, and a plurality of AMFs of the 5G core network exists in a service provider network.

Figure 5:
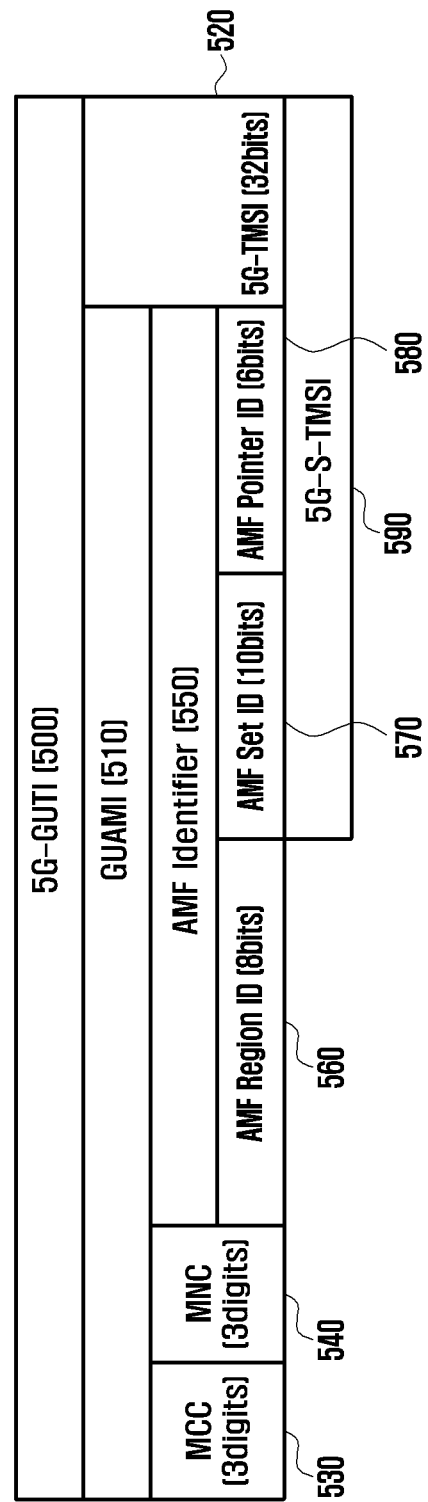
FIG. 5 illustrates a configuration of a 5G-GUTI used in a 5G core system according to an embodiment of the disclosure.

FIG. 5 illustrates the structure of a 5G-globally unique temporary identifier (5G-GUTI) used in the 5G core system according to an embodiment of the disclosure.

Referring to FIG. 5, a 5G-GUTI 500 is an identifier for identifying a specific UE in the 5G core network including a plurality of AMFs, and the 5G-GUTI includes a globally unique AMF identifier (GUAMI) 510 and a 5G-temporary mobile subscription identifier (5G-TMSI) 520. The GUAMI includes an MCC 530, an MNC 540, and an AMF identifier 560. The AMF identifier includes an AMF region ID 560, an AMF set ID 570, and an AMF pointer 580. The AMF region ID indicates a an AMF set including a plurality of AMFs, the AMF set ID indicates a specific AMF set within an AMF region, and the AMF pointer indicates a specific AMF within the AMF set. The 5G-TMSI is an identifier for uniquely identifying a UE only in the AMF pointer. A 5G SAE-temporary mobile subscription identity (5G-S-TMSI) 590 may include a combination of an AMF set ID, an AMF pointer, and a 5G-TMSI, and may be used to more efficiently perform wireless signaling in a short form of the 5G-GUTI.

Figure 6:
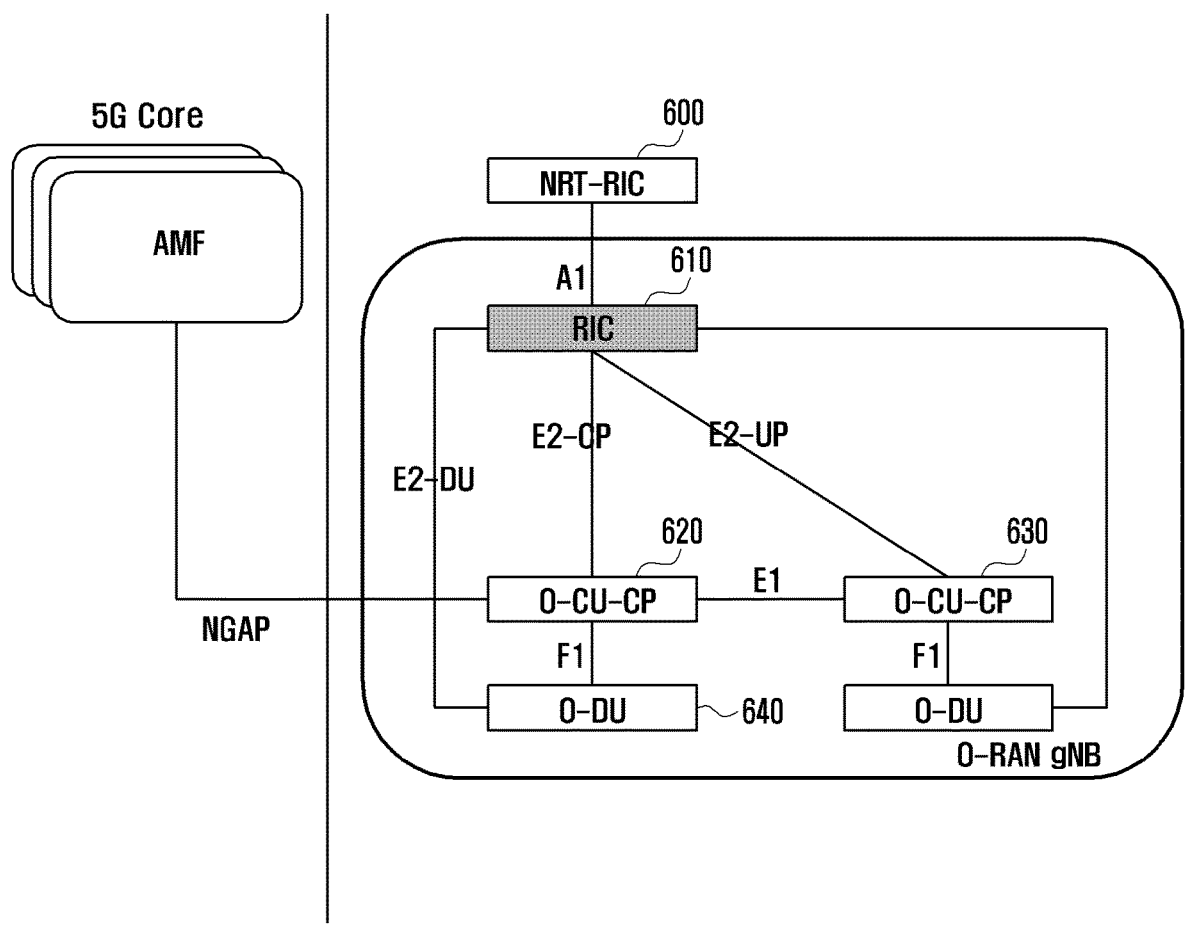
FIG. 6 illustrates an example of an O-RAN network system according to an embodiment of the disclosure.

FIG. 6 illustrates an O-RAN network system according to an embodiment of the disclosure.

Referring to FIG. 6, the O-RAN network is a standard that logically separates eNB and gNB functions of conventional 4G and 5G, and a non-real time RAN intelligent controller (NRT-RIC) 600, a near-real-time (RIC) RAN intelligent controller 610, an O-CU-CP 620, an O-CU-UP 630, and an O-DU 640 are newly defined in the O-RAN standard. The O-CU including the O-CU-CP and the O-CU-UP is a logical node providing functions of RRC, a service data adaptation protocol (SDAP), and a PDCP, the O-CU-CP is a logical node providing functions of the control plane part of RRC and the PDCP, the O-CU-UP is a logical node providing functions of the user plane part of the SDAP and the PDCP, the O-DU is a logical node providing functions of RLC, MAC, and a higher physical layer (high-PHY based on 7-2× fronthaul split), and an O-RU connected to an O-DU which is not illustrated is a logical node providing functions of a lower physical layer (low-PHY based on 7-2× fronthaul split) and RF processing.

The NRT-RIC is a logical node allowing non-real-time control rather than real-time control, optimization of RAN elements and resources, model training, and update, and the RIC is a logical node allowing near-real-time control and optimization of RAN elements and resources on the basis of data collected from the O-DU, the O-CU-CP, and the O-CU-UP through an E2 interface.

The disclosure is not limited by a name of each node described above, and the configuration of the disclosure may be applied to the logical nodes or entities performing the functions described above. The logical nodes may be located in physically the same place or different places, and functions thereof may be provided by the same physical device (for example, a processor or a controller) or by different physical devices. For example, one physical device may provide the function of at least one logical node through virtualization.

Figure 7:
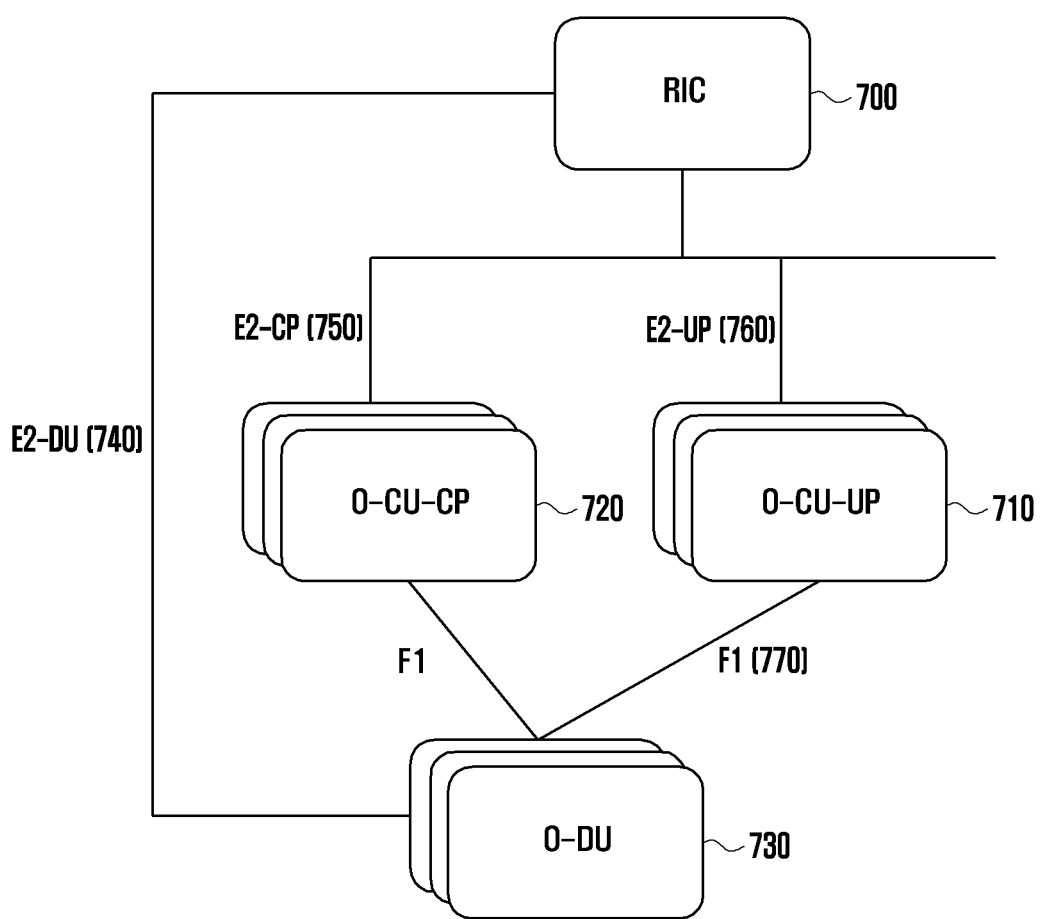
FIG. 7 illustrates an example of connections between an O-RAN intelligent controller (RIC) and a plurality of nodes such as an O-CU-CP, an O-CU-UP, and an O-DU according to an embodiment of the disclosure.

FIG. 7 illustrates an example of the connection between a plurality of nodes such as the O-RAN RIC and the O-CU-CP, the O-CU-UP, and the O-DU according to an embodiment of the disclosure.

Referring to FIG. 7, one RIC 700 may be connected to a plurality of nodes such as an O-CU-CP 720, an O-CU-UP 710, and an O-DU 730, and may be connected to the respective nodes through an E2-CP interface 750, an E2-UP interface 760, and an E2-DU interface 740. Further, an interface between the O-CU-CP and the DU and between the O-CU-UP and the DU may be referred to as an F1 interface 770. Hereinafter, the DU may be interchangeably used with the O-DU, the CU-CP may be interchangeably used with the O-CU-CP, and the CU-UP may be interchangeably used with the O-CU-UP. Further, the eNB may be interchangeably used with an O-RAN eNB, and the gNB may be interchangeably used with an O-RAN gNB. Although FIG. 7 illustrates only one RIC 700, a plurality of RICs may exist, which may be implemented as a plurality of pieces of hardware located in the same physical place or implemented through virtualization using one piece of hardware.

Figure 8:
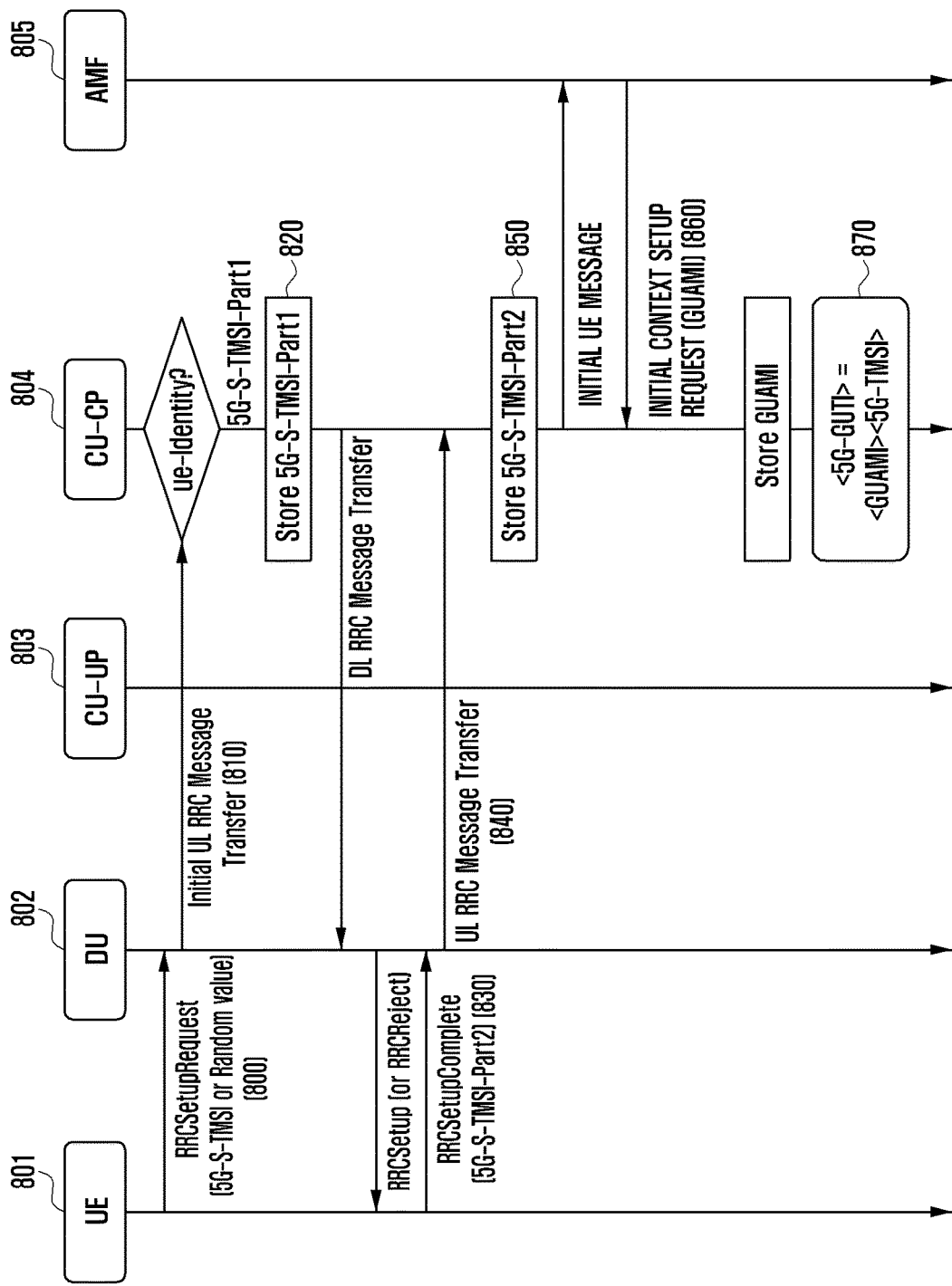
FIG. 8 illustrates a procedure in which a CU-CP of a 5G RAN defined in a 3GPP acquires a 5G-GUTI according to an embodiment of the disclosure.

FIG. 8 illustrates a procedure in which a CU-CP of a 5G RAN defined in the 3GPP acquires a 5G-GUTI according to an embodiment of the disclosure.

Referring to FIG. 8, in operation 800, a UE 801 inserts upper 39 bits of a 5G SAE temporary mobile subscriber identity (5G-S-TMSI) value allocated by the 5G core network in initial setup into an RRCSetupRequest message and transmits the RRCSetupRequest message to a DU 802 according to a call access procedure defined in the 3GPP standard. In operation 810, the DU 802 inserts the upper 39 bits of the 5G-S-TMSI value received in operation 800 into an F1 initial UL RRC message transfer message and transmits the F1 initial UL RRC message transfer message to a CU-CP 804 according to the call access procedure defined in the 3GPP standard. In operation 820, the CU-CP 804 stores the upper 39 bits of the 5G-S-TMSI value, which was inserted into the F1 message and transmitted by the DU 802. Thereafter, the CU-CP transfers a DL RRC message to the DU 802, and the DU transmits an RRCSetup message (or an RRCReject message) to the UE 801.

When the DU 802 transmits the RRCSetup message, the UE 801 inserts lower 9 bits of the 5G-S-TMSI value allocated by the core network in the initial setup into an RRCSetupComplete message and transmits the RRCSetupComplete message to the DU according to the call access procedure defined in the 3GPP standard in operation 830. In operation 840, the DU 802 inserts the lower 9 bits of the 5G-S-TMSI value received in the fourth procedure into an F1 UL RRC message transfer message and transmits the F1 UL RRC message transfer message to the CU-CP 804 according to the call access procedure defined in the 3GPP standard. In operation 850, the CU-CP 804 stores the lower 9 bits of the 5G-S-TMSI value, which was inserted into the F1 message and transmitted by the DU 802. Thereafter, the CU-CP transmits an initial UE message to an AMF 805.

In operation 860, the CU-CP 804 stores a GUAMI value, which is inserted into a NGAP INITIAL CONTEXT SETUP REQUEST message and transmitted by the AMF 805, according to the call access procedure defined in the 3GPP standard. In operation 870, the CU-CP 804 identifies the 5G-TMSI on the basis of the upper 39 bits and the lower 9 bits of the 5G-S-TMSI stored in operation 820 and operation 850 and generates a 5G-GUTI by concatenating the 5G-TMSI with a lower part of the GUAMI received in operation 860.

In the procedure, operations must not be sequentially performed or all operations must not be necessarily performed, and the order thereof may be changed or a specific operation may be omitted. Further, another configuration illustrated in FIG. 8 may be added to the procedure, or a procedure illustrated in another figure may be combined with the procedure illustrated in FIG. 8.

Figure 9:
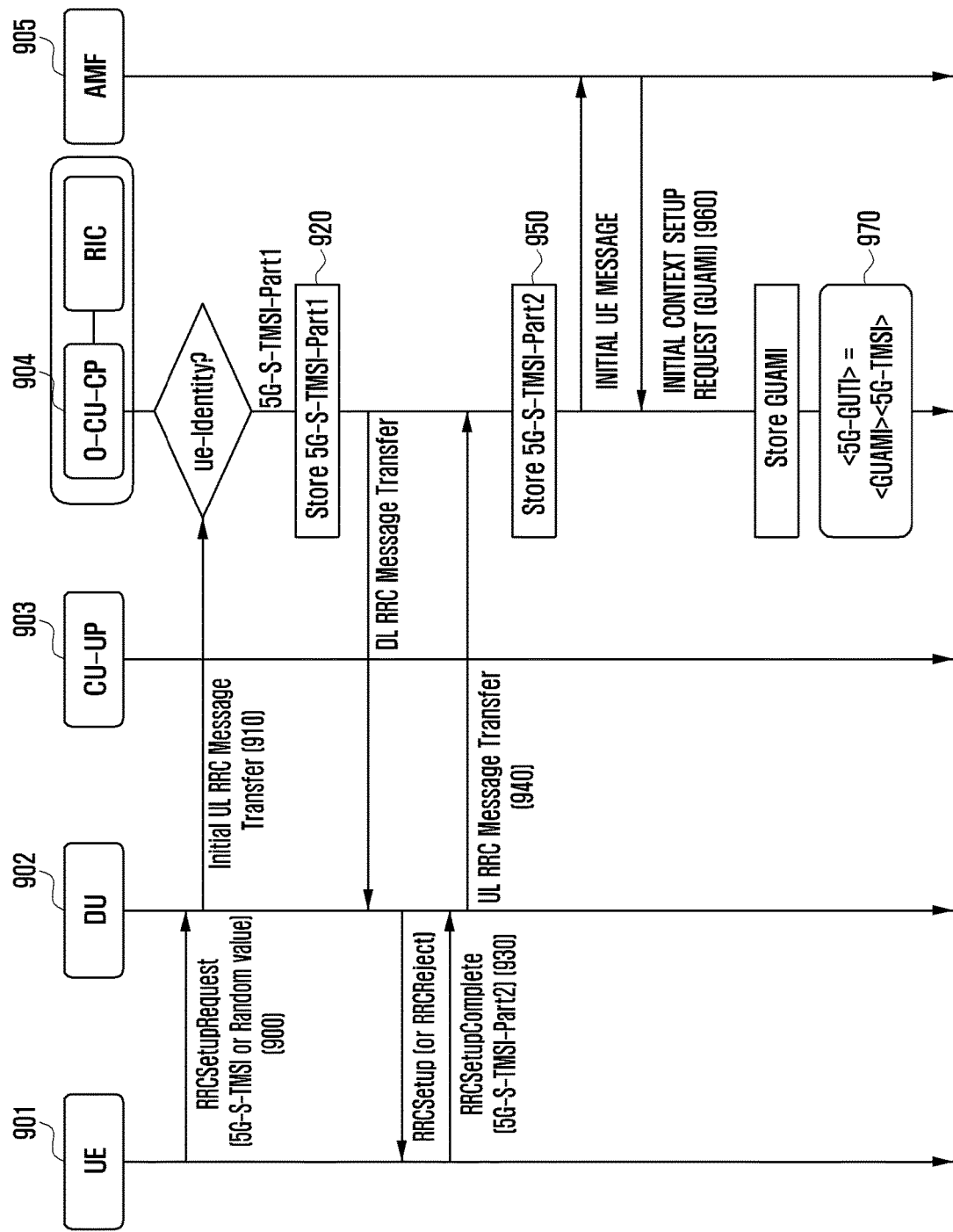
FIG. 9 illustrates a procedure in which an O-CU-CP of a 5G RAN defined in an O-RAN acquires a 5G-GUTI according to an embodiment of the disclosure.

FIG. 9 illustrates a procedure in which an O-CU-CP of a 5G RAN defined in the O-RAN acquires a 5G-GUTI according to an embodiment of the disclosure.

Referring to FIG. 9, in operation 900, a UE 901 inserts upper 39 bits of a 5G-S-TMSI value allocated by the core network into an RRCSetupRequest message and transmits the RRCSetupRequest message to an O-DU 902 in initial setup according to a call access procedure defined in the 3G PP standard. In operation 910, the O-DU inserts the upper 39 bits of the 5G-S-TMSI value received in operation 900 into an F1 initial UL RRC message transfer message and transmits the F1 initial UL RRC message transfer message to an O-CU-CP 904 according to the call access procedure defined in the 3GPP standard. In operation 920, the O-CU-CP 904 stores the upper 39 bits of the 5G-S-TMSI value, which was inserted into the F1 message and transmitted by the O-DU 902. Thereafter, the O-CU-CP 904 transfers a DL RRC message to the O-DU 902, and the O-DU 902 transmits an RRCSetup message (or an RRCReject message) to the UE 901.

When the O-DU 902 transmits the RRCSetup message, the UE 901 inserts lower 9 bits of the 5G-S-TMSI value allocated by the core network in the initial setup into an RRCSetupComplete message and transmits the RRCSetupComplete message to the O-DU 902 according to the call access procedure defined in the 3GPP standard in operation 930. In operation 940, the O-DU 902 inserts the lower 9 bits of the 5G-S-TMSI value received in the fourth procedure into an F1 UL RRC message transfer message and transmits the F1 UL RRC message transfer message to the O-CU-CP 904 according to the call access procedure defined in the 3GPP standard. In operation 950, the O-CU-CP 904 stores the lower 9 bits of the 5G-S-TMSI value, which was inserted into the F1 message and transmitted by the O-DU 902.

Thereafter, the O-CU-CP transmits an initial UE message to an AMF 905, and stores a GUAMI value, which is inserted into a NGAP INITIAL CONTEXT SETUP REQUEST message and transmitted by the AMF 905, according to the call access procedure defined in the 3GPP standard in operation 960. In operation 970, the O-CU-CP identifies the 5G-TMSI on the basis of the upper 39 bits and the lower 9 bits of the 5G-S-TMSI stored in operation 920 and operation 950 and generates a 5G-GUTI by concatenating the 5G-TMSI with a lower part of the GUAMI received in operation 960.

In the procedure, operations must not be sequentially performed or all operations must not be necessarily performed, and the order thereof may be changed or a specific operation may be omitted. Further, another configuration illustrated in FIG. 9 may be added to the procedure, or a procedure illustrated in another figure may be combined with the procedure illustrated in FIG. 9.

Figure 10:
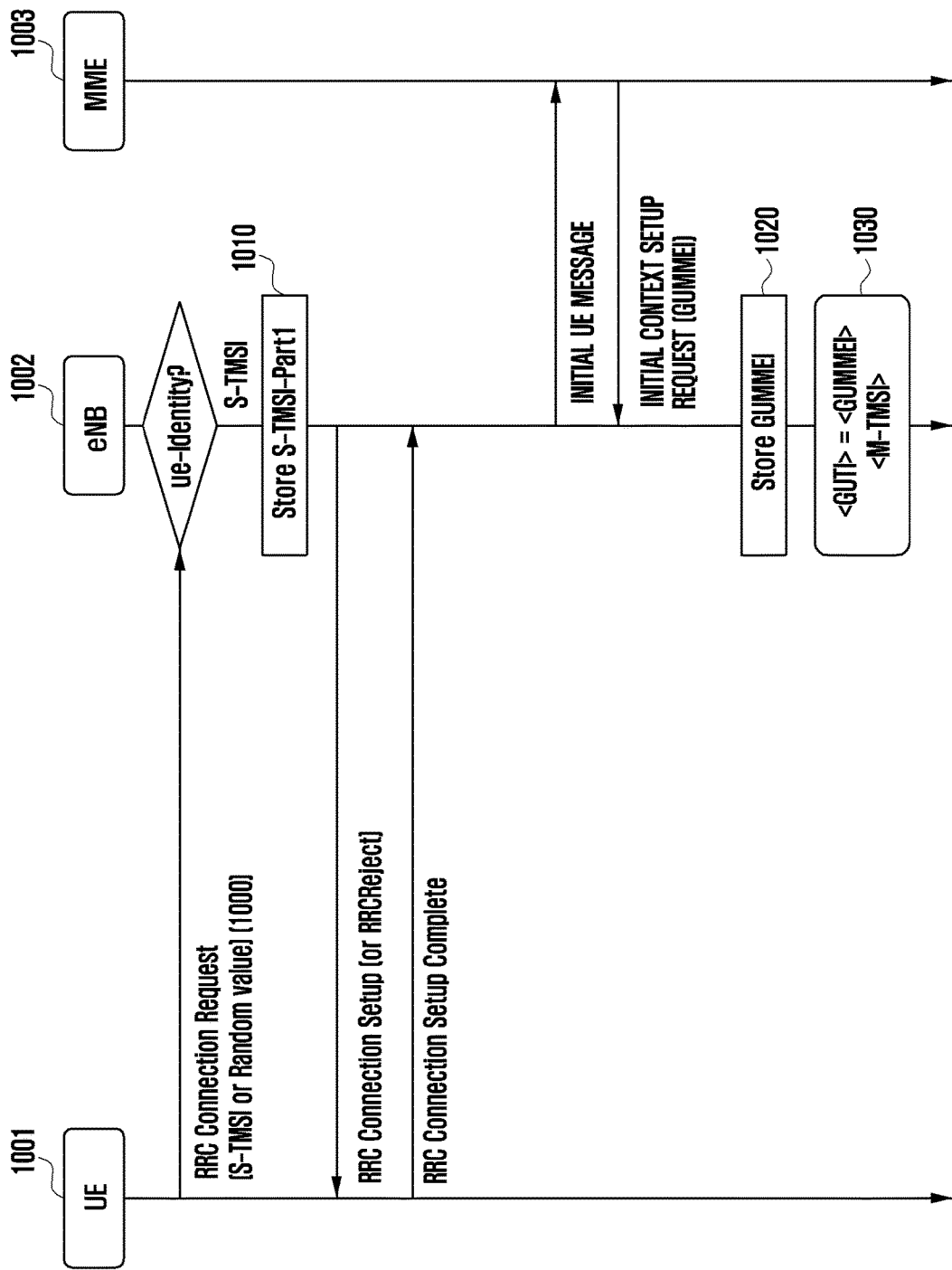
FIG. 10 illustrates a procedure in which an evolved node B (eNB) of a 4G RAN defined in a 3GPP acquires a GUTI according to an embodiment of the disclosure.

FIG. 10 illustrates a procedure in which an eNB of a 4G RAN defined in the 3GPP acquires a GUTI according to an embodiment of the disclosure.

Referring to FIG. 10, in operation 1000, a UE 1001 inserts 40 bits of an S-TMSI value allocated by the core network into an RRC connection request message and transmits the RRC connection request message to an eNB 1002 in initial setup according to a call access procedure defined in the 3GPP standard. In operation 1010, the eNB 1002 stores the S-TMSI value transmitted by the UE 1001. Thereafter, the eNB 1002 transmits an RRCConnectionSetup message to the UE 1001, and the UE 1001 transmits RRCConnectionSetupComplete message to the eNB 1002 in response thereto. Thereafter, the eNB 1002 transmits an initial UE message to an MME 1003. In operation 1020, the eNB 1002 stores a GUMMEI value, which is inserted into an S1AP INITIAL CONTEXT SETUP REQUEST message and transmitted by the MME 1003, according to the call access procedure defined in the 3GPP standard. In operation 1030, the eNB 1002 identifies an MME temporary mobile subscriber identity (M-TMSI) on the basis of the S-TMSI stored in operation 1010 and generates a GUTI by concatenating the M-TMSI with a lower part of the GUMMEI received in operation 1020.

In the procedure, operations must not be sequentially performed or all operations must not be necessarily performed, and the order thereof may be changed or a specific operation may be omitted. Further, another configuration illustrated in FIG. 10 may be added to the procedure, or a procedure illustrated in another figure may be combined with the procedure illustrated in FIG. 10.

Figure 11:
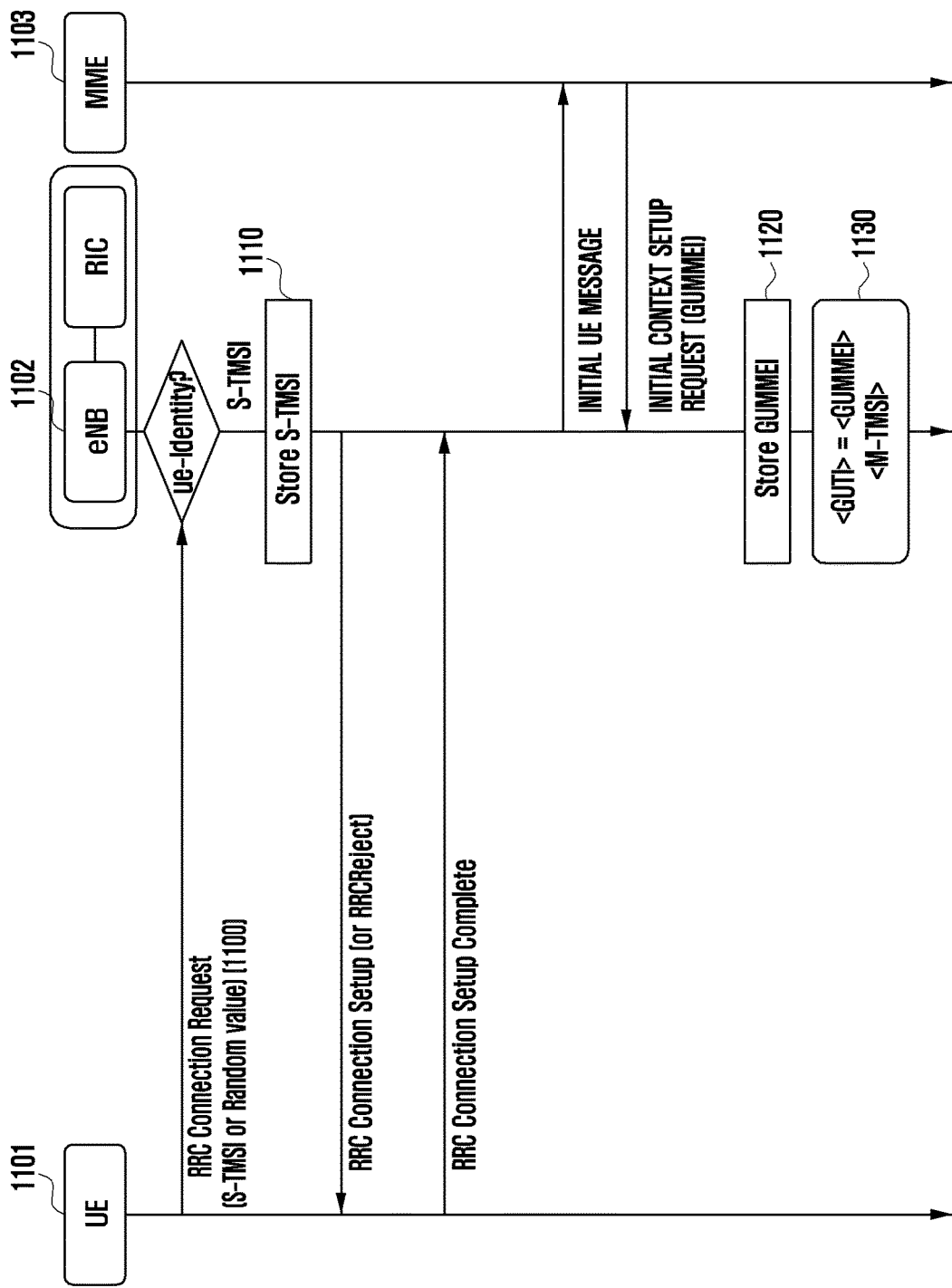
FIG. 11 illustrates a procedure in which an eNB of a 4G O-RAN defined in an O-RAN acquires a GUTI according to an embodiment of the disclosure.

FIG. 11 illustrates a procedure in which an eNB of a 4G O-RAN defined in the O-RAN acquires a GUTI according to an embodiment of the disclosure.

Referring to FIG. 11, in operation 1100, a UE 1101 inserts 40 bits of an S-TMSI value allocated by the core network into an RRC Connection Request message and transmits the RRC Connection Request message to an eNB 1102 of the O-RAN in initial setup according to the call access procedure defined in the 3GPP standard. In operation 1110, the eNB 1102 stores the S-TMSI value transmitted by the UE 1101. Thereafter, the eNB 1102 transmits an RRCConnectionSetup message to the UE 1101, and the UE 1101 transmits RRCConnectionSetupComplete message to the eNB 1102 in response thereto. Thereafter, the eNB 1102 transmits an initial UE message to an MME 1103. In operation 1120, the eNB 1102 of the O-RAN stores a GUMMEI value, which is inserted into an S1AP INITIAL CONTEXT SETUP REQUEST message and transmitted by the MME 1103, according to the call access procedure defined in the 3GPP standard. In operation 1130, the eNB 1102 of the O-RAN identifies an M-TMSI on the basis of the S-TMSI stored in operation 1110 and generates a GUTI by concatenating the GUMMEI received in operation 1120 with a lower part of the M-TMSI.

In the procedure, operations must not be sequentially performed or all operations must not be necessarily performed, and the order thereof may be changed or a specific operation may be omitted. Further, another configuration illustrated in FIG. 11 may be added to the procedure, or a procedure illustrated in another figure may be combined with the procedure illustrated in FIG. 11.

Figure 12:
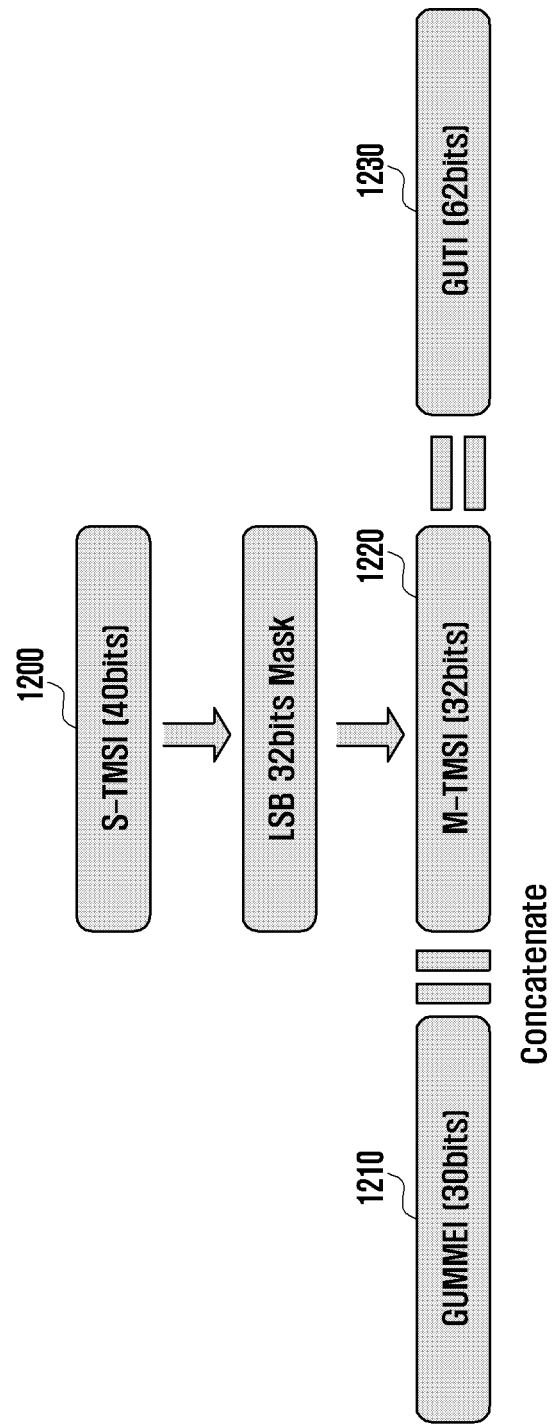
FIG. 12 illustrates a procedure in which an eNB of a 4G RAN defined in a 3GPP acquires a GUTI according to an embodiment of the disclosure.

FIG. 12 illustrates the configuration in which an eNB of a 4G RAN defined in the 3GPP generates a GUTI on the basis of an S-TMSI received from a UE and a GUMMEI received from an MME according to an embodiment of the disclosure.

Referring to FIG. 12, the eNB identifies an M-TMSI 1220 by applying a mask of lower 32 bits to an S-TMSI 1200. The eNB generates a GUTI 1230 by concatenating a GUMMEI 1210 before the M-TMSI 1220. At this time, a method of generating the GUTI 1230 is not limited to the masking, and the GUTI 1230 may be generated through various methods based on an S-TMSI 1200 and a GUMMEI 1210.

Figure 13:
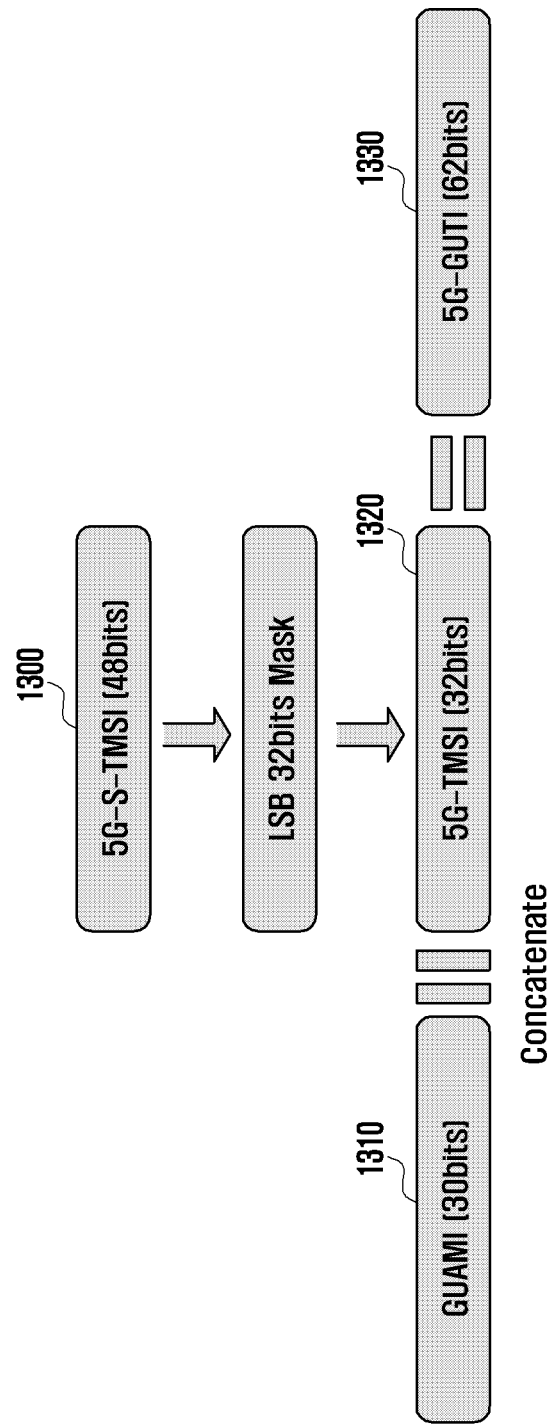
FIG. 13 illustrates a procedure in which a CU-CP of a 5G RAN defined in a 3GPP acquires a 5G-GUTI according to an embodiment of the disclosure.

FIG. 13 illustrates the configuration in which a CU-CP of a 5G RAN defined in the 3GPP generates a 5G-GUTI on the basis of a 5G-S-TMSI received from a UE and a GUAMI received from an AMF according to an embodiment of the disclosure.

Referring to FIG. 13, the CU-CP identifies a 5G-TMSI 1320 by applying a mask of lower 32 bits to a 5G-S-TMSI 1300. The CU-CP generates a 5G-GUTI 1330 by concatenating a GUAMI 1310 before the 5G-TMSI. At this time, a method of generating the 5G-GUTI 1330 is not limited to the masking, and the GUTI may be generated through various methods based on a 5G-S-TMSI 1300 and a GUAMI 1310.

Figure 14:
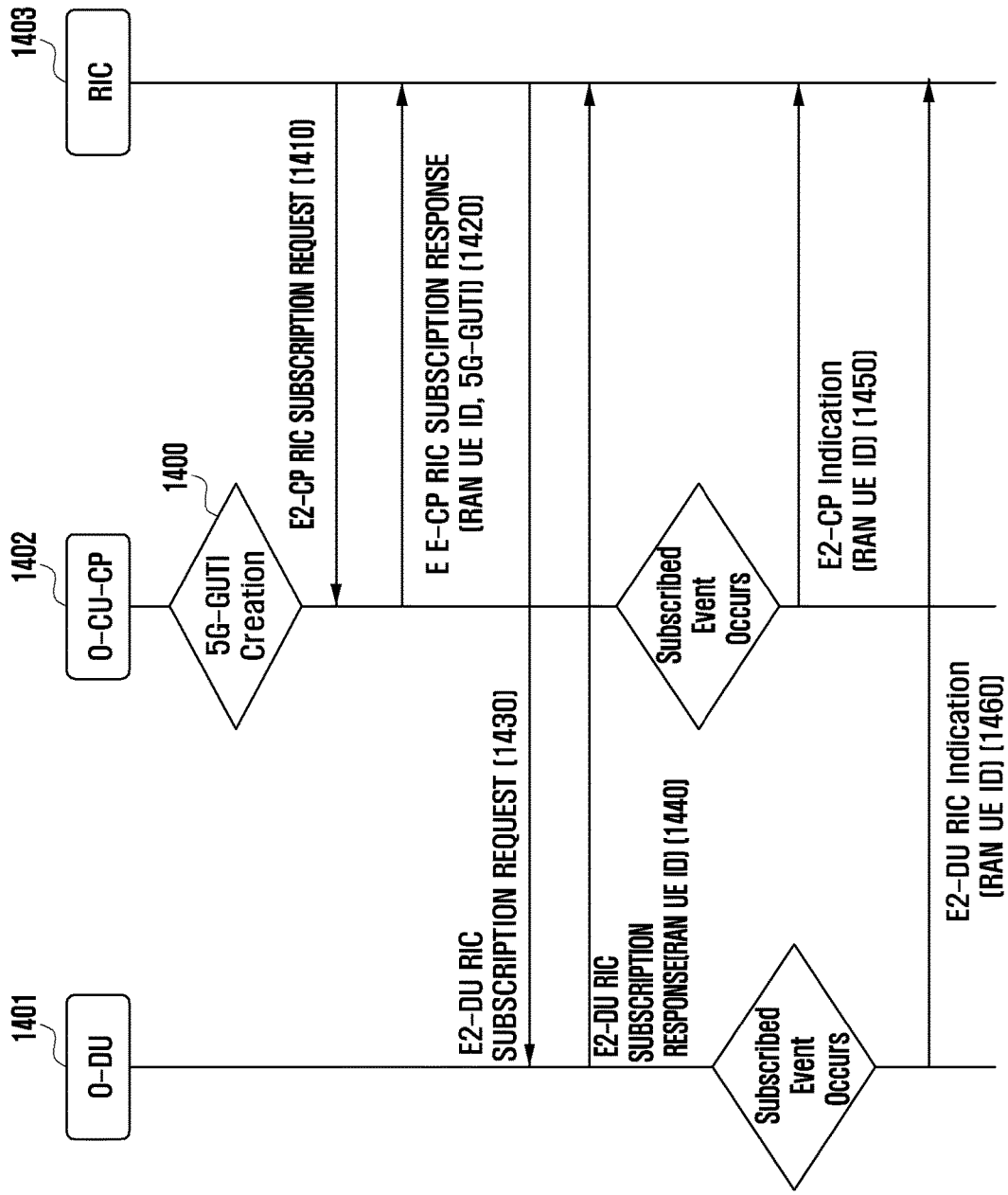
FIG. 14 illustrates a procedure in which a RIC defined in an O-RAN receives information classified for a specific UE from an O-DU and an O-CU-CP according to an embodiment of the disclosure.

FIG. 14 illustrates a procedure in which a RIC defined in the O-RAN receives information classified for a specific UE from an O-DU and an O-CU-CP according to an embodiment of the disclosure.

Referring to FIG. 14, in operation 1400, an O-CU-CP 1402 generates a 5G-GUTI by communicating with a UE and an AMF. The 5G-GUTI may be generated through the above-described method. In operation 1410, the RIC 1403 transmits an E2-CP RIC SUBSCRIPTION REQUEST message defined in the O-RAN standard to the O-CU-CP 1402 and transmits a report classified for a specific UE when a specific event is generated. In operation 1420, the O-CU-CP 1402 processes a request configured in operation 1410 to the RIC 1403, and inserts a RAN UE ID defined in the 3GPP and the 5G-GUTI configured in operation 1400 mapped to the RAN UE ID into an E2 E2-CP RIC SUBSCRIPTION RESPONSE message and transmits the E2-CP RIC SUBSCRIPTION RESPONSE message to the RIC 1403.

The RIC 1403 may identify a UE for which the information is collected (that is, a 5G-GUTI which the UE has) on the basis of a mapping relation between the RNA UE ID and the 5G-GUTI. A detailed description thereof will be described below.

RAN UE ID is a temporary UE identifier defined in the 3GPP, and corresponds to a UE identifier used between a CU-CP, a CU-UP, and a DU. This may be configured between nodes in F1 interface setup, is used to identify a specific UE between nodes and report call-related information and measurement-related information to the specific UE, and is defined to have 64 bits. The RAN UE ID is a temporarily determined UE identifier within an O-RAN BS, and may be configured as operation administration maintenance (OAM) by a service provider. For a specific example, the RAN UE ID may be used to report call summary log (CSL) information to a call log collection server. The O-CU-CP 1402 may configure the RAN UE ID in any way. For example, the RAN UE ID may be included in a UE context setup request message and a UE context setup response message transmitted and received between the DU and the CU, and may be included in a bearer context modification request message and a bearer context modification failure message transmitted and received between the CU-CP and the CU-UP. In another example, the RAN UE ID may be included in a handover request message and a handover request acknowledge message transmitted and received by a source gNB and a target gNB, may be included in a retrieve UE context request message and a retrieve UE context response message of an old gNB and a new gNB, may be included in a handover required message and a handover command message between a source gNB and an AMF, may be included in an S-node addition request message and an S-node request acknowledge message between a master gNB and a second gNB, may be included in an initial UE message transmitted to an AMF by a gNB, and may be included in a handover request message and a handover request acknowledge message between a target gNB and an AMF.

The disclosure describes an example in which the RAN UE ID and the 5G GUTI are inserted into the E2-CP RIC SUBSCRIPTION RESPONSE message and transmitted, the O-CU-CP 1402 may configure the RAN UE ID on the basis of a combination of the 5G-GUTI and a value for uniquely identifying a UE shared with the core network or a combination of the GUAMI and a value for identifying a UE shared with the core network. In the 5G network, user data management (UDM) stores a permanent ID of the user, a subscription permanent ID (SUPI), subscription data, and policy data, and the AMF stores mapping information between the SUPI and the 5G-GUTI or mapping information between the RAN UE ID, the 5G-GUTI, and the SUPI. The value for identifying the UE shared with the core network may be based on the mapping information. The AMF may store mapping information between the value for identifying the UE and an identifier for globally and uniquely identifying a UE such as the 5G GUTI or the SUPI.

In this case, the RAN UE ID may be determined by a function (or a rule) having, as keys, one or more parameters including a 5G-GUTI (or a combination of the value for uniquely identifying the UE shared with the core network or a GUAMI and value for identifying the UE shared with the core network, and hereinafter the 5G-GUTI may be understood as one of combinations of the 5G-GUTI, the value for uniquely identifying the UE shared with the core network, or the GUAMI, and the value for identifying the UE shared with the core network), and the function may be predetermined or preconfigured. In this case, the RIC 1403 may acquire a 5G-GUTI value of the specific UE according to the predetermined or preconfigured function (or rule) on the basis of the received RAN UE ID of the specific UE. The O-CU-CP 1402 may transmit only the RAN UE ID and/or the 5G-GUTI to the RIC 1403 or also transmit a parameter applied to generate the RAN UE ID from the 5G-GUTI in addition to the RAN UE ID and/or the 5G-GUTI. Alternatively, a maximum length of the currently defined RAN UE ID is 64 bits and a length of the 5G-GUTI is 62 bits, and thus the O-CU-CP 1402 may configure the content of the RNA UE ID to be the same as the 5G-GUTI. In the above-described case or when the value for identifying the UE shared with the core network including the GUAMI is used as the RAN UE ID, the O-CU-CP 1402 may transmit only the RAN UE ID to the RIC. The method is not limited to the example of FIG. 14 and may be applied to entirety of the disclosure.

The O-CU-CP 1402 may transmit the RAN UE ID (and the 5G-GUTI) through another message other than the E2 E2-CP RIC SUBSCRIPTION RESPONSE message, and the disclosure may be applied to the case.

In operation 1430, the RIC transmits an E2-DU RIC SUBSCRIPTION REQUEST message defined in the O-RAN standard to the O-DU 1401 and, when a specific event is generated, transmits a report classified for each specific UE. In operation 1440, the O-DU 1401 processes a request from the RIC 1403 in operation 1430, and inserts the RAN UE ID and the report for each RAN ID into an E2-DU RIC SUBSCRIPTION RESPONSE and transmits the E2-DU RIC SUBSCRIPTION RESPONSE to the RIC 1403. The report is UE-related information, and specifically is UE-related measurement information, and may include at least one piece of DU resource state information, UE KPI-related information (including at least one piece of throughput and latency-related information). The report is not limited to the example of FIG. 14 and may be applied to the entirety of the disclosure.

When the preset event of operation 1410 is generated, the O-CU-CP 1402 transmits information classified for each RAN UE ID to the RIC 1403 through an E2-CP INDICATION message defined in the O-RAN in operation 1460. The information may include one or more RAN UE IDs and information for each RAN UE ID. The information may pertain to at least one piece of KPI-related information for each UE in the CU-CP and UE context information and may be applied to the entirety of the disclosure without being limited to the example of FIG. 14.

When the preset event of operation 1410 is generated, the O-DU 1401 transmits information classified for each RAN UE ID to the RIC 1403 through an E2-DU INDICATION message defined in the O-RAN in operation 1460. The information may include one or more RAN UE IDs and information for each RAN UE ID.

The RIC 1403 identifies a 5G-GUTI associated with the RAN UE ID and store information on each RAN UE ID transmitted by the O-CU-CP 1402 and the O-DU 1401 in operations 1450 and 1460 to be associated with the 5G-GUTI. That is, for one 5G-GUTI, information on a specific user transmitted by each of the O-CU-CP 1402 and the O-DU 1401 may be stored. At this time, since a plurality of O-CU-CPs and a plurality of O-DUs may be connected to the RIC 1403, RAN UE IDs transmitted by the O-CU-CP 1402 and the O-DU 1401 may overlap each other. The RIC 1403 may identify the 5G-GUTI on the basis of port information of the O-CU-CP 1402 and/or the O-DU 1401 transmitting the RAN UE ID (and information thereon) or identify the 5G-GUTI on the basis of an RAN function ID and the RAN UE ID of the O-CU-CP 1402 and/or the O-DU 1401.

The RAN UE ID is only an example of a specific user identifier of the O-RAN, and the specific user identifier (or UE identifier) of the O-RAN may be used in the disclosure. The 5G-GUTI is only an example of a globally unique identifier of the UE (or user), and the globally unique identifier of the UE (or user) may be used in the disclosure.

In the procedure, operations must not be sequentially performed or all operations must not be necessarily performed, and the order thereof may be changed or a specific operation may be omitted. Another component illustrated in FIG. 14 may be performed in addition to the described produce, and a procedure illustrated in another figure may be combined with the procedure illustrated in FIG. 14. A name of the message illustrated in FIG. 14 is only an example, and the configuration of the disclosure may be applied to a method and message similar to those used in the disclosure.

Figure 15:
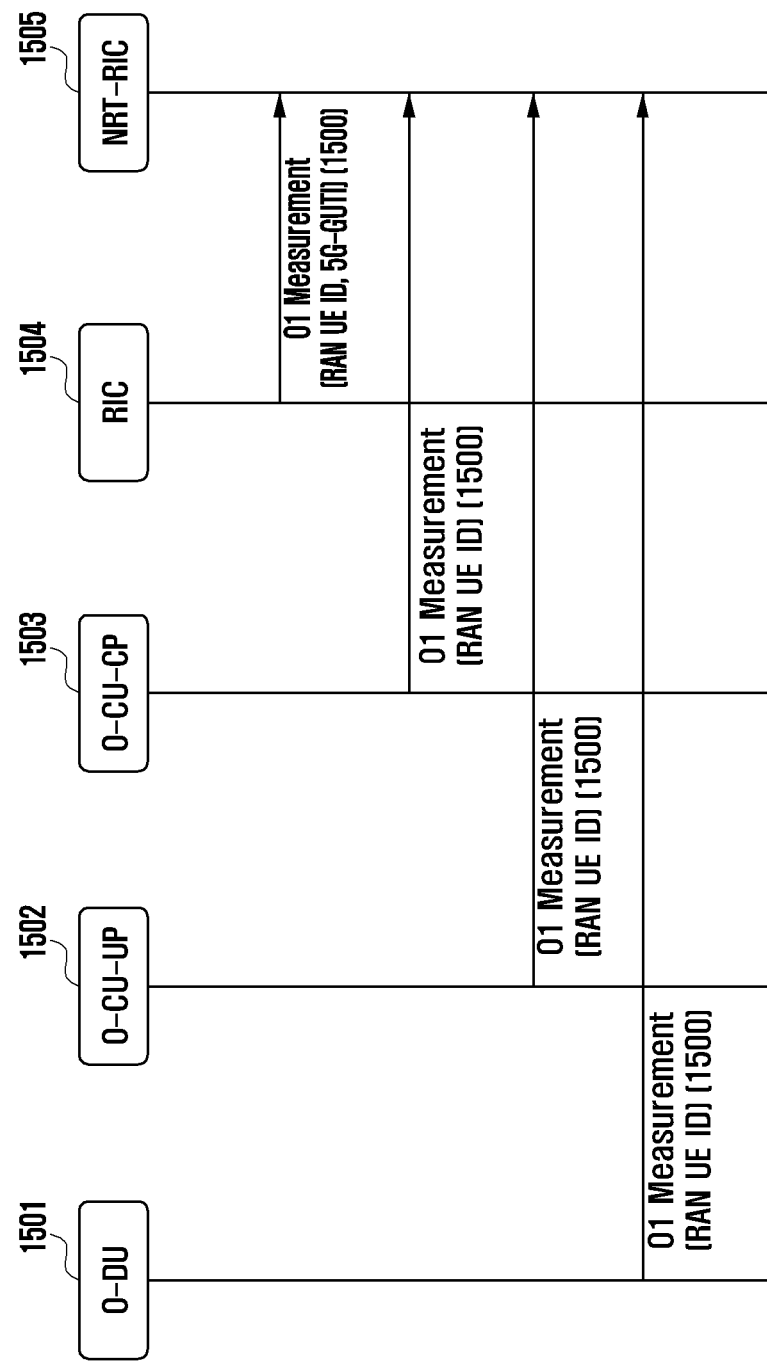
FIG. 15 illustrates a procedure in which an NRT-RIC defined in an O-RAN receives information classified for a specific UE from an O-DU, an O-CU-CP, and a RIC according to an embodiment of the disclosure.

FIG. 15 illustrates a procedure in which an NRT-RIC defined in the O-RAN receives information classified for a specific UE from an O-DU, an O-CU-CP, and a RIC according to an embodiment of the disclosure.

Referring to FIG. 15, an O-DU 1501, an O-CU-UP 1502, an O-CU-CP 1503, and a RIC 1504 transmit information on each UE identified by a RAN UE ID and information on each cell to a NRT-RIC 1505 through an O1 message defined in the O-RAN in operation 1500. The RIC 1504 also transmit 5G-GUTI information having a mapping relation with the RAN UE ID along with the RAN UE ID. (Although not illustrated), the information transmitted by the RIC 1504 may be measurement information of each UE received from the O-DU 1501, the O-CU-CP 1503, and the O-CU-UP 1502 along with the RAN UE ID. xApps of the RIC 1504 processes the received information for each UE, and transmits the processed information for each UE to the NRT-RIC 1505 along with the RAN UE ID and/or the 5G-GUTI.

The NRT-RIC 1505 collects information for each RAN UE ID which is transmitted by the O-DU 1501, the O-CU-UP 1502, the O-CU-CP 1503, and the RIC 1504 through an O-1 interface, make a connection to the 5G-GUTI transmitted by the RIC 1504, and stores the same. That is, the NRT-RIC 1505 may also store information corresponding to each user transmitted by the O-DU 1501, the O-CU-UP 1502, the O-CU-CP 1503, and the RIC 1504 on the basis of the 5G-GUTI. Further, the NRT-RIC 1505 may provide the collected information to the OSS and/or the BSS.

The RAN UE ID may be configured on the basis of the 5G-GUTI (in which case the NRT-RIC 1505 may acquire the 5G-GUTI according to a predetermined or a preset rule based on the RAN UE ID) or may be configured such that the content of the RAN UE ID is the same as the 5G-GUTI since a maximum length of the currently defined RAN UE ID is 64 bits and a length of the 5G-GUTI is 62 bits. In this case, the RIC 1504 may transmit only the RAN UE ID to the RIC 1504.

The RAN UE ID is only an example of a specific user identifier of the O-RAN, and the specific user identifier (or UE identifier) of the O-RAN may be used in the disclosure. The 5G-GUTI is only an example of a globally unique identifier of the UE (or user), and the globally unique identifier of the UE (or user) may be used in the disclosure.

In the procedure, operations must not be sequentially performed or all operations must not be necessarily performed, and the order thereof may be changed or a specific operation may be omitted. Further, another configuration illustrated in FIG. 15 may be added to the procedure, or a procedure illustrated in another figure may be combined with the procedure illustrated in FIG. 15. The name of the message illustrated in FIG. 15 is only an example, and the configuration of the disclosure may be applied to a method and a message similar to those used in the disclosure.

Figure 16:
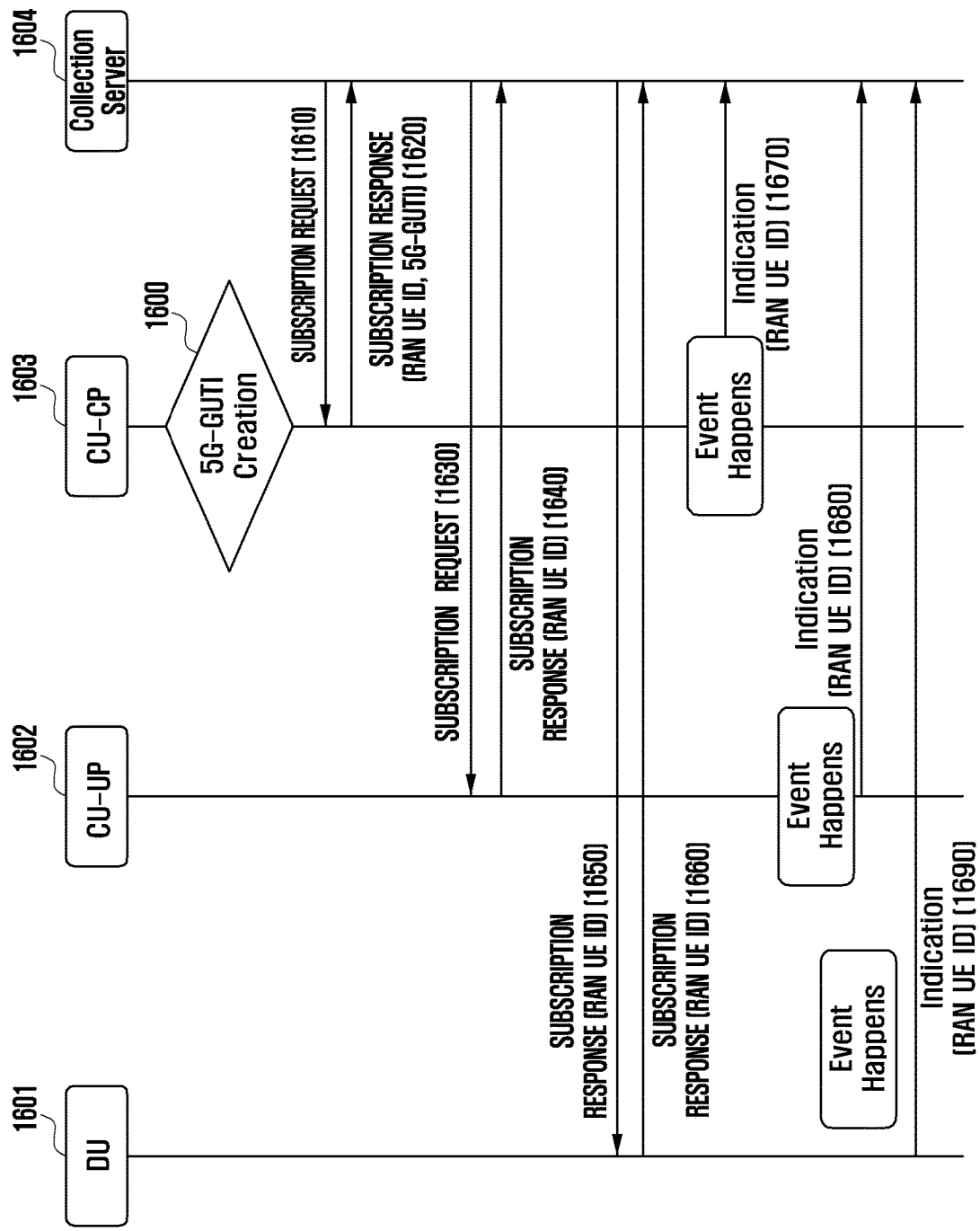
FIG. 16 illustrates a procedure in which a collection server receives information classified for a specific UE from a DU, a CU-UP, and a CU-CP defined in a 3GPP according to an embodiment of the disclosure.

FIG. 16 illustrates a procedure in which a collection server receives information classified for a specific UE from a DU, a CU-UP, and a CU-CP defined in the 3GPP according to an embodiment of the disclosure.

Referring to FIG. 16, in operation 1600, a CU-CP 1603 generates a 5G-GUTI by communicating with a UE and an AMF. The method may be performed to be the same as the above-described method. In operation 1610, a collection server 1604 transmits a SUBSCRIPTION REQUEST message to the CU-CP 1603 and, when a specific event is generated, transmits a report classified for each specific UE. In operation 1620, the CU-CP 1603 processes a request configured in operation 1610 (SUBSCRIPTION RESPONSE message) to the collection server, in which case the RAN UE ID defined in the 3GPP and the 5G-GUTI that is mapped to the RAN UE ID and configured in operation 1600 are also transmitted to the collection server.

The collection server may identify a UE for which the information is collected (that is, a 5G-GUTI which the UE has) on the basis of a mapping relation between the RNA UE ID and the 5G-GUTI. A detailed description thereof will be described below. The RAN UE ID is a unique value within a 3GPP 5G NR BS and may be configured as OAM by a service provider.

Although the disclosure describes an example in which the RAN UE ID and the 5G-GUTI are transmitted through the SUBSCRIPTION RESPONSE message, the CU-CP 1603 may configure the RAN UE ID on the basis of the 5G-GUTI (in which case the 5G-GUTI may be acquired according to a predetermined or a preset rule on the basis of the RAN UE ID received by the RIC) or the CU-CP 1603 may configure the content of the RAN UE ID to be the same as the 5G-GUTI since a maximum length of the currently defined RAN UE ID is 64 bits and a length of the 5G-GUTI is 62 bits. In this case, the CU-CP 1603 may transmit only the RAN UE ID to the RIC.

Further, the CU-CP 1603 may transmit the RAN UE ID (and the 5G-GUTI) to the collection server through a message other than the SUBSCRIPTION RESPONSE message, and the disclosure may be applied to the case.

In operation 1630, the collection server may transmit a SUBSCRIPTION REQUEST message to the CU-UP 1602, and when a specific event is generated, a reports classified for each specific UE is transmitted to the collection server. In operation 1640, the CU-UP 1602 may process a request according to operation 1630, insert the RAN UE ID defined in the 3GPP and the report for each RAN UE ID (UE-related information) into the SUBSCRIPTION RESPONSE message, and transmit the SUBSCRIPTION RESPONSE message.

In operation 1650, the collection server transmits a SUBSCRIPTION REQUEST message to the DU 1601, and when a specific event is generated, a report classified for each specific UE is transmitted to the collection server. In operation 1660, the DU 1601 processes a request according to a sixth procedure, insert the RAN UE ID defined in the 3GPP and the report for each RAN UE ID (UE-related information) into the SUBSCRIPTION RESPONSE message, and transmits the SUBSCRIPTION RESPONSE message to the collection server.

When the preset event is generated in operation 1610, the CU-CP 1603 transmits the information classified for each RAN UE ID to the collection server through an indication message defined by the collection server in operation 1670. The information may include one or more RAN UE IDs and information for each RAN UE ID.

When the preset event is generated in operation 1630, the CU-UP 1602 transmits the information classified for each RAN UE ID to the collection server through an indication message defined by the collection server in operation 1680. The information may include one or more RAN UE IDs and information for each RAN UE ID.

When the preset event is generated in operation 1650, the DU 1601 transmits the information classified for each RAN UE ID to the collection server through an indication message defined by the collection server in operation 1690. The information may include one or more RAN UE IDs and information for each RAN UE ID.

The collection server identifies a 5G-GUTI associated with the RAN UE ID and store information on each RAN UE ID transmitted by the CU-CP 1603, the CU-UP 1602, and the DU 1601 in operations 1620, 1640, and 1650 to be associated with the 5G-GUTI. That is, for one 5G-GUTI, information on a specific user transmitted by each of the CU-CP 1603, the CU-UP 1602, and the DU 1601 may be stored. At this time, since a plurality of CU-CPs and CU-UPs, and a plurality of DUs may be connected to the collection server, RAN UE IDs transmitted by the CU-CP 1603, the CU-UP 1602, and the DU 1601 may overall each other. The collection server may identify the 5G-GUTI on the basis of port information of the CU-CP 1603, the CU-UP 1602, and/or the DU 1601 transmitting the RAN UE ID (and information thereon) and the RAN UE ID or identify the 5G-GUTI on the basis of an RAN function ID and the RAN UE ID of the CU-CP 1603, the CU-UP 1602, and/or the DU 1601.

In the procedure, operations must not be sequentially performed or all operations must not be necessarily performed, and the order thereof may be changed or a specific operation may be omitted. Further, another configuration illustrated in FIG. 16 may be added to the procedure, or a procedure illustrated in another figure may be combined with the procedure illustrated in FIG. 16. A name of the message illustrated in FIG. 16 is only an example, and the configuration of the disclosure may be applied to a method and message similar to those used in the disclosure.

Figure 17:
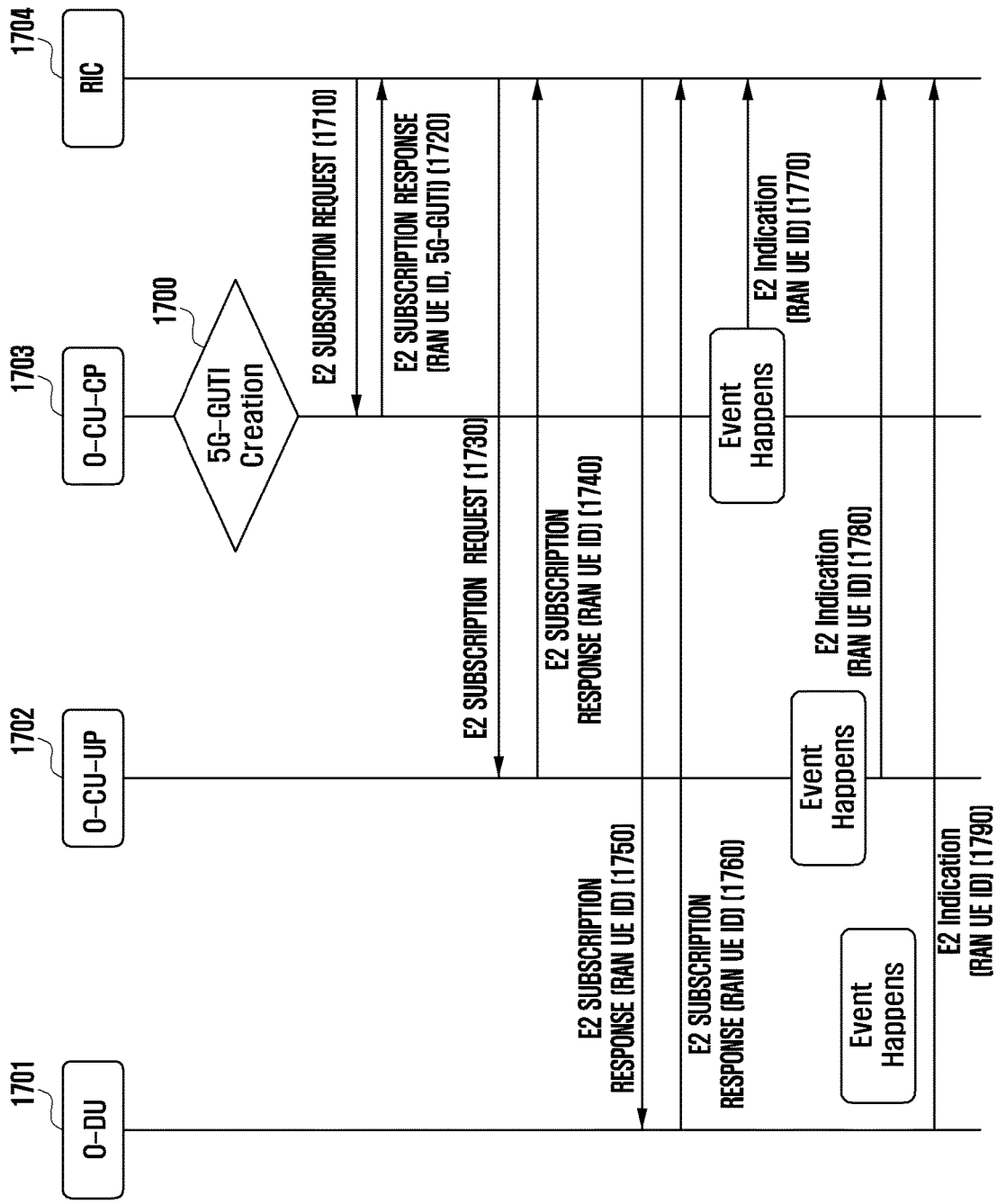
FIG. 17 illustrates a procedure in which a RIC receives information classified for a specific UE from an O-DU, an O-CU-UP, an O-CU-CP defined in an O-RAN according to an embodiment of the disclosure.

FIG. 17 illustrates a procedure in which a RIC receives information classified for a specific UE from an O-DU, an O-CU-UP, and an O-C-CP defined in the O-RAN according to an embodiment of the disclosure.

Referring to FIG. 17, in operation 1700, an O-CU-CP 1703 generates a 5G-GUTI by communicating with a UE and an AMF. The 5G-GUTI may be generated through the above-described method. In operation 1710, the RIC 1704 transmits an E2 SUBSCRIPTION REQUEST message defined in the O-RAN to the O-CU-CP 1703 and transmits a report classified for a specific UE when a specific event is generated. In operation 1720, the O-CU-CP 1703 processes a request of the RIC 1704 according to operation 1710, and inserts a RAN UE ID defined in the 3GPP and the 5G-GUTI, which is preset in a first procedure and mapped to the RAN UE ID, into an E2 SUBSCRIPTION RESPONSE message and transmits the E2 SUBSCRIPTION RESPONSE message to the RIC 1704.

The RIC 1704 may identify a UE for which the information is collected (that is, a 5G-GUTI which the UE has) on the basis of a mapping relation between the RNA UE ID and the 5G-GUTI. A detailed description thereof will be described below. The RAN UE ID is a unique value within a 3GPP 5G NR BS, and may be configured as OAM by a service provider.

Although the disclosure describes an example in which the RAN UE ID and the 5G GUTI are transmitted through the E2 E2-CP RIC SUBSCRIPTION RESPONSE message, the O-CU-CP 1703 may configure the RAN UE ID on the basis of the 5G-GUTI (in which case the 5G-GUTI may be acquired according to a predetermined or a preset rule based on the RAN UE ID received by the RIC 1704) or the O-CU-CP 1703 may configure the content of the RAN UE ID to be the same as the 5G-GUTI since a maximum length of the currently defined RAN UE ID is 64 bits and a length of the 5G-GUTI is 62 bits. In this case, the O-CU-CP 1703 may transmit only the RAN UE ID to the RIC 1704.

Further, the O-CU-CP 1703 may transmit the RAN UE ID (and the 5G-GUTI) to the RIC 1704 through a message other than the E2 E2-CP RIC SUBSCRIPTION RESPONSE message, and the disclosure may be applied to the case.

In operation 1730, the RIC 1704 may transmit the E2 SUBSCRIPTION REQUEST message defined in the O-RAN to the O-CU-UP 1702, and when a specific event is generated, a report classified for each specific UE is transmitted to the RIC 1704. In operation 1740, the O-CU-UP 1702 processes a request of the RIC 1704 in operation 1730 and transmits the RAN UE ID defined in the 3GPP and information on each RAN UE ID to the RIC 1704 along with the SUBSCRIPTION RESPONSE message.

In operation 1750, the RIC 1704 transmits an E2 SUBSCRIPTION REQUEST message to the O-DU 1701, and when a specific event is generated, a report classified for each specific UE is transmitted to the RIC 1704. In operation 1760, the O-DU 1701 processes a request from the RIC 1704 in operation 1750 and transmits the RAN UE ID defined in the 3GPP and information on each RAN UE ID to the RIC 1704 along with the SUBSCRIPTION RESPONSE message.

When the preset event is generated in operation 1710, the O-CU-CP 1703 transmits information classified for each RAN UE ID to the RIC 1704 through an E2 indication message defined by the RIC 1704 in operation 1770. The information may include one or more RAN UE IDs and information for each RAN UE ID. When the preset event is generated in operation 1730, the O-CU-CP 1703 transmits information classified for each RAN UE ID to the RIC 1704 through an E2 indication message defined by the RIC 1704 in operation 1780. The information may include one or more RAN UE IDs and information for each RAN UE ID. The information may include at least one piece of resource state information (buffer status) in the CU-UP, bearer state information such as the number of bearers, a CPU usage state, and KPI-related information (throughput of the UE and delay), and may be applied to the entirety of the disclosure without being limited to the example of FIG. 17.

When the preset event is generated in operation 1750, the O-DU 1701 transmits information classified for each RAN UE ID to the RIC 1704 through the indication message defined by the RIC 1704 in operation 1790. The information may include one or more RAN UE IDs and information for each RAN UE ID.

The RIC 1704 identifies a 5G-GUTI associated with the RAN UE ID and store information for each RAN UE ID transmitted by the O-CU-CP 1703, the O-CU-UP 1702, and the O-DU 1701 in operations 1720, 1740, and 1760 to be associated with the 5G-GUTI. That is, for one 5G-GUTI, information on a specific user transmitted by each of the O-CU-CP 1703 and the O-DU 1701 may be stored.

At this time, since a plurality of O-CU-CPs and O-CU-UPs and a plurality of O-DUs may be connected to the RIC 1704, RAN UE IDs transmitted by the O-CU-CP 1703, the O-CU-UP 1702, and the O-DU 1701 may overlap each other. At this time, the RIC 1704 may identify the 5G-GUTI on the basis of port information of the O-CU-CP 1703, the O-CU-UP 1702, and/or the O-DU 1701 transmitting the RAN UE ID (and information related thereto) and the RAN UE ID or configure the 5G-GUTI on the basis of the RAN function ID and the RAN UE ID of the O-CU-CP 1703, the O-CU-UP 1702, and/or the O-DU.

The RAN UE ID is only an example of a specific user identifier of the O-RAN, and a specific user identifier (or UE identifier) of the O-RAN may be used in the disclosure. The 5G-GUTI is only an example of a globally unique identifier of the UE (or user), and a globally unique identifier of the UE (or user) may be used in the disclosure.

In the procedure, operations must not be sequentially performed or all operations must not be necessarily performed, and the order thereof may be changed or a specific operation may be omitted. Further, another configuration illustrated in FIG. 17 may be added to the procedure, or a procedure illustrated in another figure may be combined with the procedure illustrated in FIG. 17. A name of the message illustrated in FIG. 17 is only an example, and the configuration of the disclosure may be applied to a method and message similar to those used in the disclosure. A name of the message illustrated in FIG. 17 is only an example, and the configuration of the disclosure may be applied to a method and message similar to those used in the disclosure.

One or more of the methods according to the disclosure may be combined and used.

Figure 18:
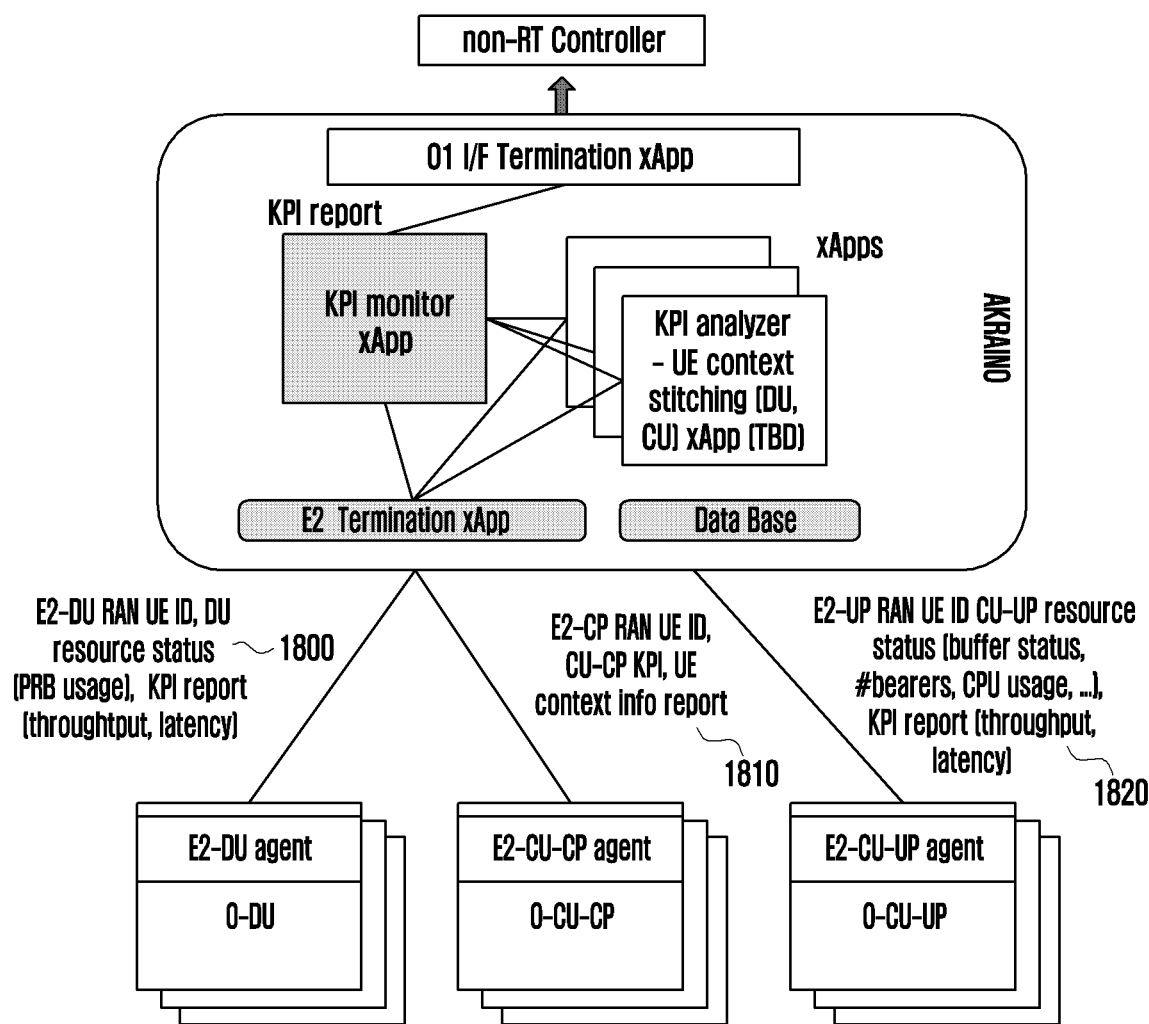
FIG. 18 illustrates an example of using a UE identifier based on a 5G-GUTI proposed by the disclosure is used in an O-RAN according to an embodiment of the disclosure.

FIG. 18 illustrates an example of using a UE identifier based on a 5G-GUTI is used in the O-RAN according to an embodiment of the disclosure.

Referring to FIG. 18, reference numeral 1800 indicates an example in which the O-DU measures an amount of the use of physical resource blocks (PRBs) for each network slice or each cell (interchangeably used with physical layer resources, radio resources, or time-frequency resources), throughput, and latency and transmits information on each user to the RIC along with the RAN UE ID on the basis of the KPI report and the 5G-GUTI.

Reference numeral 1810 indicates an example in which the O-CU-CP measures network slice-specific or cell-specific KPI and transmits information on each user to the RIC along with the RAN UE ID on the basis of the 5G-GUTI. At this time, the 5G-GUTI may also be transmitted.

Reference numeral 1820 indicates an example in which the O-CU-UP measures throughput for each network slice, each cell, or each bearer, and CPU usage and transmits information on each user to the RIC along with the RAN UE ID (and 5G-GUTI) on the basis of the 5G-GUTI such as a KPI report, resource usage, and an overload indication.

The transmitted information may be received by an E2 Termination xApp and may be stored in a database for each 5G-GUTI. The xAPP serving as a KPI monitor based on the stored information may analyze whether KPI of each UE is achieved, the analysis result (KPI report) may be collected for each UE, and generated information may be transmitted to the NRT RIC through O1 interface xApps.

The RIC and the NRT-RIC may optimize resources to provide service required for each UE on the basis of information stored for each 5G-GUTI. Specifically, the RIC or the NRT-RIC may allow the UE to use additional radio resources through carrier aggregation or dual connectivity or control mobility of the UE.

Figure 19:
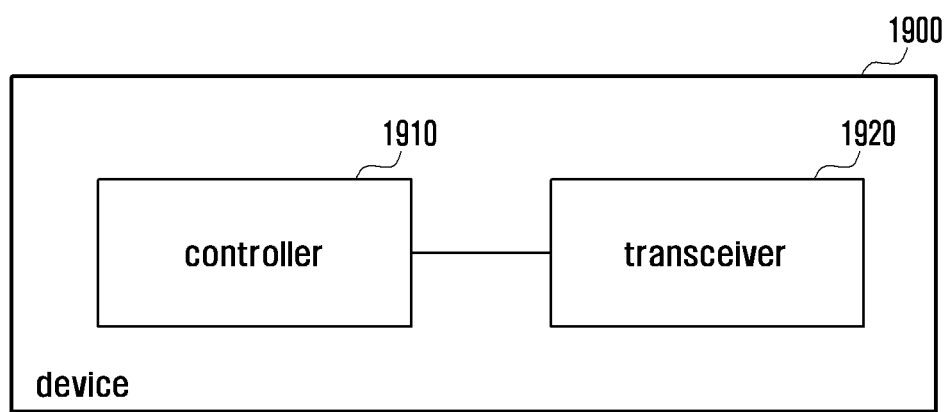
FIG. 19 illustrates a device for implementing the disclosure according to an embodiment of the disclosure.

FIG. 19 illustrates a device capable of implementing the disclosure according to an embodiment of the disclosure.

Referring to FIG. 19, a device 1900 according to the disclosure may include a controller 1910 and a transceiver 1920, and further include a storage unit which is not illustrated. The controller 1910 may operate to perform at least one of the functions of a RIC, an NRT-RIC, an O-CU-CP, an O-CU-UP, an O-DU, a CU-CP, a CU-UP, and a DU, and the transceiver 1920 may be controlled by the controller 1910 to transmit and receive the messages. The storage unit may store information included in a received message and information on each UE.

Figure 20:
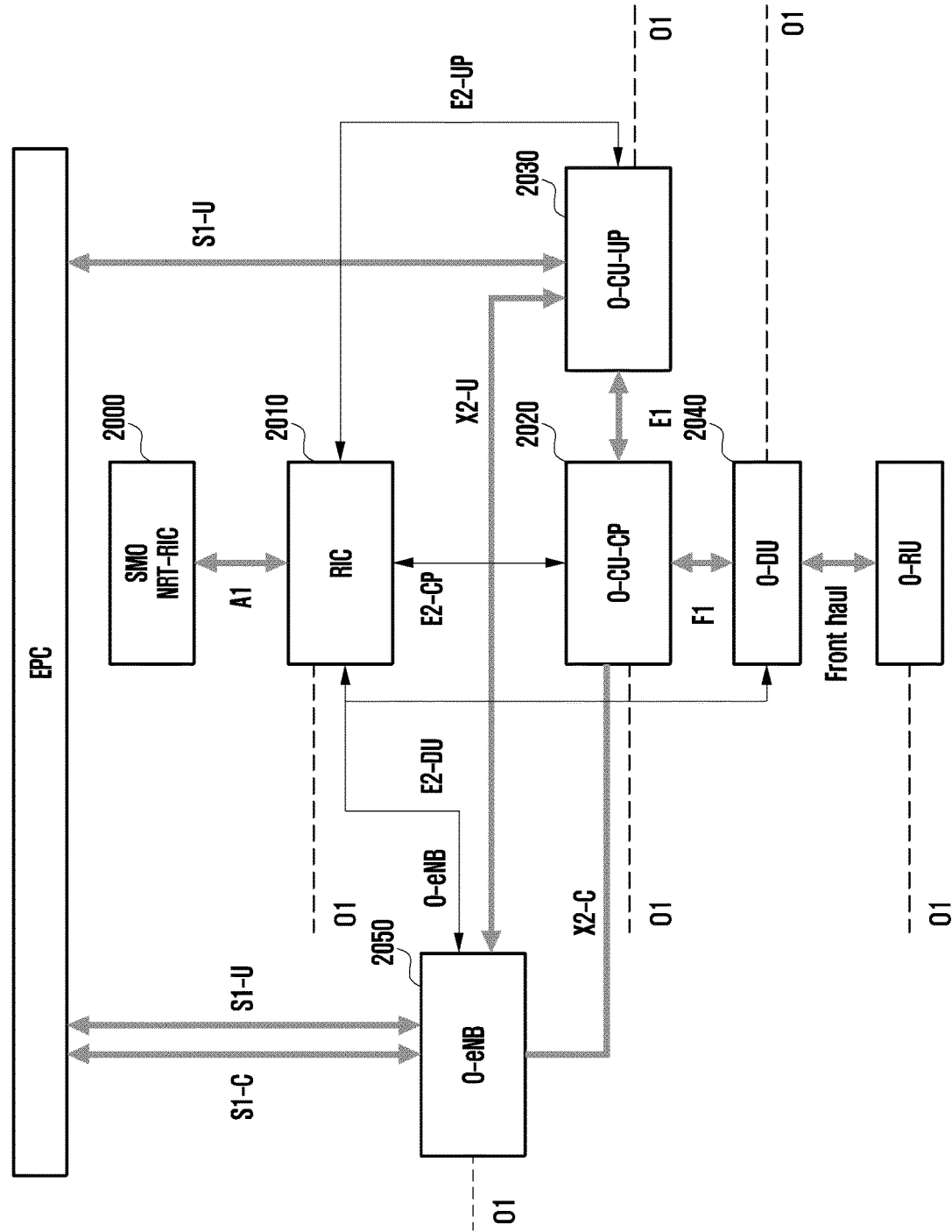
FIG. 20 illustrates an example of a 5G non-standard alone (NSA) system defined in an O-RAN according to an embodiment of the disclosure.

FIG. 20 illustrates a 3GPP non-standard alone (NSA) supporting system of an O-RAN network system according to an embodiment of the disclosure.

Referring to FIG. 20, the 3GPP NSA network uses dual connectivity that simultaneously uses 4G and 5G while supporting the conventional 4G (eNB) function and additionally using 5G (gNB). The O-RAN standard uses newly defined non-real time RAN intelligent controller (NRT-RIC) 2000, (near-real time) RAN intelligent controller (RIC) 2010, an O-CU-CP 2020, an O-CU-UP 2030, and an O-DU 2040 and additionally supports an NSA scheme that supports an eNB 2050 of 4G LTE. At this time, the RIC 2010 and/or the NRT-RIC 2000 performs near-real-time control and optimize LTE and 5G RAN elements and resources on the basis of data collected from an O-RAN O-eNB through an E2-eNB interface between the RIC 2010 and an O-eNB 2050 defined in the O-RAN. To this end, the O-eNB 2050 may transmit call-related information and measurement-related information for a specific UE to the RIC 2010.

Figure 21:
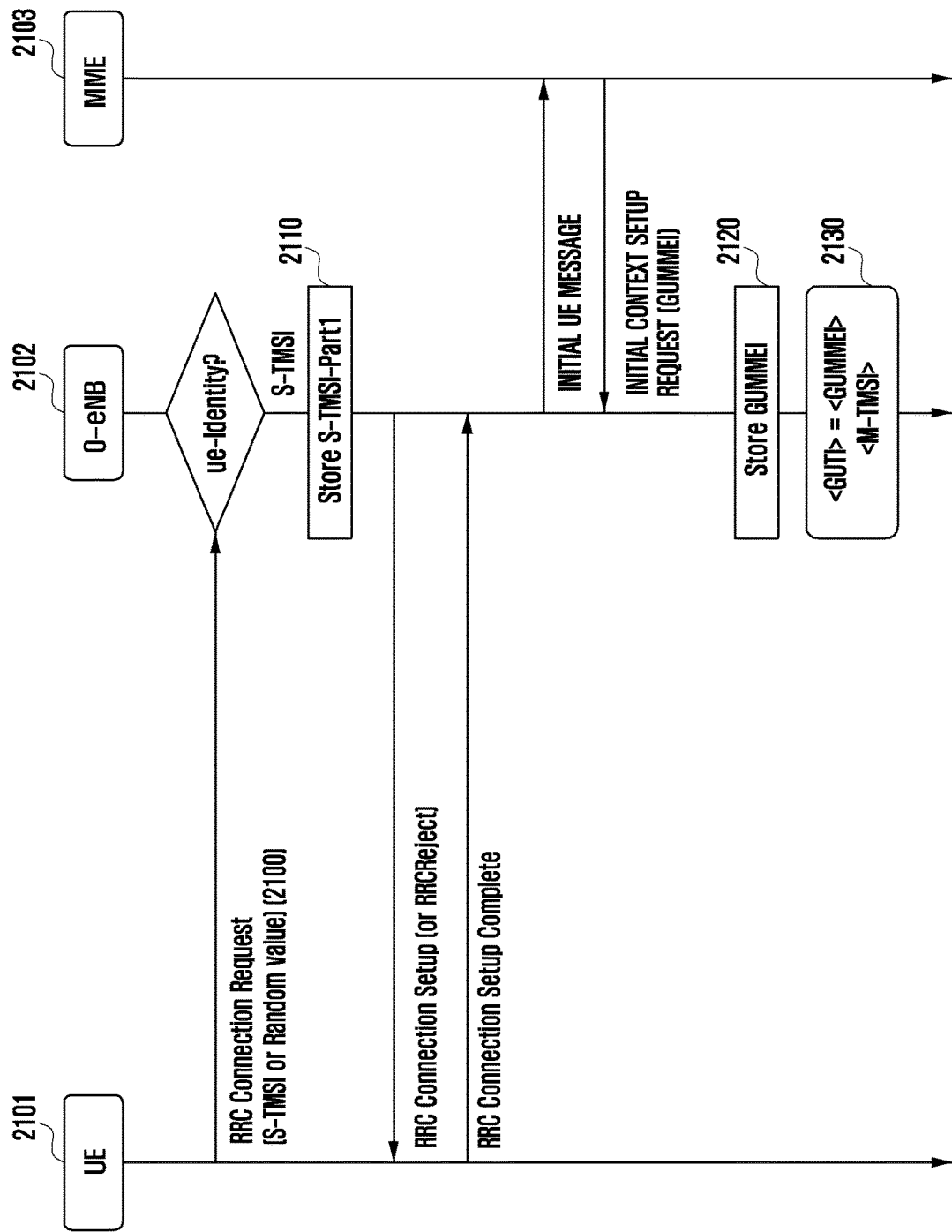
FIG. 21 illustrates a procedure in which an eNB to which a UE makes call access acquires a GUTI in the case of NSA EN-DC defined in an O-RAN according to an embodiment of the disclosure.

FIG. 21 illustrates a procedure in which an eNB to which a UE makes call access acquires a GUTI in the case of NSA EN-DC defined in the O-RAN according to an embodiment of the disclosure. Like the 3GPP NSA, in the O-RAN NSA, a message for call access is transmitted to an MME through an O-eNB, and then dual-connectivity is supported through establishment of an X2 interface with a gNB. Accordingly, an initial call access process is the same as 4G LTE.

Referring to FIG. 21, in operation 2100, a UE 2101 inserts 40 bits of an S-TMSI value allocated by the core network into an RRC connection request message and transmits the RRC connection request message to an O-eNB 2102 in initial setup according to a call access procedure defined in the 3GPP standard. In operation 2110, the O-eNB 2102 stores the S-TMSI value transmitted by the UE 2101. Thereafter, the O-eNB 2102 transmits an RRCConnection-Setup message to the UE 2101, and the UE 2101 transmits RRCConnectionSetupComplete message to the O-eNB 2102 in response thereto. Thereafter, the O-eNB 2102 transmits an initial UE message to an MME 2103. In operation 2120, the O-eNB 2102 of the O-RAN stores a GUMMEI value, which is inserted into an S1AP INITIAL CONTEXT SETUP REQUEST message and transmitted by the MME 2103, according to the call access procedure defined in the 3GPP standard. In operation 2130, the O-RAN O-eNB 2102 identifies an M-TMSI on the basis of the S-TMSI stored in operation 2110 and generates a GUTI by concatenating the M-TMSI with a lower part of the GUMMEI received in operation 2120.

In the procedure, operations must not be sequentially performed or all operations must not be necessarily performed, and the order thereof may be changed or a specific operation may be omitted. Further, another configuration illustrated in FIG. 21 may be added to the procedure, or a procedure illustrated in another figure may be combined with the procedure illustrated in FIG. 21.

Figure 22:
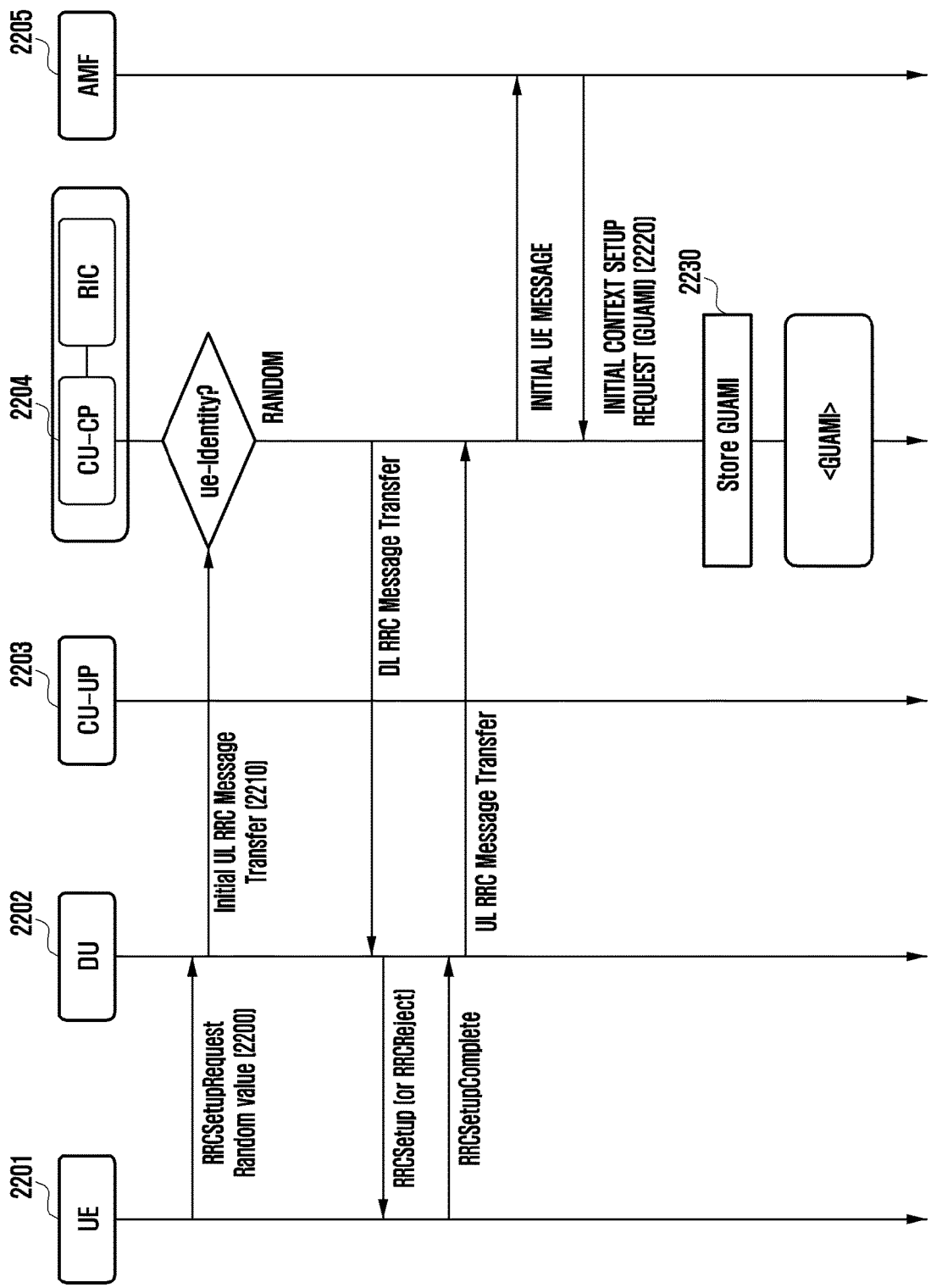
FIG. 22 illustrates a procedure in which a CU-CP of a 5G RAN defined in a 3GPP acquires a GUAMI when a UE performs initial attach according to an embodiment of the disclosure.

FIG. 22 illustrates a procedure in which a CU-CP of a 5G RAN defined in the 3GPP acquires a GUAMI when a UE performs initial attach (initial access) according to an embodiment of the disclosure.

Referring to FIG. 22, when there is no 5G SAE-temporary mobile subscriber identity (5G-S-TMSI) value allocated by the 5G core network in initial setup, a UE 2201 performing initial attach according to the call access procedure defined in the 3GPP standard inserts a random value into an RRC-SetupRequest message and transmits the RRCSetupRequest message in operation 2200. A DU 2202 inserts the random value received in operation 2200 into an F1 initial UL RRC message transfer message and transmits the F1 initial UL RRC message transfer message to a CU-CP 2204 according to the call access procedure defined in the 3GPP in operation 2210. FIG. 22 also includes a CU-UP 203.

Thereafter, the CU-CP 2204 transfers a DL RRC message to the DU 2202, and the DU 2202 transmits an RRCSetup message (or an RRCReject message) to the UE 2201. The UE 2201 receiving the RRCSetup message transmits an RRCSetupComplete message to the DU 2202, and the DU 2202 transmits a UL RRC message transfer to the CU-CP 2204.

The CU-CP 2204 transmits an initial UE message to an AMF 2205, and the AMF 2205 transmits an NGAP INITIAL CONTEXT SETUP REQUEST message to the CU-CP 2204 according to the 3GPP call access procedure in operation 2220. The CU-CP 2204 stores the GUAMI which is inserted into the NGAP INITIAL CONTEXT SETUP REQUEST and transmitted by the AMF 2205 in operation 2230. In the procedure, the GUAMI stored by the CU-CP 2204 may be used as an identifier for uniquely identifying the UE 2201 within a 3GPP gNB such as a RAN UE ID, and the identifier may be replaced with a 5G-GUTI in a UE additional access scenario in the future. Further, a value based on the GUAMI rather than the GUAMI may be used as an identifier of the UE 2201 (for example, a RAN UE ID), and such a method is similar to a method using the 5G-GUTI as the identifier of the UE 2201, and thus the described method may be referenced.

In the procedure, operations must not be sequentially performed or all operations must not be necessarily performed, and the order thereof may be changed or a specific operation may be omitted. Further, another configuration illustrated in FIG. 22 may be added to the procedure, or a procedure illustrated in another figure may be combined with the procedure illustrated in FIG. 8.

Figure 23:
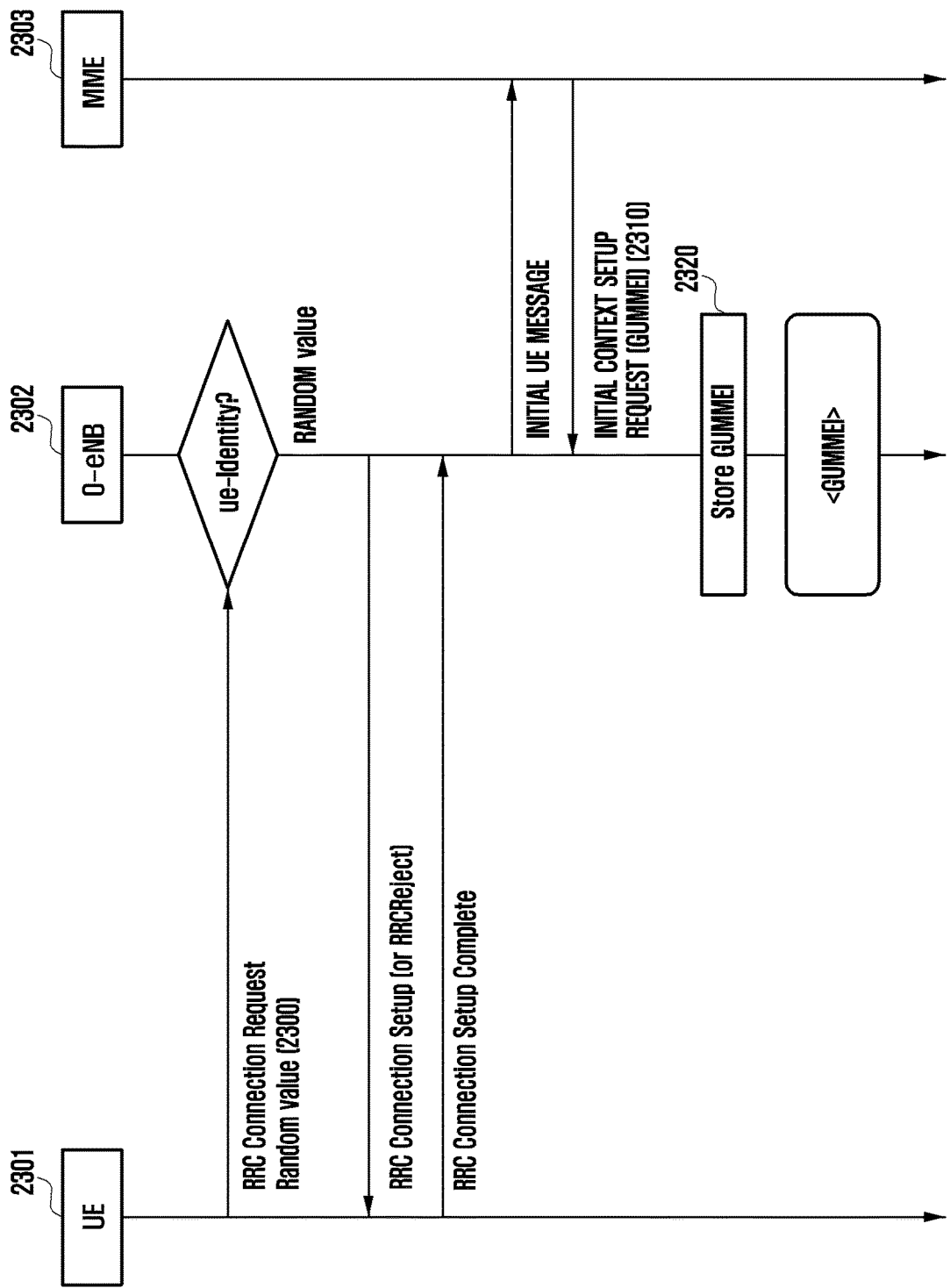
FIG. 23 illustrates a procedure in which an eNB of a 4G RAN defined in a 3GPP acquires a GUMMEI when a UE performs initial attach according to an embodiment of the disclosure.

FIG. 23 illustrates a procedure in which an eNB to which a UE makes call access acquires a GUMMEI in the case of 4G LTE defined in the O-RAN according to an embodiment of the disclosure. The call access is transmitted to an MME through an O-eNB.

Referring to FIG. 23, when there is no S-TMSI value allocated by the core network in initial setup, a UE 2301 performing initial attach according to the call access procedure defined in the 3GPP standard inserts a random value into an RRC connection request message and transmits the RRC connection request message to an O-eNB 2302 of the O-RAN in operation 2300. The O-eNB 2302 transmits an RRCConnectionSetup message to the UE 2301, and the UE 2301 transmits RRCConnectionSetupComplete message to the O-eNB 2302 in response thereto. Thereafter, the O-eNB 2302 transmits an initial UE message to an MME 2303.

The O-eNB 2302 of the O-RAN receives an S1AP INITIAL CONTEXT SETUP REQUEST message from the MME 2303 according to the call access procedure defined in the 3GPP standard in operation 2310, and stores a GUMMEI value which is inserted into the S1AP INITIAL CONTEXT SETUP REQUEST and transmitted by the MME 2303 in operation 2320. In the procedure, the GUMMEI value stored by the O-eNB 2302 may be used as an identifier for uniquely identifying the UE 2301 within a 3GPP gNB such as a RAN UE ID, and the identifier may be replaced with a GUTI in a UE additional access scenario in the future. Further, a value based on the GUMMEI rather than the GUMMEI may be used as an identifier of the UE 2301 (for example, a RAN UE ID), and such a method is similar to a method using the 5G-GUTI or the GUTI as the identifier of the UE 2301, and thus the described method may be referenced.

In the procedure, operations must not be sequentially performed or all operations must not be necessarily performed, and the order thereof may be changed or a specific operation may be omitted. Further, another configuration illustrated in FIG. 23 may be added to the procedure, or a procedure illustrated in another figure may be combined with the procedure illustrated in FIG. 23.

Figure 24:
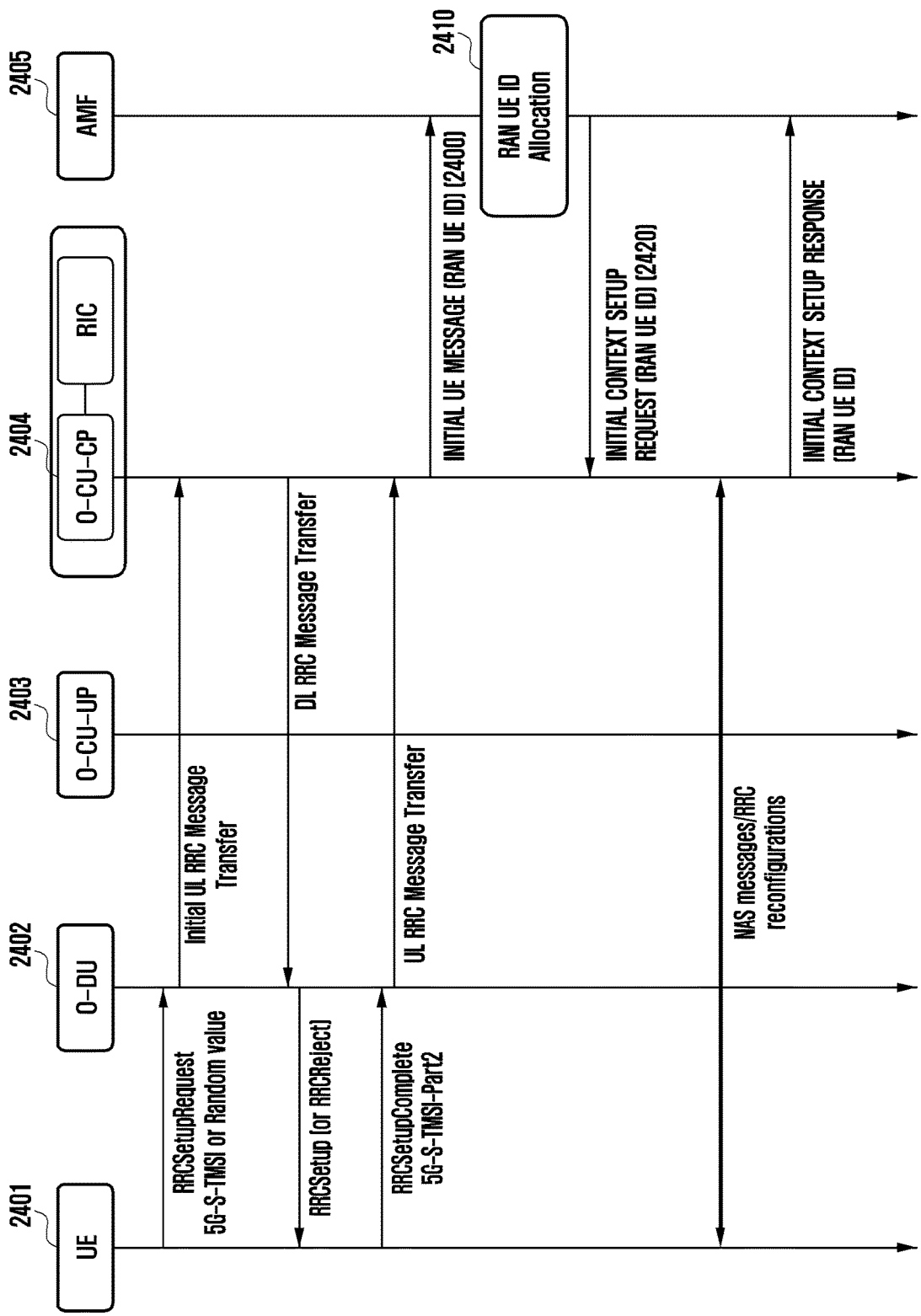
FIG. 24 illustrates an example of a procedure in which an O-CU-CP of a 5G RAN defined in an O-RAN allocates a globally unique RAN UE ID in a core network when a UE performs initial attach according to an embodiment of the disclosure.

FIG. 24 illustrates an example of a procedure in which an O-CU-CP of a 5G RAN defined in the O-RAN allocates a unique RAN UE ID to a service provider network allocated by the core network when a UE performs initial attach according to an embodiment of the disclosure.

Referring to FIG. 24, a UE 2401 performs an RRC setup procedure with an O-DU 2402 and an O-CU-CP 2404 according to the call access procedure defined in the 3GPP standard, and the procedure may refer to FIG. 8. In operation 2400, the O-CU-CP 2404 transmits an NGAP initial UE message including a RAN UE ID defined in initial setup or configured by the OAM to the AMF. Alternatively, the O-CU-CP 2404 may transmit the RAN UE ID without inserting the RAN UE ID into the NGAP initial UE message. In operation 2410, the AMF 2405 stores the RAN UE ID, which is inserted into the NGAP initial UE message and transmitted by the O-CU-CP 2404 according to the call access procedure defined in the 3GPP standard, as a 5G-GUTI that is a value for globally uniquely identifying the UE 2401 newly configured by the AMF 2405. That is, the RAN UE ID is configured as the 5G-GUTI.

Further, rather than the 5G-BUTI, a combination of a value based on the 5G-GUTI or a GUAMI and a new user identifier, a value based on a GUAMI and a new user identifier, a value shared with the core network including a GUAMI, or a value based on a value shared with the core network including a GUAMI may be used as a RAN UE ID or an identifier of the UE 2401 (in the O-RAN) (for example, a GUAMI and a new user identifier). The value shared with the core network may be the value described with reference to FIG. 14. A method of using information other than the 5G-GUTI as the RAN UE ID or the identifier of the UE 2401 may refer to a method of identifying the UE 2401 within a service provider PLMN. That is, the RAN UE ID or the identifier of the UE 2401 may be determined on the basis of the identifier of the UE 2401 used within the service provider PLMN.

In operation 2420, the AMF 2405 inserts the RAN UE ID stored in operation 2410 into an NGAP INITIAL CONTEXT SETUP REQUEST message and transmits the NGAP INITIAL CONTEXT SETUP REQUEST message to the O-CU-CP 2404 according to the call access procedure defined in the 3GPP standard. The O-CU-CP 2404 stores the RAN UE ID which is inserted into the NGAP INITIAL CONTEXT SETUP REQUEST message and transmitted by the AMF 2405 according to the call access procedure defined in the 3GPP standard.

Thereafter, the UE 2401 and the O-CU-CP 2404 may perform an RRC reconfiguration procedure according to the 3GPP standard, and the O-CU-CP 2404 may insert the stored RAN UE ID into an NGAP INITIAL CONTEXT SETUP RESPONSE message and transmits the NGAP INITIAL CONTEXT SETUP RESPONSE message to the AMF 2405 in response to the NGAP INITIAL CONTEXT SETUP REQUEST.

In the procedure, operations must not be sequentially performed or all operations must not be necessarily performed, and the order thereof may be changed or a specific operation may be omitted. Further, another configuration illustrated in FIG. 9 may be added to the procedure, or a procedure illustrated in another figure may be combined with the procedure illustrated in FIG. 24. FIG. 24 also includes an O-CU-UP 2403.

Figure 25:
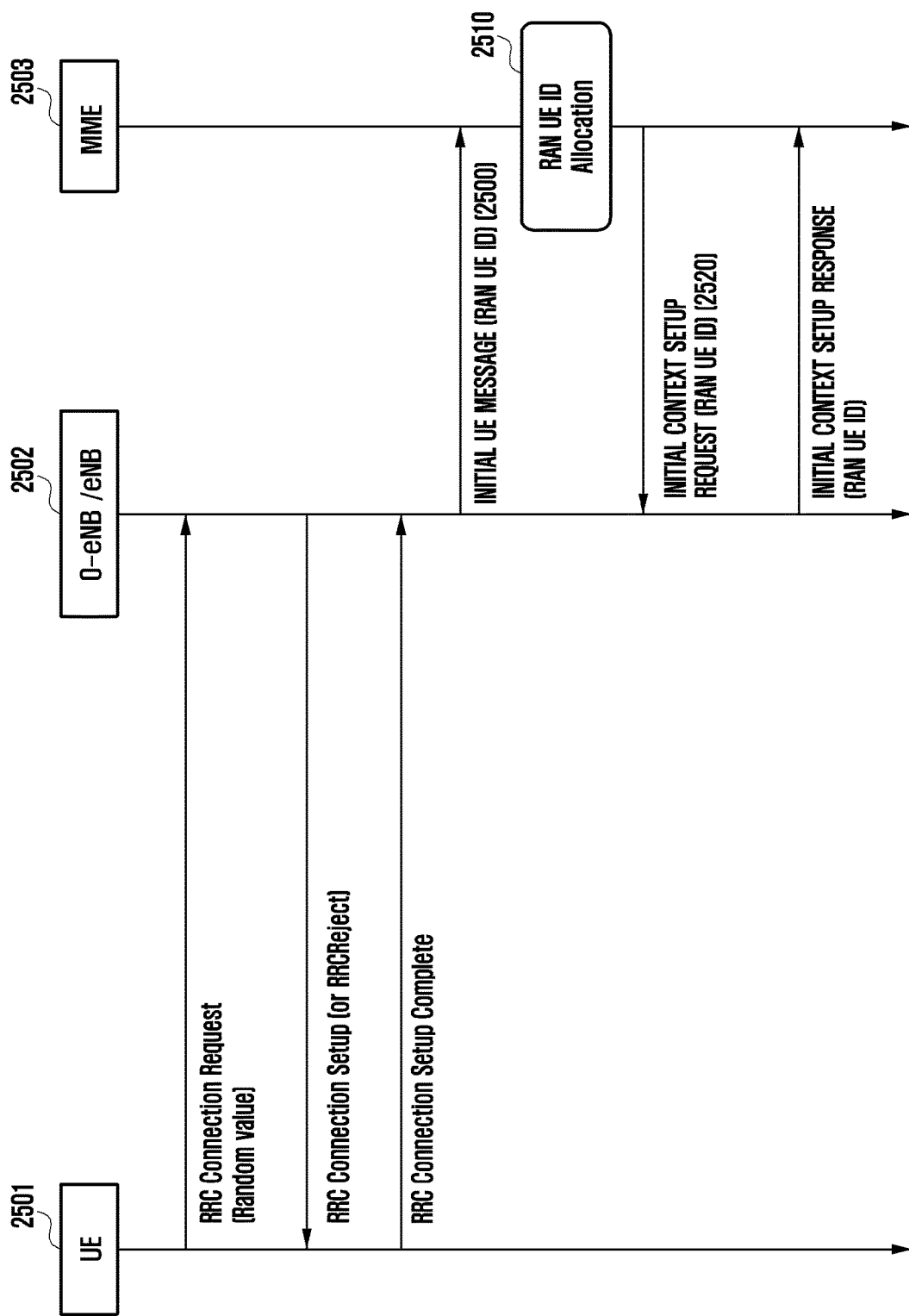
FIG. 25 illustrates a procedure in which an eNB in LTE/NSA defined in an O-RAN allocates a globally unique RAN UE ID in a core network when a UE performs initial attach according to an embodiment of the disclosure.

FIG. 25 illustrates an example of a procedure in which an O-RAN eNB (O-eNB) (or eNB) in the 5G NSA and O-RAN LTE network structure defined in the O-RAN allocates a unique RAN UE ID to a service provider network allocated by the core network when a UE performs initial attach according to an embodiment of the disclosure.

Referring to FIG. 25, a UE 2501 performs an RRC connection setup procedure with an O-eNB 2502 according to the call access procedure defined in the 3GPP standard, and the procedure may refer to FIG. 10. In operation 2500, the O-eNB 2502 inserts a RAN UE ID defined in initial setup or configured by the OAM into an S1 initial UE message and transmits the S1 initial UE message to the MME 2503. Alternatively, the O-eNB 2502 may transmit the RAN UE ID without inserting the RAN UE ID into the S1 initial UE message. In operation 2510, the MME stores the RAN UE ID, which is inserted into the S1 initial UE message and transmitted by the O-eNB 2502 according to the call access procedure defined in the 3GPP standard, as a GUTI that is a value for globally uniquely identifying the UE 2501 newly configured by the MME. That is, the RAN UE ID is configured as the GUTI.

Further, rather than the GUTI, a combination of a value based on the GUTI or a GUMMEI and a new user identifier, a value based on a GUMMEI and a new user identifier, a value shared with the core network including a GUMMEI, or a value based on a value shared with the core network including a GUMMEI may be used as a RAN UE ID or an identifier of the UE 2501 (in the O-RAN) (for example, a GUMMEI and a new user identifier). The value shared with the core network may be the value described with reference to FIG. 14. A method of using information other than the GUTI as the RAN UE ID or the identifier of the UE 2501 may refer to a method of identifying the UE 2501 within a service provider PLMN. That is, the RAN UE ID or the identifier of the UE 2501 may be determined on the basis of the identifier of the UE 2501 used within the service provider PLMN.

In operation 2520, the MME inserts the RAN UE ID stored in operation 2510 into an S1 INITIAL CONTEXT SETUP REQUEST message and transmits the S1 INITIAL CONTEXT SETUP REQUEST message according to the call access procedure defined in the 3GPP standard. The O-eNB 2502 stores the RAN UE ID which is inserted into the S1 INITIAL CONTEXT SETUP REQUEST message and transmitted by the MME according to the call access procedure defined in the 3GPP standard. Thereafter, the O-eNB 2502 may transmit an S1 INITIAL CONTEXT SETUP RESPONSE message including the stored RAN UE ID to the MME in response to the S1 INITIAL CONTEXT SETUP REQUEST message.

In the procedure, operations must not be sequentially performed or all operations must not be necessarily performed, and the order thereof may be changed or a specific operation may be omitted. Further, another configuration illustrated in FIG. 25 may be added to the procedure, or a procedure illustrated in another figure may be combined with the procedure illustrated in FIG. 25.

Figure 26:
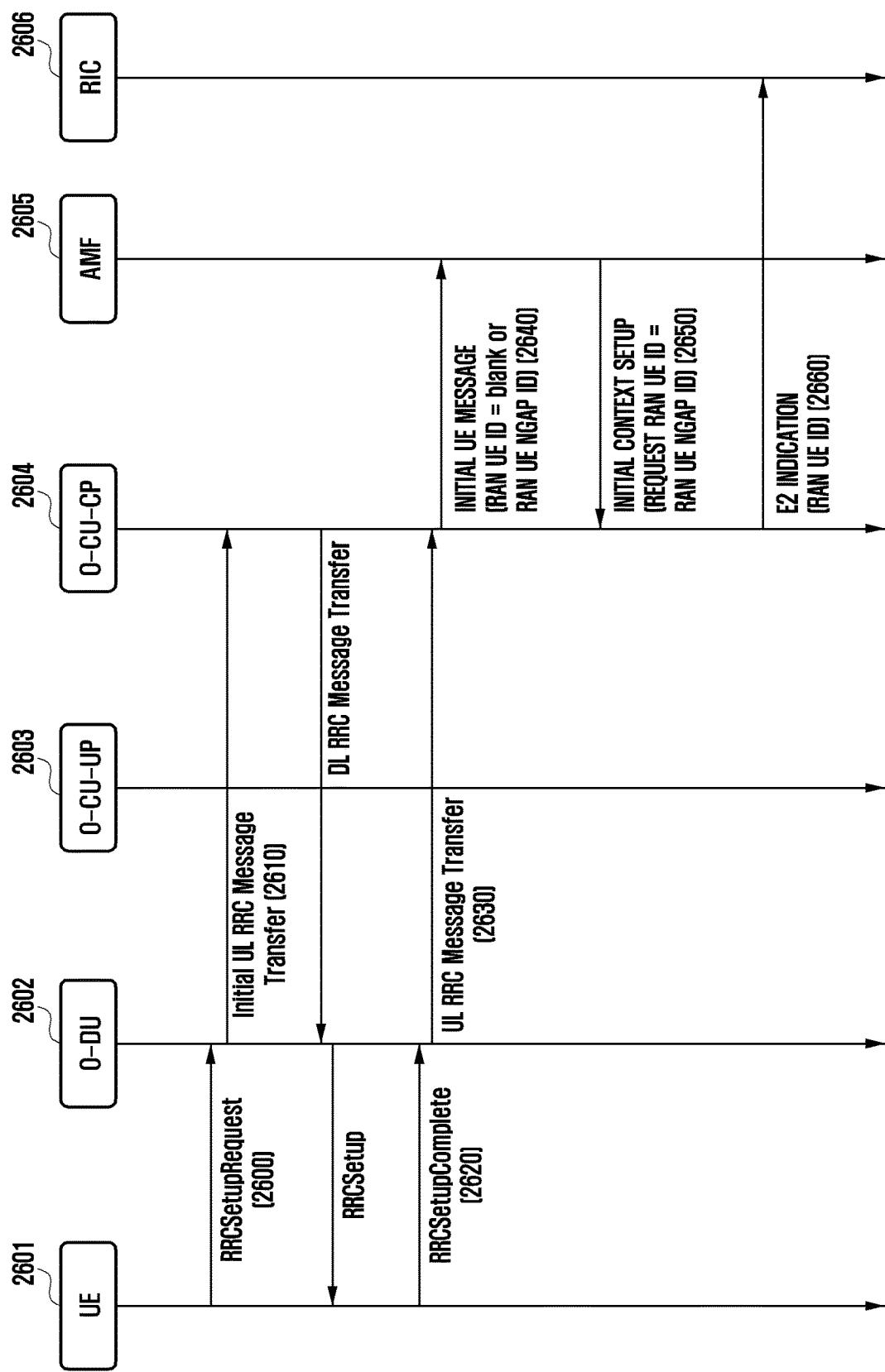
FIG. 26 illustrates an example of a procedure in which an O-CU-CP of a 5G RAN defined in the O-RAN allocates a RAN UE NGAP ID used for NGAP configuration with the core network as a RAN UE ID when a UE performs initial attach according to an embodiment of the disclosure.

FIG. 26 illustrates an example of a procedure in which an O-CU-CP of a 5G RAN defined in the O-RAN allocates a RAN UE NGAP ID used for NGAP configuration with the core network as a RAN UE ID when a UE 2501 performs initial attach according to an embodiment of the disclosure.

Referring to FIG. 26, a UE 2601 performs an RRC setup procedure with an O-DU 2602 and an O-CU-CP 2604 according to the call access procedure defined in the 3GPP standard, and the procedure may refer to FIG. 8. Specifically, the UE 2601 transmits an RRCSetupRequest message to the O-DU 2602 in operation 2600, and the O-DU 2602 transmits an F1 initial UL RRC message transfer message to the O-CU-CP 2604 according to the call access procedure defined in the 3GPP standard in operation 2610. Thereafter, the O-CU-CP 2604 transfers a DL RRC message to the O-DU 2602, and the O-DU 2602 transmits an RRCSetup message to the UE 2601. The UE 2601 receiving the RRCSetup message transmits an RRCSetupComplete message to the O-DU 2602 in operation 2620, and the O-DU 2602 transmits a UL RRC Message Transfer to the O-CU-CP 2604 in operation 2630.

The O-CU-CP 2604 configures a RAN UE NGAP ID defined in initial setup or used by an NGAP interface with the AMF 2605 as a RAN UE ID and transmits an NGAP Initial UE message to the AMF 2605 in operation 2640. Alternatively, the O-CU-CP 2604 may transmit the RAN UE ID without inserting the RAN UE ID into the NGAP Initial UE message. A detailed description of the RAN UE NGAP ID is made with reference to FIG. 27. The RAN UE NGAP ID may be integers of 32 bits, but is not limited thereto.

The AMF 2605 stores the RAN UE ID configured as the RAN UE NGAP ID, which is inserted into the NGAP initial UE message and transmitted by the O-CU-CP 2604 according to the call access procedure defined in the 3GPP standard, or stores the RAN UE ID as a 5G-GUTI that is a value for globally uniquely identifying the UE 2601 newly configured by the AMF. That is, the RAN UE ID is configured as a RAN UE NGAP ID or a 5G-GUTI (by the AMF).

Further, a combination of a value based on the 5G-GUTI or a GUAMI and a new user identifier, a value based on a GUAMI and a new user identifier, a value shared with the core network including a GUAMI, or a value based on a value shared with the core network including a GUAMI may be used as a RAN UE ID or an identifier of the UE 2601 (in the O-RAN) (for example, a GUAMI and a new user identifier) rather than using the 5G-GUTI as the RAN UE ID. The value shared with the core network may be the value described with reference to FIG. 14. Alternatively, a method of using information other than the 5G-GUTI as the RAN UE ID or the identifier of the UE 2601 may refer to a method of identifying the UE 2601 within a service provider PLMN. That is, the RAN UE ID or the identifier of the UE 2601 may be determined on the basis of the identifier of the UE 2601 used within the service provider PLMN.

In operation 2650, the AMF 2605 inserts the stored RAN UE ID into an NGAP INITIAL CONTEXT SETUP REQUEST message and transmits the NGAP INITIAL CONTEXT SETUP REQUEST message to the O-CU-CP 2604 according to the call access procedure defined in the 3GPP standard. The O-CU-CP 2604 stores the RAN UE ID which is inserted into the NGAP INITIAL CONTEXT SETUP REQUEST message and transmitted by the AMF according to the call access procedure defined in the 3GPP standard.

Thereafter, the UE 2601 and the O-CU-CP 2604 may perform an RRC reconfiguration procedure according to the 3GPP standard, and the O-CU-CP may insert the stored RAN UE ID into an NGAP INITIAL CONTEXT SETUP RESPONSE message and transmits the NGAP INITIAL CONTEXT SETUP RESPONSE message to the AMF in response to the NGAP INITIAL CONTEXT SETUP REQUEST. Thereafter, the O-CU-CP 2604 may insert the RAN UE ID into an E2 indication message and transmits the E2 indication message to a RIC 2606, and at least one node of the O-DU 2602 and the O-CU-UP 2603 may also transmit the E2 indication message to the RIC 2606.

In the procedure, operations must not be sequentially performed or all operations must not be necessarily performed, and the order thereof may be changed or a specific operation may be omitted. Further, another configuration illustrated in FIG. 26 may be added to the procedure, or a procedure illustrated in another figure may be combined with the procedure illustrated in FIG. 26.

FIG. 27 illustrates a RAN UE NGAP ID specified in the 3GPP standard according to an embodiment of the disclosure.

Referring to FIG. 27, the RAN UE NGAP ID is an identifier used in the RAN when the O-CU-CP 2604 and the AMF establish the NGAP connection. This is an identifier of uniquely identifying the UE (or association with the UE) in an NG interface with a BS (gNB or an NG-RAN node).

Figure 28:
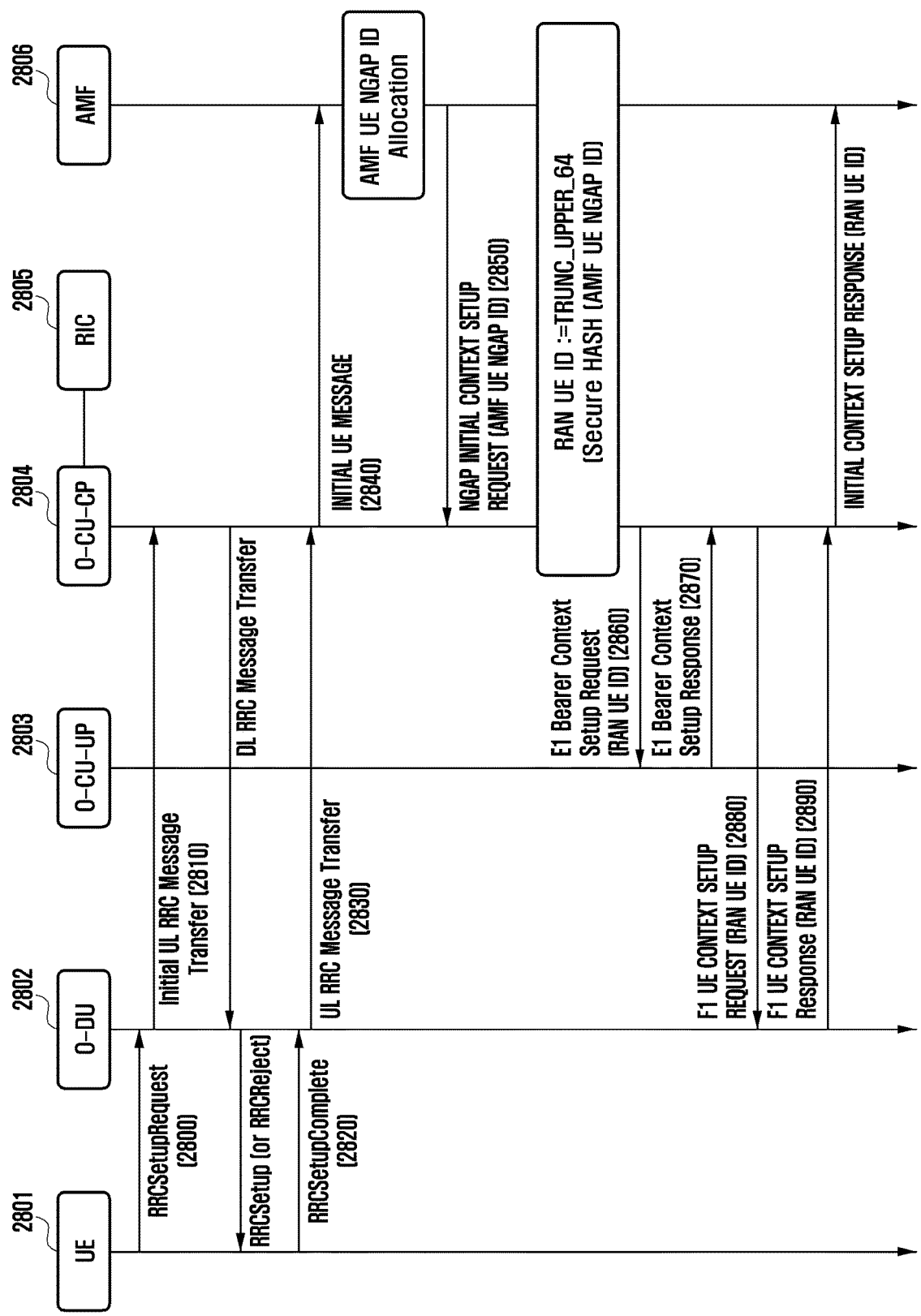
FIG. 28 illustrates an example of a procedure in which an O-CU-CP of a 5G RAN defined in an O-RAN allocates an AMF UE NGAP ID used for NGAP configuration with a core network as a RAN UE ID when a UE performs initial attach according to an embodiment of the disclosure.

FIG. 28 illustrates an example of a procedure in which an O-CU-CP of a 5G RAN defined in the O-RAN allocates an AMF UE NGAP ID used for NGAP configuration with the core network as a RAN UE ID when a UE performs initial attach according to an embodiment of the disclosure.

Referring to FIG. 28, a UE 2801 performs an RRC setup procedure with an O-DU 2802 and an O-CU-CP 2804 according to the call access procedure defined in the 3GPP standard, and the procedure may refer to FIG. 8. Specifically, the UE 2801 transmits an RRCSetupRequest message to the O-DU 2802 in operation 2800, and the O-DU 2802 transmits an F1 initial UL RRC message transfer message to the O-CU-CP 2804 according to the call access procedure defined in the 3GPP standard in operation 2810. Thereafter, the O-CU-CP 2804 transfers a DL RRC message to the O-DU 2802, and the O-DU 2802 transmits an RRCSetup message to the UE 2801. The UE 2801 receiving the RRCSetup message transmits an RRCSetupComplete message to the O-DU 2802 in operation 2820, and the O-DU 2802 transmits a UL RRC Message Transfer to the O-CU-CP 2804 in operation 2830.

The O-CU-CP 2804 configures a RAN UE NGAP ID defined in initial setup or used by an NGAP interface with the AMF 2806 as a RAN UE ID and transmits an NGAP Initial UE message to the AMF 2806 in operation 2840. Alternatively, the O-CU-CP 2804 may transmit the RAN UE ID without inserting the RAN UE ID into the NGAP Initial UE message. A detailed description of the RAN UE NGAP ID is made with reference to FIG. 27. The RAN UE NGAP ID may be integers of 64 bits, but is not limited thereto.

The AMF 2806 configures the RAN UE ID (configured as the RAN UE NGAP ID, which is inserted into the NGAP initial UE message and transmitted by the O-CU-CP) according to the call access procedure defined in the 3GPP standard as the 5G-GUTI that is a value for globally uniquely identifying the UE 2801 newly configured by the AMF 2806 or allocates and stores an AMF UE NGAP ID used for identifying the UE 2801 by the AMF. That is, the RAN UE ID is configured as an AMF UE NGAP ID or a 5G-GUTI (by the AMF). Further, a combination of a value based on a 5G-GUTI, a combination of a GUAMI and a new user identifier, a value based on a GUAMI and a new user identifier, a value shared with the core network including a GUAMI, or a value based on a value shared with the core network including a GUAMI may be used as a RAN UE ID or an identifier of the UE 2801 (in the O-RAN) rather than using the 5G-GUTI as the RAN UE ID.

FIG. 29 illustrates the detailed configuration of an AMF UE NGAP ID according to an embodiment of the disclosure.

Referring to FIG. 29, the AMF UE NGAP ID is an identifier allocated to uniquely identify a UE in an NG interface with an AMF, and may be uniquely configured within an AMF set. For example, the AMF UE NGAP ID may be 40 bits, and when the BS receives the AMF UE NGAP ID, the BS should store the AMF UE NGAP ID of a specific UE while a UE-related logical NG-connection of the specific UE is maintained, and the AMF UE NGAP ID should be inserted into NGAP signaling. In the case of LTE, an MME UE S1AP ID may be used instead of the AMF UE NGAP ID.

FIG. 30 illustrates the configuration of an MME UE S1AP ID according to an embodiment of the disclosure.

Referring to FIG. 30, similar to the AMF UE NGAP ID, the MME UE S1AP ID is an identifier allocated to uniquely identify a UE connected to one MME through an S1-MME interface and may be 32 bits. In the case of an LTE system, the MME instead of the AMF of FIG. 28 may allocate the MME UE S1AP ID as the RAN UE ID. Further, any identifier used for identifying the UE by the AMF or the MME may replace the AMF UE NGAP ID or the MME UE S1AP ID without using the AMF UE NGAP ID and the MME UE S1AP ID.

Alternatively, the AMF (or MME) may generate a bitstream by applying 128-bit or 256-bit SECURE HASH FUNCTION defined in the 3GPP or SECURE HASH FUNCTION defined in national institute of standards and technology (NIST) or Internet engineering task force (IETF) to the generated RAN UE ID, truncate the bitstream by 64 bits according to the 64 bits corresponding to the length of the RAN UE ID, and then configure the same as the RAN UE ID. This may be the application of a security function to make finding the conventional AMF NGAP UE ID (or MME UE S1AP ID) or the 5G-GUTI impossible on the basis of the RAN UE ID. The detailed content of SECURE HASH(SH) 64 bits TRUNCATION is illustrated in FIG. 31.

Figure 31:
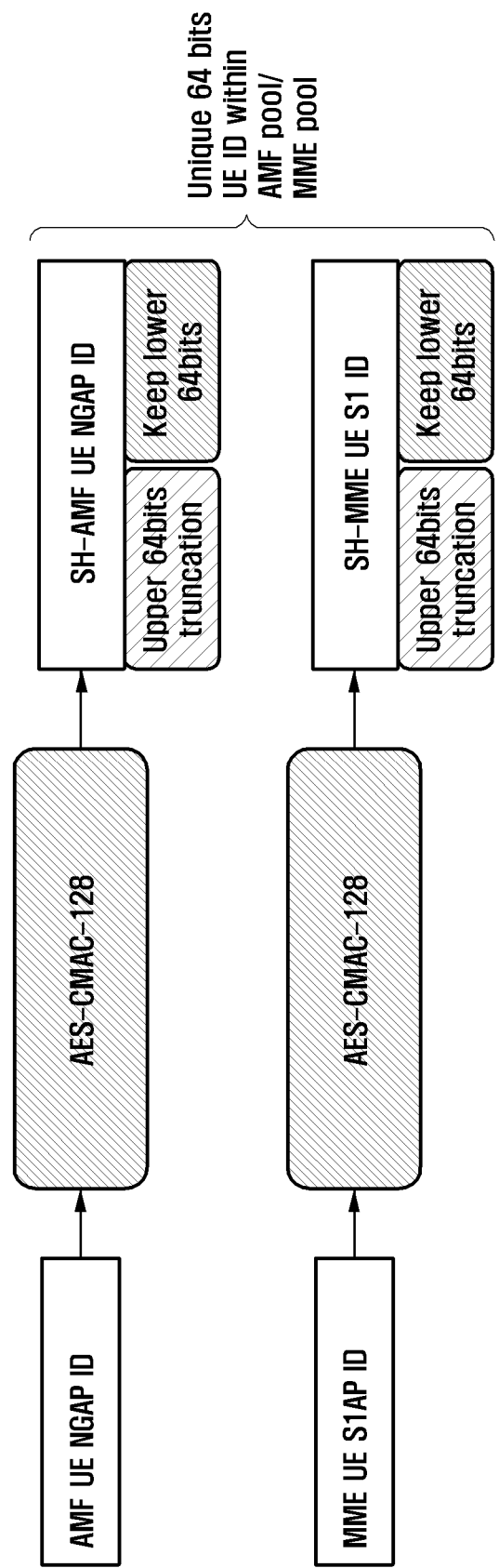
FIG. 31 illustrates an example of generating a UE identifier of 64 bits through a hash function according to an embodiment of the disclosure.

FIG. 31 illustrates an example of generating 128 bits through AES-CMAC on the basis of the AMF UE NGAP ID or the MME UE S1AP ID, truncating upper 64 bits of the generated 128 bits, and generating lower 64 bits as an SH-AMF UE NGAP ID or an SH-MME UE S1AP ID to use the same as the RAN UE ID according to an embodiment of the disclosure.

Referring to FIG. 31, the UE identifier of 64 bits may be an ID for uniquely identifying the UE in an AMF pool or an MME pool. FIG. 31 is only an example of generating the identifier of the UE through the hash function, and the disclosure is not limited thereto.

The value shared with the core network may be the value described with reference to FIG. 14. Alternatively, a method of using information other than the 5G-GUTI as the RAN UE ID or the identifier of the UE may refer to a method of identifying the UE within a service provider PLMN. That is, the RAN UE ID or the identifier of the UE may be determined on the basis of the identifier of the UE used within the service provider PLMN.

In operation 2850, the AMF 2806 inserts the stored RAN UE ID into an NGAP INITIAL CONTEXT SETUP REQUEST message and transmits the NGAP INITIAL CONTEXT SETUP REQUEST message to the O-CU-CP 2804 according to the call access procedure defined in the 3GPP standard. The O-CU-CP 2804 stores, as the RAN UE ID, the AMF UE NGAP ID which is inserted into the NGAP INITIAL CONTEXT SETUP REQUEST message and transmitted by the AMF 2806 according to the call access procedure defined in the 3GPP standard.

Alternatively, the O-CU-CP 2804 may generate a bitstream by applying the SECURE HASH FUNCTION defined in the 3GPP or the 128-bit or 256-bit SECURE HASH FUNCTION defined in the NIST or IETF to the AMF UE NGAP ID, which is inserted in to the NGAP INITIAL CONTEXT SETUP REQUEST message and transmitted by the AMF 2906, truncate the bitstream by 64 bits according to 64 bits corresponding to the length of the RAN UE ID, and configure the same as the RAN UE ID. This may be the application of a security function to make finding the conventional AMF NGAP UE ID or the 5G-GUTI impossible on the basis of the RAN UE ID.

The O-CU-CP 2804 inserts the configured RAN UE ID into an E1 Bearer Context Setup Request message specified in the 3GPP standard, transmits the E1 Bearer Context Setup Request message to the O-CU-UP 2803, and receives an E1 Bearer Context Setup Response message in operations 2860 and 2870, and also inserts the RAN UE ID into an F1 UE CONTEXT SETUP REQUEST message specified in the 3GPP standard, transmits the F1 UE CONTEXT SETUP REQUEST message to the O-DU 2802, and receives an F1 UE CONTEXT SETUP RESPONSE message in operations 2880 and 2890.

Thereafter, the UE 2801 and the O-CU-CP 2804 performs an RRC reconfiguration procedure according to the 3GPP standard, and the O-CU-CP 2804 inserts the stored RAN UE ID into an NGAP INITIAL CONTEXT SETUP RESPONSE message and transmits the NGAP INITIAL CONTEXT SETUP RESPONSE message to the AMF 2806 in response to the NGAP INITIAL CONTEXT SETUP REQUEST.

In the procedure, operations must not be sequentially performed or all operations must not be necessarily performed, and the order thereof may be changed or a specific operation may be omitted. Further, another configuration illustrated in FIG. 28 may be added to the procedure, or a procedure illustrated in another figure may be combined with the procedure illustrated in FIG. 28.

Figure 32:
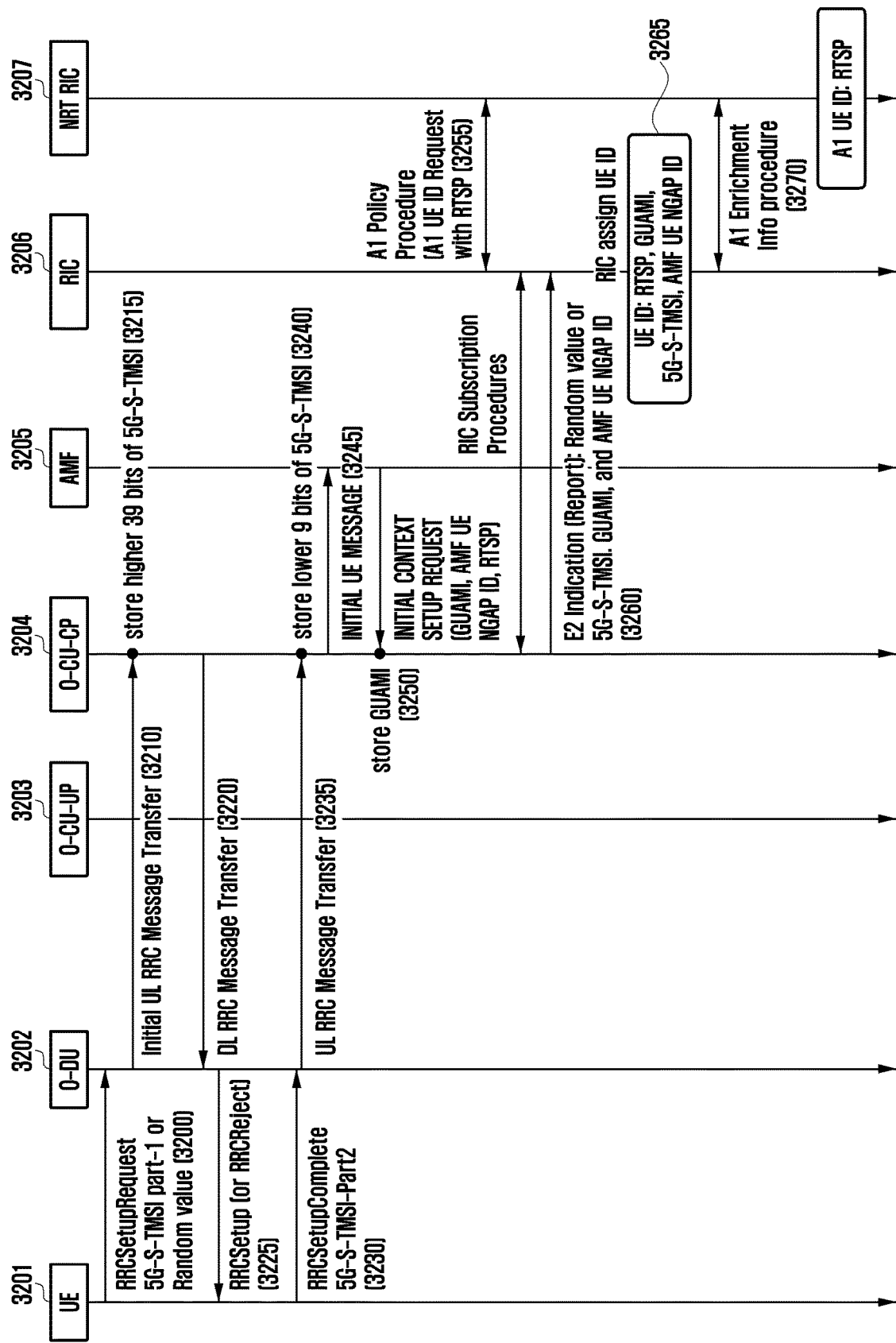
FIG. 32 illustrates an example in which an NRT-RIC manages information related to a UE-ID for each RFSP group according to an embodiment of the disclosure.

FIG. 32 illustrates a procedure in which an O-CU-CP of a 5G RAN defined in the O-RAN generates a list of information for each UE on the basis of a 5G-S-TMSI, GUAMI, and AMF UE NGAP ID for each RAT/frequency selection priority (RFSP) group received from a UE and an AMF and transmits the list to a RIC, and the RIC generates a list of the information for each UE on the basis of at least one of the 5G-S-TMSI, GUAMI, and AMF UE NGAP ID for each RFSP group, allocates a UE ID, and transmits the information to an NRT-RIC through an A1 enrichment information message, and the NRT RIC performs management related to a UE ID for each RFSP group according to an embodiment of the disclosure.

Referring to FIG. 32, in operation 3200, a UE 3201 inserts upper 39 bits of a 5G-S-TMSI value (or random value and, hereinafter, may be interchangeably used with a random value) allocated by the core network into an RRCSetupRequst message in initial setup according to the call access procedure defined in the 3GPP standard and transmits the RRCSetupRequest message to an O-DU 3202. In operation 3210, the O-DU 3202 inserts the upper 39 bits of the 5G-S-TMSI value received in operation 3200 into an F1 initial UL RRC message transfer message and transmits the F1 initial UL RRC message transfer message to an O-CU-CP 3204 according to the call access procedure defined in the 3GPP standard. In operation 3215, the O-CU-CP 3204 stores the upper 39 bits of the 5G-S-TMSI value, which was inserted into the F1 message and transmitted by the O-DU 3202. Thereafter, the O-CU-CP 3204 transfers a DL RRC message to the O-DU 3202 in operation 3220, and the O-DU 3202 transmits an RRCSetup message (or an RRCReject message) to the UE in operation 3225.

When the O-DU 3202 transmits the RRCSetup message, the UE inserts lower 9 bits of the 5G-S-TMSI value allocated by the core network into an RRCSetupComplete message in the initial setup and transmits the RRCSetupComplete message to the O-DU 3202 according to the call access procedure defined in the 3GPP standard in operation 3230. In operation 3235, the O-DU 3202 inserts the lower 9 bits of the 5G-S-TMSI value received in operation 3230 into an F1 UL RRC message transfer message and transmits the F1 UL RRC message transfer message to the O-CU-CP 3204 according to the call access procedure defined in the 3GPP standard. In operation 3240, the O-CU-CP 3204 stores the lower 9 bits of the 5G-S-TMSI value, which was inserted into the F1 message and transmitted by the O-DU 3202. The O-CU-CP 3204 transmits an initial UE message to an AMF 3205 in operation 3245, and stores at least one of a GUAMI value, an AMF UE NGAP ID, and an RFSP value, which is inserted into a NGAP INITIAL CONTEXT SETUP REQUEST message and transmitted by the AMF, according to the call access procedure defined in the 3GPP standard in operation 3250. The RFSP is a RAT/frequency selection priority and is used to designate a specific service group to which the UE 3201 belongs in a 5G system.

An NRT RIC 3207 transmits a policy related to the specific RFSP group to a RIC 3206 through an A1 policy message regardless of the order of the procedure in operation 3255.

Thereafter, the O-CU-CP 3204 performs RIC subscription procedures specified in the O-RAN standard with the RIC 3206, inserts at least one of a GUAMI, 5G-S-TMSI, and AMF UE NGAP ID of each UE having the RFSP as a representative key into an E2 indication (report) message on the basis of at least one of GUAMI, 5G-S-TMSI, and AMF UE NFAP ID of UEs belonging to the specific group RFSP designated through a subscription message by the RIC 3206 and transmits the E2 indication (report) message to the RIC 3206 in operation 3260. The RIC 3206 assigns a UE ID to each UE on the basis of the GUAMI, 5G-S-TMSI, AMF UE NGAP ID of UEs belongings to the RFSP received through the E2 indication message and stores at least one of the RFSP GUAMI, 5G-S-TMSI, and AMF UE NGAP ID for each UE ID in operation 3265.

The RIC 3206 transmits a UE ID list to the NRT RIC 3207 in response to the A1 policy message or the A1 enrichment info message as the part of the A1 enrichment procedure in operation 3270. The UE ID list included in the response message includes at least one of the RFSP GUAMI, 5G-S-TMSI, and AMF UE NGAP ID of each UE.

In the procedure, operations must not be sequentially performed or all operations must not be necessarily performed, and the order thereof may be changed or a specific operation may be omitted. Further, another configuration illustrated in FIG. 32 may be added to the procedure, or a procedure illustrated in another figure may be combined with the procedure illustrated in FIG. 32. FIG. 32 also includes an O-CU-UP 3203.

Figure 33:
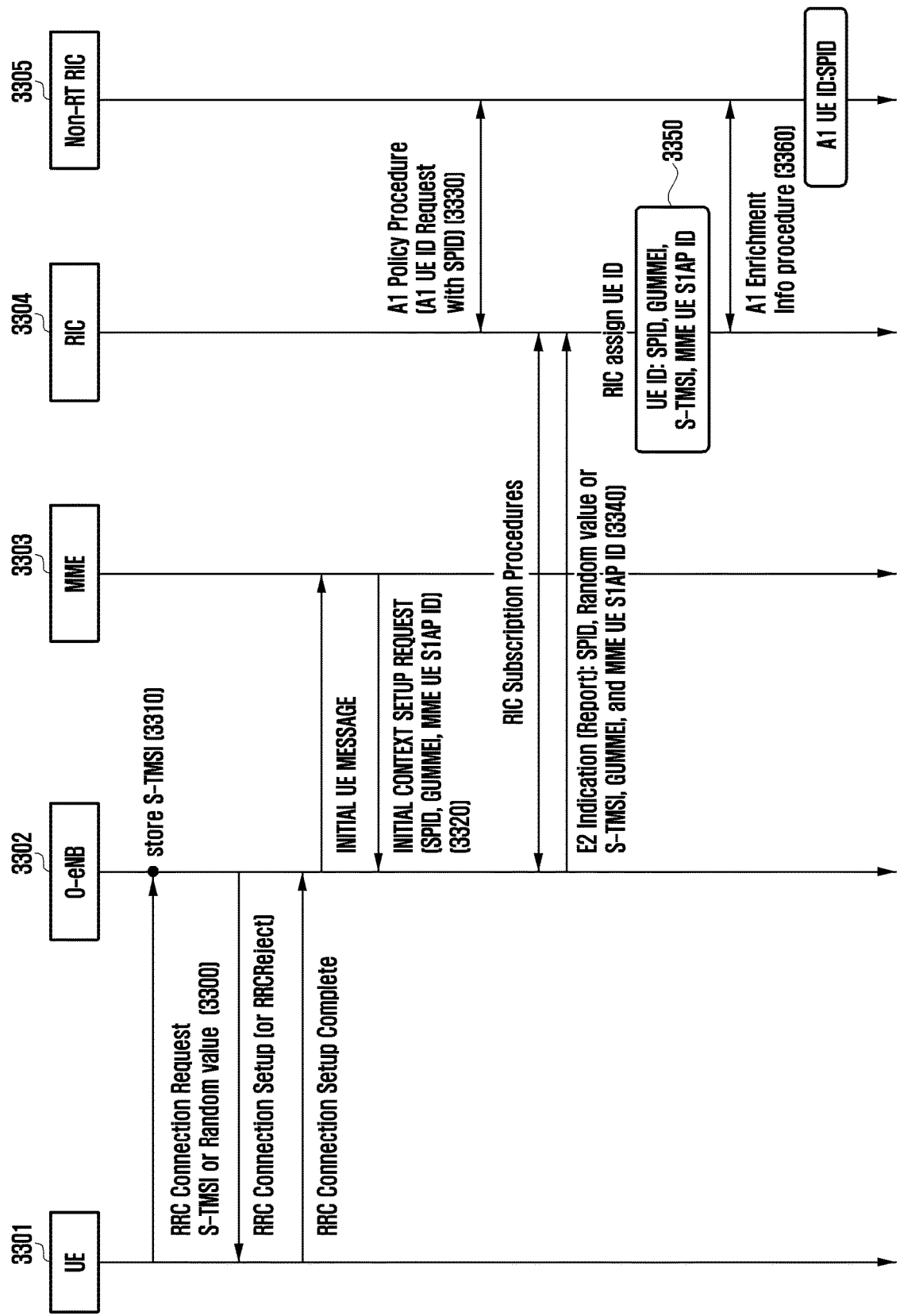
FIG. 33 illustrates an example in which an NRT-RIC manages information related to a UE-ID for each SPID group according to an embodiment of the disclosure.

FIG. 33 illustrates a procedure in which an O-eNB of a 4G RAN defined in the O-RAN generates a list of information for each UE on the basis of at least one of an S-TMSI, GUMMEI, and MME UE S1AP ID for each subscriber profile ID (SPID) group received from a UE and an MME and transmits the lit to a RIC, and the RIC allocates a UE ID for each UE on the basis of at least one of the S-TMSI, GUMMEI, and MME UE S1AP ID for each SPID group, generates and manages a UE list (which may include the information), and transmits the information to an NRT RIC 3207 through an A1 enrichment information message, and the NRT RIC 3207 performs management related to a UE ID for each SPID group according to an embodiment of the disclosure.

Referring to FIG. 33, in operation 3300, a UE 3301 inserts upper 40 bits of an S-TMSI value (or a random value and, hereinafter, may be interchangeably used with a random value) allocated by the core network into an RRC Connection Request message in initial setup according to the call access procedure defined in the 3GPP standard and transmits the RRC Connection Request message to an O-eNB 3302. In operation 3310, the O-eNB 3302 stores the S-TMSI value transmitted by the UE 3301. Thereafter, the O-eNB 3302 transmits an RRCConnectionSetup message to the UE 3301, and the UE 3301 transmits RRCConnectionSetupComplete message to the O-eNB 3302 in response thereto. Thereafter, the O-eNB 3302 transmits an initial UE message to an MME 3303. In operation 3320, the O-eNB 3302 stores at least one of an SPID, GUMMEI, and MME UE S1AP ID which is inserted into an S1AP INITIAL CONTEXT SETUP REQUEST message and transmitted by the MME 3303, according to the call access procedure defined in the 3GPP standard. The SPID is a subscription profile ID and is used to designate a specific service group to which the UE 3301 belongs in an LTE system.

An NRT RIC 3305 transmits a policy related to the specific SPID group to a RIC 3304 through an A1 policy message regardless of the order of the procedure in operation 3330.

Thereafter, the O-eNB 3302 performs RIC subscription procedures specified in the O-RAN standard with the RIC 3304, inserts at least one of the GUAMI, S-TMSI, and MME UE S1AP ID of each UE having the SPID as a representative key into an E2 indication (report) message on the basis of at least one of a GUMMEI, S-TMSI, and MME UE S1AP ID of UEs belonging to the specific group SPID designated through a subscription message by the RIC 3304 and transmits the E2 indication (report) message to the RIC 3304 in operation 3340. The RIC 3304 assigns a UE ID for each UE to the information on the basis of at least one of the GUMMEI, S-TMSI, and MME UE S1AP ID of UEs belonging to the SPID transmitted through the E2 indication message and stores at least one of the SPID GUMMEI, S-TMSI, and MME UE S1AP ID for each UE ID in operation 3350. The RIC 3304 transmits a UE ID list to the NRT RIC 3305 in response to the A1 policy message or the A1 enrichment info message as the part of the A1 enrichment procedure in operation 3360. The UE ID list included in the response message includes at least one of the UE ID, SPID GUAMI, S-TMSI, and MME UE S1AP ID of each UE.

In the procedure, operations must not be sequentially performed or all operations must not be necessarily performed, and the order thereof may be changed or a specific operation may be omitted. Further, another configuration illustrated in FIG. 33 may be added to the procedure, or a procedure illustrated in another figure may be combined with the procedure illustrated in FIG. 33.

Figure 34:
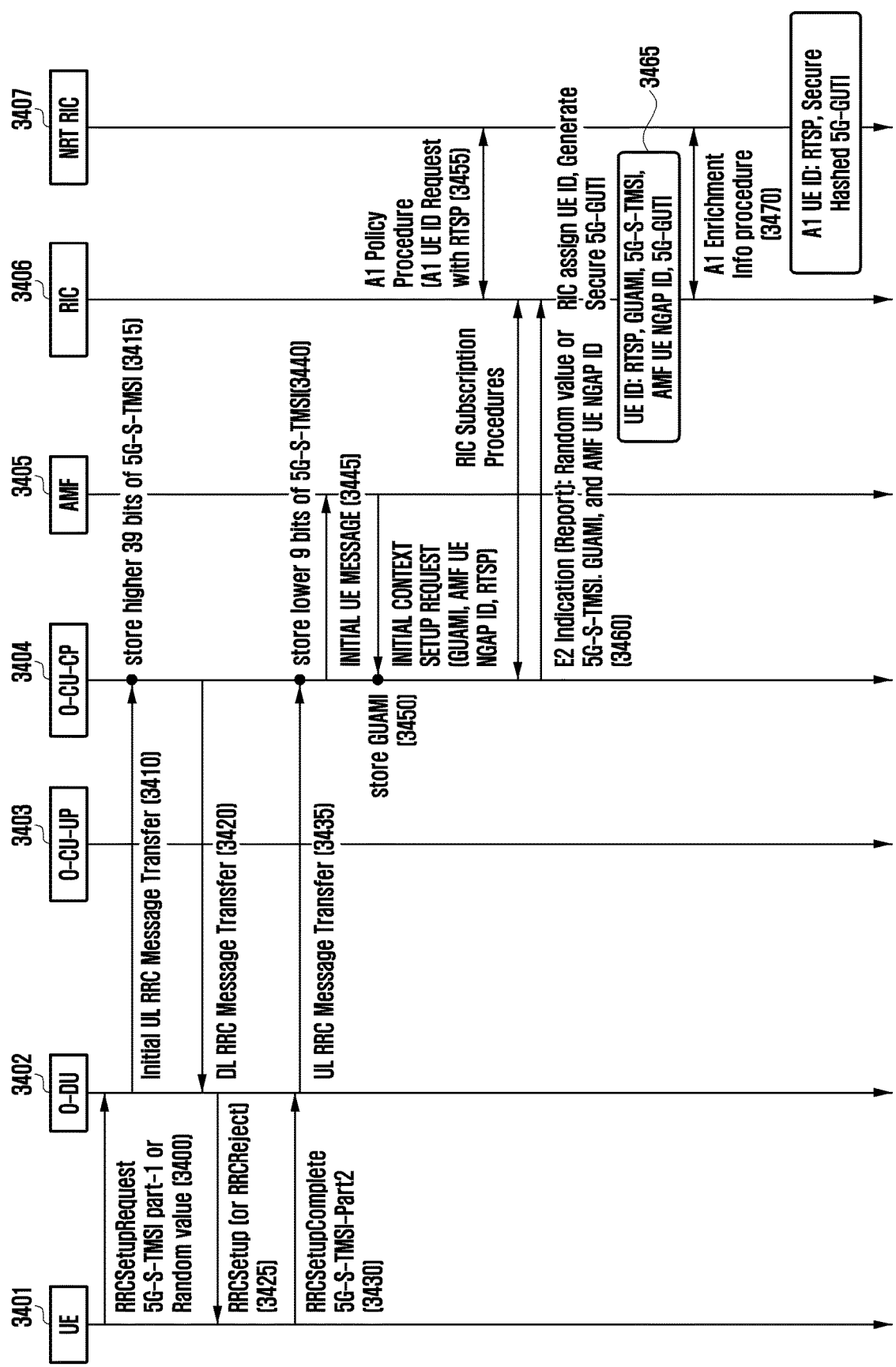
FIG. 34 illustrates another example in which an NRT-RIC manages information related to a UE-ID for each RFSP group according to an embodiment of the disclosure.

FIG. 34 illustrates a procedure in which an O-CU-CP of a 5G RAN defined in the O-RAN generates a list for each UE on the basis of a 5G-S-TMSI, GUAMI, and AMF UE NGAP ID for each RFSP group received from a UE and an AMF and transmits the list to a RIC, and the RIC generates a list of the information for each UE on the basis of a 5G-S-TMSI, GUAMI, and AMF UE NGAP ID for each RFSP group, generates a secure hashed 5G-GUTI after generating a 5G-GUTI on the basis of the 5G-S-TMSI and the GUAMI or generates a secure hashed 5G-GUTI using the GUAMI as a key, and transmits the UE ID and at least one of the secure hashed 5G-GUTI, RFSP, and GUAMI to the NRT-RIC through an A1 enrichment information message, and the NRT RIC performs management related to a UE ID for each RFSP group according to an embodiment of the disclosure.

Referring to FIG. 34, in operation 3400, a UE 3401 inserts upper 39 bits of a 5G-S-TMSI value (or random value and, hereinafter, may be interchangeably used with a random value) allocated by the core network into an RRCSetupRequst message in initial setup according to the call access procedure defined in the 3GPP standard and transmits the RRCSetupRequest message to an O-DU 3402. In operation 3410, the O-DU 3402 inserts the upper 39 bits of the 5G-S-TMSI value received in operation 3400 into an F1 initial UL RRC message transfer message and transmits the F1 initial UL RRC message transfer message to an O-CU-CP 3404 according to the call access procedure defined in the 3GPP standard. In operation 3415, the O-CU-CP 3404 stores the upper 39 bits of the 5G-S-TMSI value, which was inserted into the F1 message and transmitted by the O-DU 3402. Thereafter, the O-CU-CP 3404 transfers a DL RRC message to the O-DU 3402 in operation 3420, and the O-DU 3402 transmits an RRCSetup message (or an RRCReject message) to the UE 3401 in operation 3425.

When the O-DU 3402 transmits the RRCSetup message, the UE 3401 inserts lower 9 bits of the 5G-S-TMSI value allocated by the core network into an RRCSetupComplete message in the initial setup and transmits the RRCSetupComplete message to the O-DU 3402 according to the call access procedure defined in the 3GPP standard in operation 3430. In operation 3435, the O-DU 3402 inserts the lower 9 bits of the 5G-S-TMSI value received in operation 3430 into an F1 UL RRC message transfer message and transmits the F1 UL RRC message transfer message to the O-CU-CP 3404 according to the call access procedure defined in the 3GPP standard. In operation 3440, the O-CU-CP 3404 stores the lower 9 bits of the 5G-S-TMSI value, which was inserted into the F1 message and transmitted by the O-DU 3402. The O-CU-CP 3404 transmits an initial UE message to an AMF 3405 in operation 3445, and stores at least one of a GUAMI value, an AMF UE NGAP ID, and an RFSP value, which is inserted into a NGAP INITIAL CONTEXT SETUP REQUEST message and transmitted by the AMF, according to the call access procedure defined in the 3GPP standard in operation 3450. The RFSP is a RAT/frequency selection priority and is used to designate a specific service group to which the UE 3401 belongs in a 5G system.

An NRT RIC 3407 transmits a policy related to the specific RFSP group to a RIC 3406 through an A1 policy message regardless of the order of the procedure in operation 3455.

Thereafter, the O-CU-CP 3404 performs RIC subscription procedures specified in the O-RAN standard with the RIC 3406, inserts at least one of a GUAMI, 5G-S-TMSI, and AMF UE NGAP ID of each UE having a representative factor as the RFSP into an E2 indication (report) message on the basis of at least one of GUAMI, 5G-S-TMSI, and AMF UE NFAP ID of UEs belonging to the specific group RFSP designated through a subscription message by the RIC 3406 and transmit the E2 indication (report) message to the RIC 3406 in operation 3460. The RIC 3406 assigns a UE ID to each UE on the basis of at least one of the GUAMI, 5G-S-TMSI, AMF UE NGAP ID of UEs belongings to the RFSP received through the E2 indication message and stores at least one of the RFSP GUAMI, 5G-S-TMSI, and AMF UE NGAP ID for each UE ID in a RIC UE ID registry. Thereafter, the RIC 3406 generates a 5G-GUTI by concatenating the 5G-S-TMSI stored for each UE ID newly assigned and the GUAMI stored therewith in operation 3465. The generated 5G-GUTI is input into a secure hash function and a secure hashed 5G-GUTI is generated. According to circumstances, the 5G-GUTI and the GUAMI are input into a secure hash function and a secure hashed 5G-GUTI is generated. At this time, the GUAMI may be selectively used as a key of the 5G-GUTI. The procedure may be selectively applied in operation 3465.

The RIC 3406 transmits at least one of the UE ID, RFSP, GUAMI, and 5G-GUTI or secure hashed 5G-GUTI to the NRT RIC 3407 in response to the A1 policy message or the A1 enrichment info message as the part of the A1 enrichment procedure in operation 3470. Further, the response message of the A1 enrichment info message may include at least one of the UE ID, RFSP GUAMI, 5G-S-TMSI, and AMF UE NGAP ID for each UE ID.

In the procedure, operations must not be sequentially performed or all operations must not be necessarily performed, and the order thereof may be changed or a specific operation may be omitted. Further, another configuration illustrated in FIG. 34 may be added to the procedure, or a procedure illustrated in another figure may be combined with the procedure illustrated in FIG. 34. FIG. 34 also includes an O-CU-UP 3403.

Figure 35:
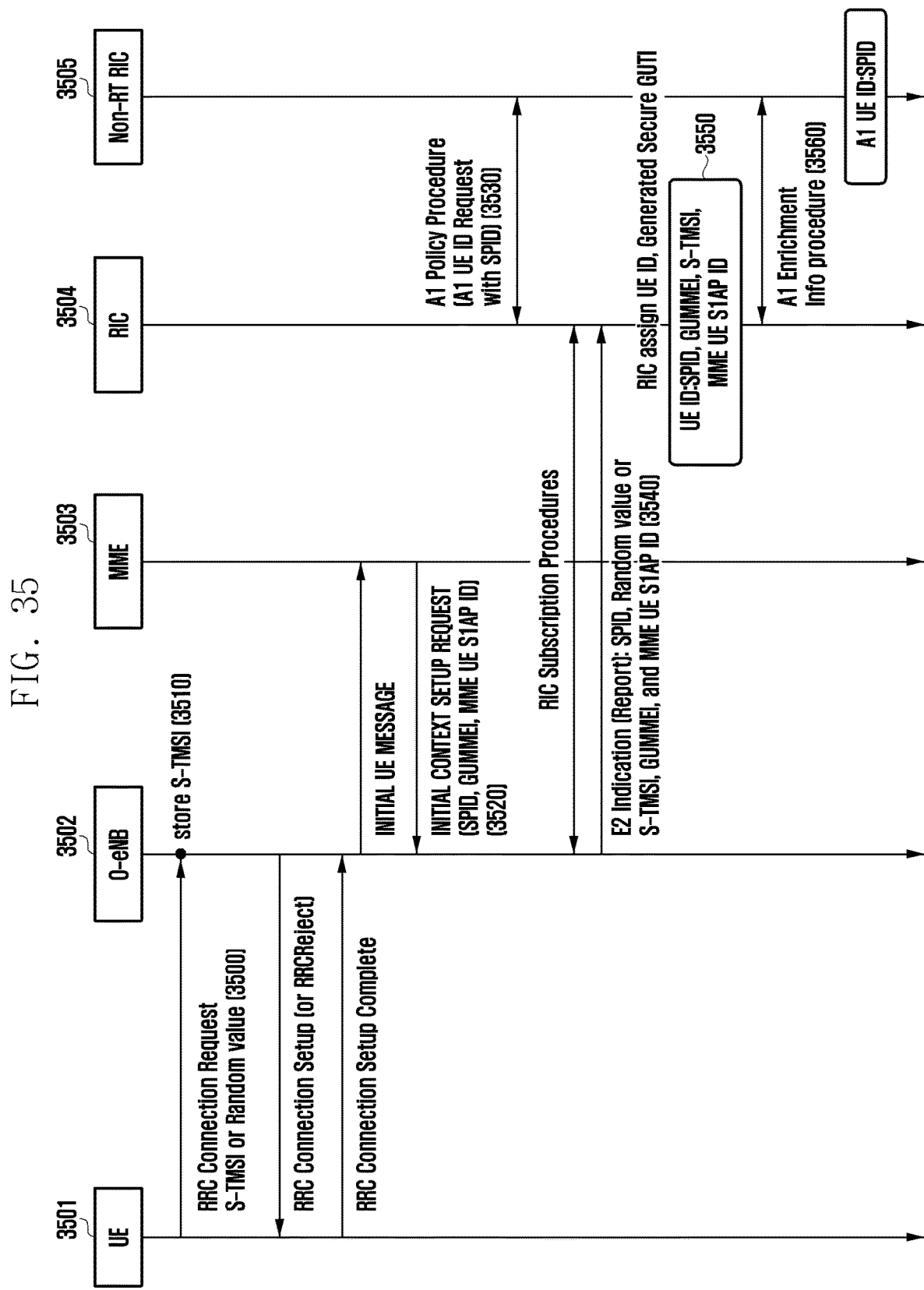
FIG. 35 illustrates another example in which an NRT-RIC manages information related to a UE-ID for each SPID group according to an embodiment of the disclosure.

FIG. 35 illustrates a procedure in which an O-eNB of a 4G RAN defined in the O-RAN generates a list of information for each UE on the basis of at least one of an S-TMSI, GUMMEI, and MME UE S1AP ID for each SPID group received from a UE and an MME, transmits the list to a RIC, the RIC generates, for the NRT RIC, a list for each UE on the basis of at least one of the S-TMSI, GUMMEI, and MME UE S1AP ID for each SPID group, generates a secure hashed GUTI after generating a GUTI using the S-TMSI and the GUMMEI or generates a secure hashed GUTI using the GUMMEI as a key, and transmits the UE ID and at least one of the secure hashed GUTI, SPID, and GUMMEI to the NRT-RIC through an A1 enrichment information message, and the NRT RIC performs management related to a UE ID for each SPID group according to an embodiment of the disclosure.

Referring to FIG. 35, in operation 3500, a UE 3501 inserts upper 40 bits of an S-TMSI value (or a random value and, hereinafter, may be interchangeably used with a random value) allocated by the core network into an RRC Connection Request message in initial setup according to the call access procedure defined in the 3GPP standard and transmits the RRC Connection Request message to an O-eNB 3502. In operation 3510, the O-eNB 3502 stores the S-TMSI value transmitted by the UE 3501. Thereafter, the O-eNB 3502 transmits an RRCConnectionSetup message to the UE 3501, and the UE 3501 transmits RRCConnectionSetupComplete message to the O-eNB 3502 in response thereto. Thereafter, the O-eNB 3502 transmits an initial UE message to an MME 3503. In operation 3520, the O-eNB 3502 stores at least one of an SPID, GUMMEI, and MME UE S1AP ID which is inserted into an S1AP INITIAL CONTEXT SETUP REQUEST message and transmitted by the MME 3503, according to the call access procedure defined in the 3GPP standard. The SPID is a subscription profile ID and is used to designate a specific service group to which the UE 3501 belongs in an LTE system.

An NRT RIC 3505 transmits a policy related to the specific SPID group to the RIC 3504 through an A1 policy message regardless of the order of the procedure in operation 3530.

Thereafter, the O-eNB 3502 performs RIC subscription procedures specified in the O-RAN standard with the RIC 3504, inserts at least one of the GUMMEI, S-TMSI, and MME UE S1AP ID of each UE having the SPID as a representative key into an E2 indication (report) message on the basis of at least one of the GUMMEI, S-TMSI, and MME UE S1AP ID of UEs belonging to the specific group SPID designated through a subscription message by the RIC 3504 and transmits the E2 indication (report) message to the RIC 3504 in operation 3540. The RIC 3504 assigns a UE ID for each UE to the information on the basis of at least one of the GUMMEI, S-TMSI, and MME UE S1AP ID of UEs belonging to the SPID received through the E2 indication message and stores at least one of the SPID GUMMEI, S-TMSI, and MME UE S1AP ID for each UE ID in a RIC UE ID registry. Thereafter, the RIC 3504 generates a GUTI by concatenating the S-TMSI stored for each UE ID newly assigned and the GUMMEI stored therewith in operation 3550. The generated GUTI is input into a secure hash function and a secure hashed GUTI is generated. The GUMMEI may be selectively used as a key of the GUTI according to a secure hash algorithm. The procedure may be selectively applied in operation 3550.

The RIC 3504 transmits at least one of the UE ID, SPID, GUMMEI, and GUTI or secure hashed GUTI for each UE ID to the NRT RIC 3505 in response to the A1 policy message or the A1 enrichment info message as the part of the A1 enrichment procedure in operation 3560. The UE ID list included in the response message of the A1 Enrichment Info message includes at least one of the UE ID, SPID GUMMEI, S-TMSI, and MME UE S1AP ID of each UE.

In the procedure, operations must not be sequentially performed or all operations must not be necessarily performed, and the order thereof may be changed or a specific operation may be omitted. Further, another configuration illustrated in FIG. 35 may be added to the procedure, or a procedure illustrated in another figure may be combined with the procedure illustrated in FIG. 35.

Figure 36:
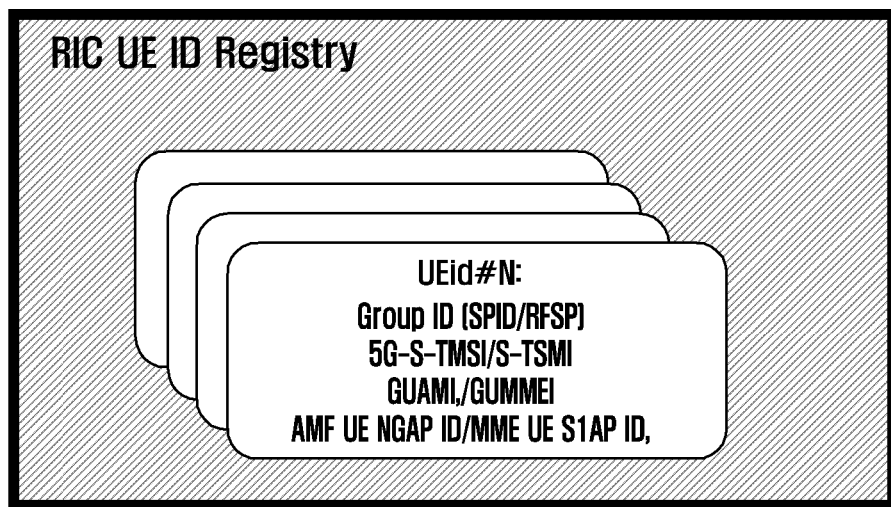
FIG. 36 illustrates a RIC UE ID registry stored by a RIC proposed by the disclosure according to an embodiment of the disclosure.

FIG. 36 illustrates a RIC UE ID registry stored by a RIC according to an embodiment of the disclosure.

Referring to FIG. 36, the RIC UE ID registry stores a RFSP, a 5G-S-TMSI, a GUAMI, and an AMF UE NGAP ID for each UE ID allocated by a RIC in the case of 5G system, and stores an SPID, an S-TMSI, a GUMMEI, and an MME UE S1AP ID in the case of a 4G system.

Figure 37:
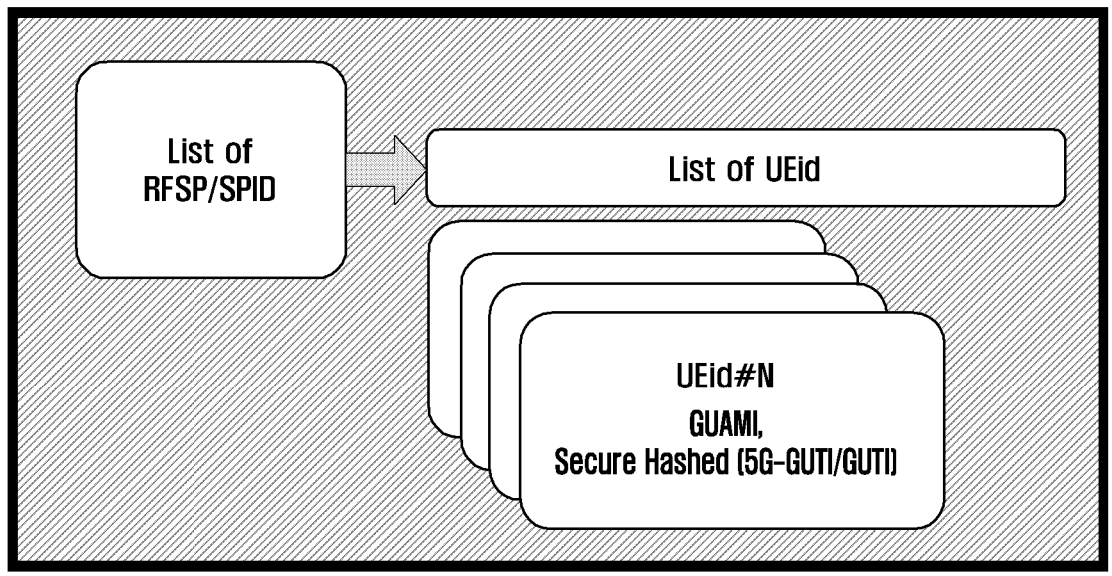
FIG. 37 illustrates an NRT-RIC UE ID registry stored by an NRT-RIC according to an embodiment of the disclosure.

FIG. 37 illustrates an NRT-RIC UE ID registry stored by an NRT-RIC according to an embodiment of the disclosure.

Referring to FIG. 37, the NRT-RIC UE ID registry stores each UE ID received by a RIC for each group ID (a RFSP in the case of a 5G system and an SPID in the case of a 4G system) managed by the NRT-RIC, and a secure hashed 5G-GUTI (in the case of a 5G system) or a secure hashed GUTI (in the case of a 4G system).

Figure 38:
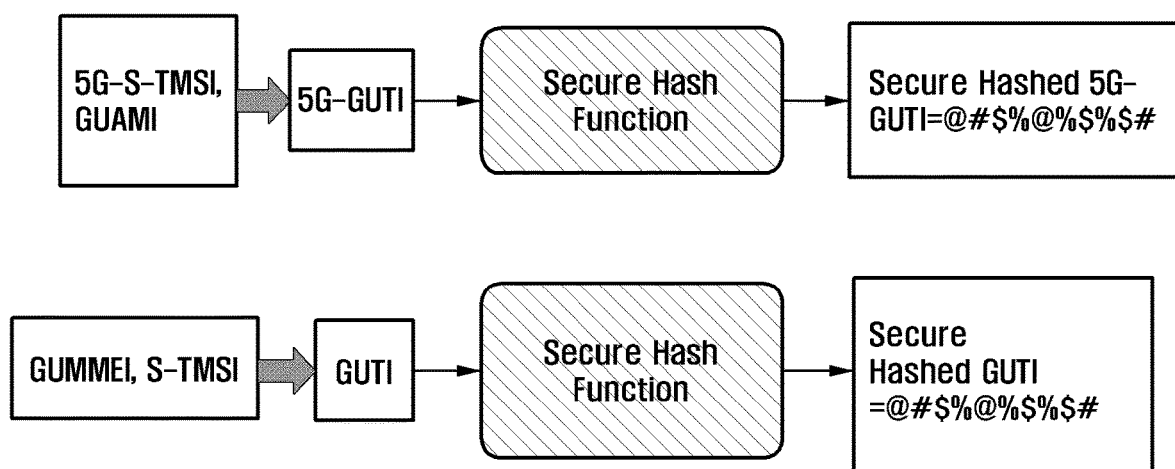
FIG. 38 illustrates a method by which a RIC generates a Secure Hashed 5G-GUTI/Secure Hashed GUTI according to an embodiment of the disclosure.

FIG. 38 illustrates a method by which a RIC generates a secure hashed 5G-GUTI/secure hashed GUTI according to an embodiment of the disclosure.

Referring to FIG. 38, in the case of a 5G system, the RIC may generate a 5G-GUTI by concatenating a 5G-S-TMSI (or a random value) received from an O-CU-CP and a GUAMI and generates a secure 5G-GUTI by inputting the 5G-GUTI into a secure hash function. In the case of a 4G system, the RIC may generate a GUTI by concatenating an S-TMSI received from an O-eNB and a GUMMEI and generate a secure GUTI by inputting the GUTI into a secure hash function. The 5G-GUTI and the GUTI may be replaced with other UE identifiers used in the network.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed an open radio access network (O-RAN) central unit-control plane (O-CU-CP) in a communication system, the method comprising:
receiving, from a network node for managing a mobility, an initial context setup message including an identifier of a user equipment (UE);
identifying the identifier of the UE;
identifying a UE identity (UE ID) of the UE; and
transmitting, to a near-real time RAN intelligent controller (RIC), an indication message for a report, the indication message including the UE ID and information associated with the UE per the UE ID,
wherein the UE ID comprises a radio access network (RAN) UE ID for identifying the UE uniquely for E1 interface.

2. The method of claim 1,
wherein the identifier of the UE comprises a globally unique access and mobility management function identifier (GUAMI) or an access and mobility management function user equipment NG application protocol identifier (AMF UE NGAP ID), and
wherein the UE ID comprises the GUAMI or an AMF UE NGAP ID.

3. The method of claim 1,
wherein the identifier of the UE comprises a globally unique mobility management entity identifier (GUMMEI) or a mobility management entity user equipment S1 application protocol identifier (MME UE S1AP ID), and
wherein the UE ID comprises the GUMMEI or the MME UE S1AP ID.

4. The method of claim 1, further comprising:
transmitting, to an O-RAN central unit-user plane (O-CU-UP), a bearer context setup request message including the RAN UE ID.

5. The method of claim 1,
wherein the UE ID is stored in the RIC, and
wherein a list of UE IDs based on the stored UE ID is transmitted for policy information from the RIC to a non-real time RAN intelligent controller (NRT-RIC).

6. A method of a near-real time RAN intelligent controller (RIC) in a communication system, the method comprising:
receiving, from an open radio access network (O-RAN) central unit-control plane (O-CU-CP), an indication message for a report, the indication message including a user equipment identity (UE ID) and information associated with a UE per the UE ID; and
storing the received UE ID,
wherein the UE ID comprises a radio access network (RAN) UE ID for identifying the UE uniquely for E1 interface.

7. The method of claim 6, wherein the UE ID comprises a globally unique access and mobility management function identifier (GUAMI) or an access and mobility management function user equipment NG application protocol identifier (AMF UE NGAP ID).

8. The method of claim 6, wherein the UE ID comprises a globally unique mobility management entity identifier (GUMMEI) or a mobility management entity user equipment S1 application protocol identifier (MME UE S1AP ID).

9. The method of claim 6, further comprising:
transmitting, to non-real time RAN intelligent controller (NRT-RIC), a list of UE IDs for policy information based on the stored UE ID.

10. The method of claim 6, wherein a bearer context setup request message including the RAN UE ID is transmitted from the O-CU-CP to an O-RAN central unit-user plane (O-CU-UP).

11. The method of claim 6,
wherein an initial context setup message is transmitted from a network node for managing a mobility,
wherein the initial context setup message includes an identifier of the UE, and
wherein the identifier of the UE comprises a GUAMI, an AMF UE NGAP ID, a GUMMEI, or an MME UE S1AP ID.

12. An apparatus for controlling an open radio access network (O-RAN) central unit-control plane (O-CU-CP) in a communication system, the apparatus comprising:
a transceiver; and
at least one processor configured to:
receive, from a network node for managing a mobility, an initial context setup message including an identifier of a user equipment (UE);
identify the identifier of the UE;
identify a UE identity (UE ID) of the UE; and
transmit, to a near-real time RAN intelligent controller (RIC), an indication message for a report, the indication message including the UE ID and information associated with the UE per the UE ID,
wherein the UE ID comprises a radio access network (RAN) UE ID for identifying the UE uniquely for E1 interface.

13. The apparatus of claim 12,
wherein the identifier of the UE comprises a globally unique access and mobility management function identifier (GUAMI) or an access and mobility management function user equipment NG application protocol identifier (AMF UE NGAP ID), and
wherein the UE ID comprises the GUAMI or an AMF UE NGAP ID.

14. The apparatus of claim 12,
wherein the identifier of the UE comprises a globally unique mobility management entity identifier (GUM- MEI) or a mobility management entity user equipment S1 application protocol identifier (MME UE S1AP ID), and wherein the UE ID comprises the GUMMEI or the MME UE S1AP ID.

15. The apparatus of claim 12, wherein the at least one processor is further configured to transmit, to an O-RAN central unit-user plane (O-CU-UP), a bearer context setup request message including the RAN UE ID.

16. The apparatus of claim 12,
wherein the UE ID is stored in the RIC, and
wherein a list of UE IDs based on the stored UE ID is transmitted for policy information from the RIC to a non-real time RAN intelligent controller (NRT-RIC).

17. An apparatus for controlling a near-real time RAN intelligent controller (RIC) in a communication system, the apparatus comprising:
a transceiver; and
at least one processor configured to:
receive, from an open radio access network (O-RAN) central unit-control plane (O-CU-CP), an indication message for a report, the indication message including a user equipment identity (UE ID) and information associated with a UE per the UE ID; and
store the received UE ID,
wherein the UE ID comprises a radio access network (RAN) UE ID for identifying the UE uniquely for E1 interface.

18. The apparatus of claim 17, wherein the UE ID comprises a globally unique access and mobility management function identifier (GUAMI) or an access and mobility management function user equipment NG application protocol identifier (AMF UE NGAP ID).

19. The apparatus of claim 17, wherein the UE ID comprises a globally unique mobility management entity identifier (GUMMEI) or a mobility management entity user equipment S1 application protocol identifier (MME UE S1AP ID).

20. The apparatus of claim 17, wherein the at least one processor is configured to transmit, to non-real time RAN intelligent controller (NRT-RIC), a list of UE IDs for policy information based on the stored UE ID.

21. The apparatus of claim 17, wherein a bearer context setup request message including the RAN UE ID is transmitted from the O-CU-CP to an O-RAN central unit-user plane (O-CU-UP).

22. The apparatus of claim 17,
wherein an initial context setup message is transmitted from a network node for managing a mobility,
wherein the initial context setup message includes an identifier of the UE, and
wherein the identifier of the UE comprises a GUAMI, an AMF UE NGAP ID, a GUMMEI, or an MME UE S1AP ID.

* * * * *